US009651729B2

(12) United States Patent
Nichol et al.

(10) Patent No.: US 9,651,729 B2
(45) Date of Patent: May 16, 2017

(54) REFLECTIVE DISPLAY COMPRISING A FRONTLIGHT WITH EXTRACTION FEATURES AND A LIGHT REDIRECTING OPTICAL ELEMENT

(71) Applicant: Flex Lighting II, LLC, Chicago, IL (US)

(72) Inventors: Anthony John Nichol, Chicago, IL (US); Zane Arthur Coleman, Elmhurst, IL (US)

(73) Assignee: Flex Lighting II, LLC, Chicago, IL (US)

( * ) Notice: Subject to any disclaimer, the term of this patent is extended or adjusted under 35 U.S.C. 154(b) by 69 days.

(21) Appl. No.: 14/701,238

(22) Filed: Apr. 30, 2015

(65) Prior Publication Data

US 2015/0253487 A1    Sep. 10, 2015

Related U.S. Application Data

(63) Continuation-in-part of application No. 13/088,167, filed on Apr. 15, 2011, now Pat. No. 9,028,123.
(Continued)

(51) Int. Cl.
*F21V 7/04* (2006.01)
*F21V 8/00* (2006.01)
(Continued)

(52) U.S. Cl.
CPC .......... *G02B 6/0036* (2013.01); *G02B 6/006* (2013.01); *G02B 6/0018* (2013.01); *G02B 6/0028* (2013.01); *G02B 6/0065* (2013.01);
*G02B 6/0068* (2013.01); *G02B 6/0076* (2013.01); *G02B 6/0088* (2013.01); *G02B 6/002* (2013.01);
(Continued)

(58) Field of Classification Search
CPC ............. G02B 6/0076; G02B 6/00036; G02B 6/00043; G02B 6/00053; G02B 6/00061; G02B 26/00816; G02B 26/00833
See application file for complete search history.

(56) References Cited

U.S. PATENT DOCUMENTS 4,592,717 A    6/1986 Albert
4,974,354 A    12/1990 Hembrook, Jr.
(Continued)

FOREIGN PATENT DOCUMENTS

DE    2736486 A1    2/1978
JP    61-278416 A    12/1987
(Continued)

*Primary Examiner* — Ismael Negron
(74) *Attorney, Agent, or Firm* — Zane Coleman

(57) ABSTRACT

A display includes a reflective spatial light modulator having a reflective surface, a lightguide comprising a core layer, a first cladding layer, and a light emitting region comprising a plurality of light extraction features arranged in a pattern that varies spatially in the light emitting region to frustrate totally internally reflected light propagating within the core layer such that light exits the core layer in the light emitting region into the first cladding layer. A light redirecting optical element is optically coupled to the second side of the first cladding layer, and includes a plurality of light redirecting features directing frustrated totally internally reflected light from the plurality of light extraction features toward the reflective spatial light modulator.

25 Claims, 15 Drawing Sheets

Related U.S. Application Data

(60) Provisional application No. 61/325,266, filed on Apr. 16, 2010, provisional application No. 61/325,252, filed on Apr. 16, 2010, provisional application No. 61/325,269, filed on Apr. 16, 2010, provisional application No. 61/325,271, filed on Apr. 16, 2010, provisional application No. 61/325,272, filed on Apr. 16, 2010, provisional application No. 61/325,275, filed on Apr. 16, 2010, provisional application No. 61/325,277, filed on Apr. 16, 2010, provisional application No. 61/325,280, filed on Apr. 16, 2010, provisional application No. 61/325,282, filed on Apr. 16, 2010, provisional application No. 61/325,262, filed on Apr. 16, 2010, provisional application No. 61/325,270, filed on Apr. 16, 2010, provisional application No. 61/325,265, filed on Apr. 16, 2010, provisional application No. 61/347,567, filed on May 24, 2010, provisional application No. 61/363,342, filed on Jul. 12, 2010, provisional application No. 61/368,560, filed on Jul. 28, 2010, provisional application No. 61/377,888, filed on Aug. 27, 2010, provisional application No. 61/381,077, filed on Sep. 9, 2010, provisional application No. 61/415,250, filed on Nov. 18, 2010, provisional application No. 61/425,328, filed on Dec. 21, 2010, provisional application No. 61/441,871, filed on Feb. 11, 2011, provisional application No. 61/450,711, filed on Mar. 9, 2011, provisional application No. 61/986,457, filed on Apr. 30, 2014.

(51) Int. Cl.
*G09F 13/18* (2006.01)
*G02F 1/1335* (2006.01)
*G02B 27/01* (2006.01)

(52) U.S. Cl.
CPC .............. *G02B 6/003* (2013.01); *G02B 6/005* (2013.01); *G02B 6/0058* (2013.01); *G02B 27/0101* (2013.01); *G02F 2001/133616* (2013.01); *G09F 13/18* (2013.01); *Y10T 29/49826* (2015.01)

(56) References Cited

U.S. PATENT DOCUMENTS

| | | |
|---|---|---|
| 5,359,691 A | 10/1994 | Tai et al. |
| 6,846,082 B2 | 1/2005 | Glent-Madsen et al. |
| 7,275,850 B2 | 10/2007 | Nesterenko et al. |
| 7,411,142 B2 | 8/2008 | Jung et al. |
| 8,231,256 B1 | 7/2012 | Coleman et al. |
| 8,439,545 B2 | 5/2013 | Cheong |
| 8,794,809 B2 | 8/2014 | Lundin |
| 2004/0231481 A1 | 11/2004 | Floding |
| 2006/0008225 A1 | 1/2006 | Naitou et al. |
| 2006/0120681 A1 | 6/2006 | Mune et al. |
| 2007/0147023 A1 | 6/2007 | Matsushita |
| 2007/0279549 A1 | 12/2007 | Iwasaki |
| 2008/0075414 A1 | 3/2008 | Van Ostrand |
| 2009/0028038 A1 | 1/2009 | Harada |
| 2010/0074585 A1 | 3/2010 | Shimizu et al. |
| 2010/0092143 A1 | 4/2010 | Ushiwata et al. |
| 2010/0109173 A1 | 5/2010 | Yamamoto |
| 2011/0085771 A1 | 4/2011 | Matsuyama et al. |
| 2011/0110638 A1 | 5/2011 | Shioda |
| 2011/0134623 A1 | 6/2011 | Sherman et al. |
| 2014/0360578 A1 | 12/2014 | Nichol et al. |
| 2015/0078035 A1 | 3/2015 | Nichol et al. |
| 2015/0219834 A1* | 8/2015 | Nichol ................ G02B 6/0076 362/607 |

FOREIGN PATENT DOCUMENTS

| | | |
|---|---|---|
| JP | 10-197865 A | 7/1998 |
| JP | S63301909 A | 12/1998 |
| JP | 11-264974 A | 9/1999 |
| JP | 2000-056138 A | 2/2000 |
| JP | 2001-312233 A | 11/2001 |
| JP | 2002277661 A | 9/2002 |
| JP | 200469729 A | 3/2004 |
| JP | 2004109426 A | 4/2004 |
| JP | 2004-170972 A | 6/2004 |
| JP | 2004-288570 A | 10/2004 |
| JP | 2005043766 A | 2/2005 |
| JP | 2006-003431 A | 1/2006 |
| JP | 2008-198615 A | 8/2008 |
| WO | 2004027314 A1 | 4/2004 |
| WO | 2009084556 A1 | 7/2009 |

* cited by examiner

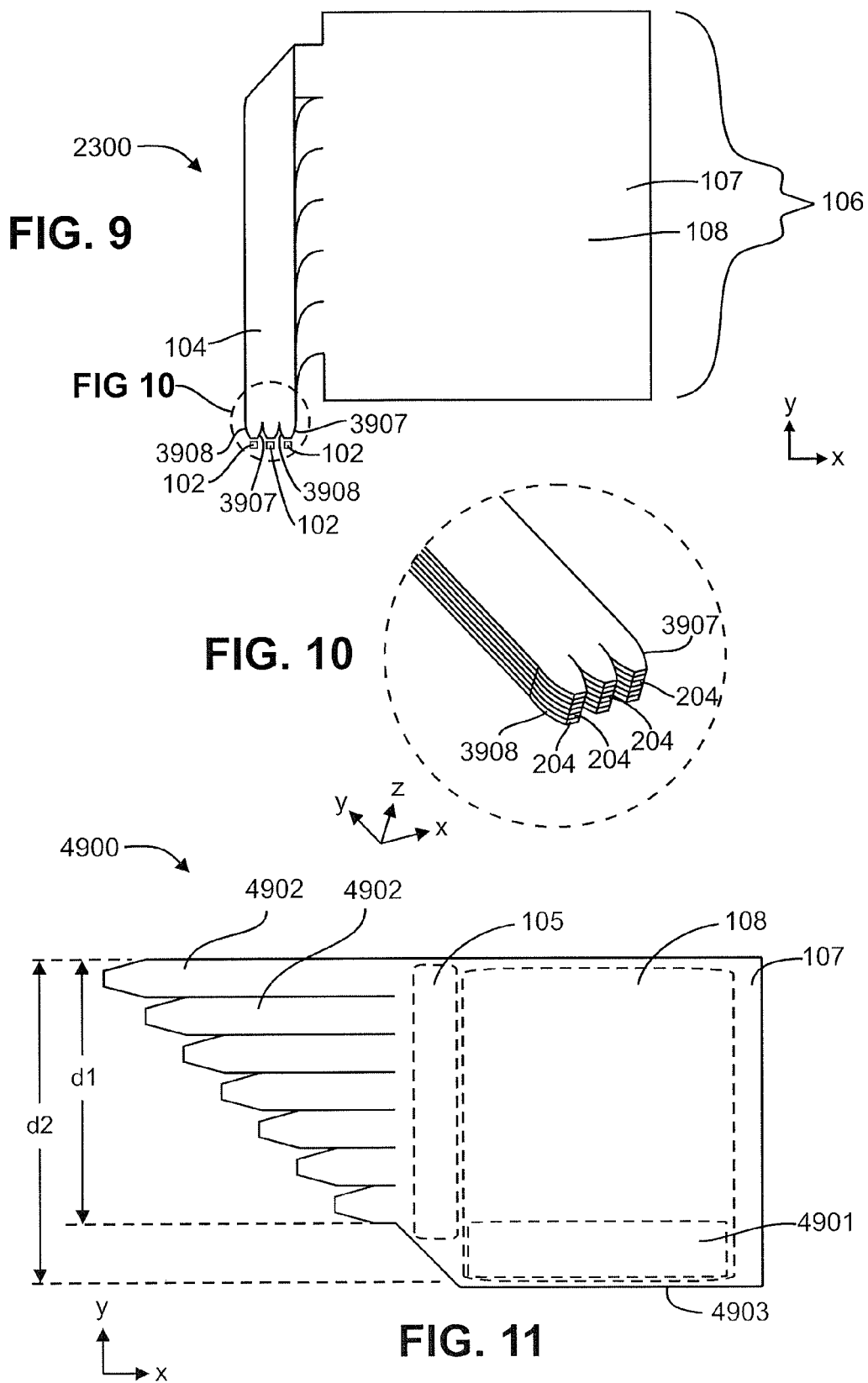

REFLECTIVE DISPLAY COMPRISING A FRONTLIGHT WITH EXTRACTION FEATURES AND A LIGHT REDIRECTING OPTICAL ELEMENT

CROSS-REFERENCE TO RELATED APPLICATION

This application is a continuation-in-part of U.S. application Ser. No. 13/088,167, entitled "Display illumination device with a film-based lightguide having stacked incident surfaces," filed on Apr. 15, 2011 which claims the benefit of U.S. Provisional Application No. 61/325,266, entitled "Replaceable illuminated signage system for cooler doors," filed Apr. 16, 2010; U.S. Provisional Application No. 61/325,252, entitled "Manufacturing device for ultra-low profile film lightguide," filed Apr. 16, 2010; U.S. Provisional Application No. 61/325,269, entitled "Processing method for optical film lightguide and coupling system," filed Apr. 16, 2010; U.S. Provisional Application No. 61/325,271, entitled "Method and apparatus for aligning lightguides in a coupling system," filed Apr. 16, 2010; U.S. Provisional Application No. 61/325,272, entitled "Center aligned lighting configuration for ultra-thin LED backlight system for LCDs," filed Apr. 16, 2010; U.S. Provisional Application No. 61/325,275, entitled "Low profile battery powered lightguide," filed Apr. 16, 2010; U.S. Provisional Application No. 61/325,277, entitled "Method and apparatus for enhanced LCD backlight," filed Apr. 16, 2010; U.S. Provisional Application No. 61/325,280, entitled "Film coupling system with light propagation modifications," filed Apr. 16, 2010; U.S. Provisional Application No. 61/325,282, entitled "Heatsinking methods for compact film light guide systems," filed Apr. 16, 2010; U.S. Provisional Application No. 61/325,262, entitled "Lamination method for a multi-layer optical lightguide film," filed Apr. 16, 2010; U.S. Provisional Application No. 61/325,270, entitled "Edge-enhancement for film coupling technology," filed Apr. 16, 2010; U.S. Provisional Application No. 61/325,265, entitled "Colored surface illumination by mixing dyes and scattering features into ink," filed on Apr. 16, 2010; U.S. Provisional Application No. 61/347,567, entitled "Light emitting device comprising a film-based lightguide," filed May 24, 2010; U.S. Provisional Application No. 61/363,342, entitled "Film lightguide with light redirecting elements," filed Jul. 12, 2010; U.S. Provisional Application No. 61/368,560, entitled "Light emitting device with optical redundancy," filed Jul. 28, 2010; U.S. Provisional Application No. 61/377,888, entitled "Light emitting device comprising a lightguide film," filed Aug. 27, 2010; U.S. Provisional Application No. 61/381,077, entitled "Light emitting device with externally or internally controlled output," filed Sep. 9, 2010; U.S. Provisional Application No. 61/415,250, entitled "Light emitting device comprising a lightguide film and light turning optical element," filed Nov. 18, 2010; U.S. Provisional Application No. 61/425,328, entitled "Light emitting device comprising a removable and replaceable lightguide," filed Dec. 21, 2010; U.S. Provisional Application No. 61/441,871, entitled "Front illumination device comprising a film-based lightguide," filed Feb. 11, 2011; and U.S. Provisional Application No. 61/450,711, entitled "Illumination device comprising a film-based lightguide," filed on Mar. 9, 2011; this application also claims the benefit of U.S. Provisional Application No. 61/986,457, entitled "Illumination device including a relative position maintaining element," filed Apr. 30, 2014, the entire contents of each of which are incorporated herein by reference.

TECHNICAL FIELD

The subject matter disclosed herein generally relates to lightguides, films, and light emitting devices such as, without limitation, light fixtures, backlights, frontlights, light emitting signs, passive displays, and active displays and their components and methods of manufacture.

BACKGROUND

Light emitting devices are needed that have a very thin form factor that can generate light with specific angular light output profiles. Conventionally, in order to reduce the thickness of displays and backlights, edge-lit configurations using rigid lightguides have been used to receive light from the edge of and direct light out of a larger area surface. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

In one aspect, a display includes a reflective spatial light modulator having a reflective surface. A lightguide of the display includes a core layer having opposing surfaces with a thickness not greater than 0.5 millimeters therebetween wherein light propagates by total internal reflection between the opposing surfaces; a first cladding layer having a first side optically coupled to the core layer and an opposing second side; a lightguide region; an array of coupling lightguides continuous with the lightguide region, each coupling lightguide of the array of coupling lightguides terminating in a bounding edge, and each coupling lightguide folded in a fold region such that the bounding edges of the array of coupling lightguides are stacked; and a light emitting region comprising a plurality of light extraction features arranged in a pattern that varies spatially in the light emitting region, the plurality of light extraction features frustrating totally internally reflected light propagating within the core layer such that light exits the core layer in the light emitting region into the first cladding layer. A light source is positioned to emit light into the stacked bounding edges, the light propagating within the array of coupling lightguides to the lightguide region, with light from each coupling lightguide combining and totally internally reflecting within the lightguide region. A light redirecting optical element is optically coupled to the second side of the first cladding layer. The light redirecting optical element includes a plurality of light redirecting features directing frustrated totally internally reflected light from the plurality of light extraction features toward the reflective spatial light modulator. The plurality of light redirecting features occupy less than 50% of a surface of the light redirecting optical element in the light emitting region. The core layer has an average thickness in the light emitting region, the light emitting region has a largest dimension in a plane of the light emitting region orthogonal to a thickness direction of the core layer, and the largest dimension of the light emitting region divided by the average thickness of the core layer in the light emitting region is greater than 100.

In another aspect, a display includes a reflective spatial light modulator having a reflective surface. A first lightguide of the display includes a core layer having opposing surfaces with a thickness not greater than 0.5 millimeters therebetween, a lightguide region and a light emitting region. The first lightguide is defined by the opposing surfaces guiding light by total internal reflection. A first cladding layer has a first side optically coupled to the core layer and an opposing second side. An array of coupling lightguides continuous is with the lightguide region of the first lightguide. Each coupling lightguide of the array of coupling lightguides terminates in a bounding edge, and each coupling lightguide is folded in a fold region such that the bounding edges of the array of coupling lightguides are stacked. A plurality of light extraction features is arranged within the light emitting region in a pattern that varies spatially in the light emitting region. The plurality of light extraction features frustrate totally internally reflected light propagating between the opposing surfaces of the core layer such that light exits the core layer in the light emitting region into the first cladding layer. A light source is positioned to emit light into the stacked bounding edges. The light propagates within the array of coupling lightguides to the lightguide region, with light from each coupling lightguide combining and totally internally reflecting within the lightguide region. A light redirecting optical element is optically coupled to the second side of the first cladding layer. The light redirecting optical element includes a plurality of light redirecting features directing a first portion of the frustrated totally internally reflected light from the plurality of light extraction features toward the reflective spatial light modulator. The display also includes a second lightguide including the core layer. The second lightguide is defined by a second portion of the frustrated totally internally reflected light from the first lightguide propagating by total internal reflection between a surface of the first lightguide and an area of a surface of the light redirecting optical element between the plurality of light redirecting features.

In yet another aspect, a display includes a reflective spatial light modulator having a reflective surface. A first lightguide of the display includes a core layer having opposing surfaces with a thickness not greater than 0.5 millimeters therebetween, a lightguide region and a light emitting region. The first lightguide is defined by the opposing surfaces guiding light by total internal reflection. An array of coupling lightguides is continuous with the lightguide region. Each coupling lightguide of the array of coupling lightguides terminates in a bounding edge, and each coupling lightguide is folded in a fold region such that the bounding edges of the array of coupling lightguides are stacked. A light source emits light into the stacked bounding edges. The light propagates within the array of coupling lightguides to the lightguide region, with light from each coupling lightguide combining and totally internally reflecting within the lightguide region. A first cladding layer has a first side optically coupled to the core layer and an opposing second side. A plurality of light extraction features are arranged within the light emitting region in a pattern that varies spatially in the light emitting region. The plurality of light extraction features frustrate the totally internally reflected light from the array of coupling lightguides propagating in the first lightguide between the opposing surfaces of the core layer such that light exits the core layer in the light emitting region into the first cladding layer. A light redirecting optical element is optically coupled to the second side of the first cladding layer. The light redirecting optical element includes a plurality of light redirecting features directing a first portion of the frustrated totally internally reflected light from the plurality of light extraction features back through the first cladding layer and the core layer to the reflective spatial light modulator. The display includes a second lightguide including the core layer. The second lightguide is defined by a portion of the frustrated totally internally reflected light from the first lightguide propagating by total internal reflection between a surface of the first lightguide and an area of a surface of the light redirecting optical element. The plurality of light redirecting features occupy less than 50% of the surface of the light redirecting optical element. The area of the surface of the light redirecting element is defined between the plurality of light redirecting features and reflects by total internal reflection a second portion of the frustrated totally internally reflected light from the plurality of light extraction features back through the first cladding layer and into the core layer where the second portion of the frustrated totally internally reflected light totally internally reflects from the surface of the first lightguide and is subsequently reflected by one or more light redirecting features of the plurality of light redirecting features toward the reflective spatial light modulator.

BRIEF DESCRIPTION OF THE DRAWINGS

FIG. 9 is a top view of one embodiment of a light emitting device including coupling lightguides with a plurality of first reflective surface edges and a plurality of second reflective surface edges within each coupling lightguide.

FIG. 10 is an enlarged perspective view of the input end of the coupling lightguides of FIG. 9.

FIG. 11 is a top view of one embodiment of a film-based lightguide including an array of tapered coupling lightguides.

DETAILED DESCRIPTION

Figure 1:
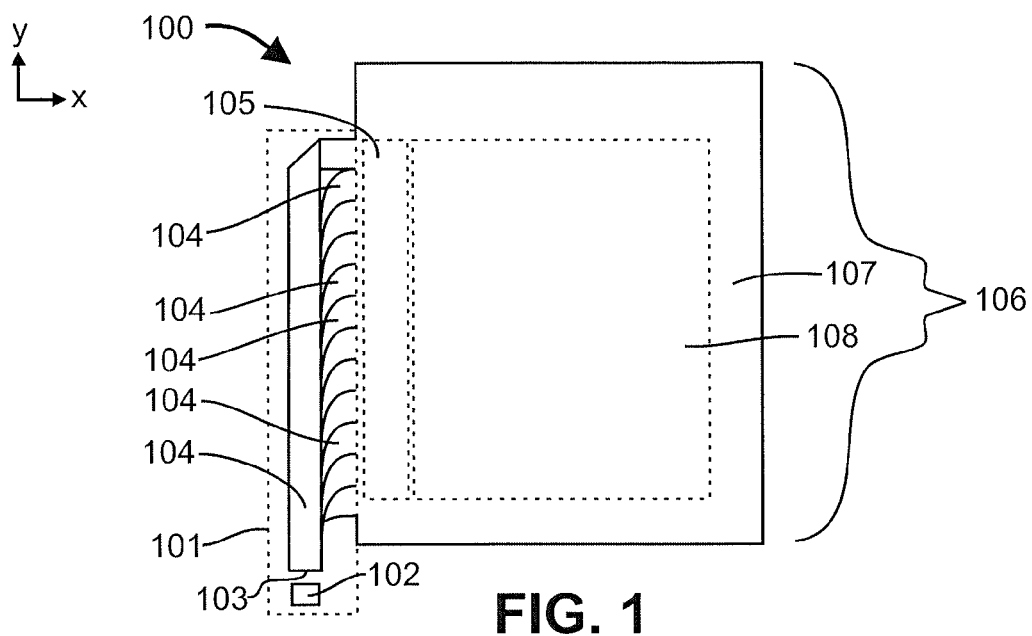
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

DEFINITIONS

"Electroluminescent display" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \approx 1$; however, high and low refractive index materials can be used to achieve lightguide regions. A lightguide does not need to be optically coupled to all of its components to be considered as a lightguide. Light may enter from any surface (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5 micron region or layer of a film or it may be a 3 millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are asymmetrical about an axis, the light emitting device optical axis is the angular weighted average of the luminous intensity output. For non-planar output surfaces, the light emitting device optical axis is evaluated in two orthogonal output planes and may be a constant direction in a first output plane and at a varying angle in a second output plane orthogonal to the first output plane. For example, light emitting from a cylindrical light emitting surface may have a peak angular luminous intensity (thus light emitting device optical axis) in a light output plane that does not include the curved output surface profile and the angle of luminous intensity could be substantially constant about a rotational axis around the cylindrical surface in an output plane including the curved surface profile. Thus, in this example, the peak angular intensity is a range of angles. When the light emitting device has a light emitting device optical axis in a range of angles, the optical axis of the light emitting device includes the range of angles or an angle chosen within the range. The optical axis of a lens or element is the direction of which there is some degree of rotational symmetry in at least one plane and as used herein corresponds to the mechanical axis. The optical axis of the region, surface, area, or collection of lenses or elements may differ from the optical axis of the lens or element, and as used herein is dependent on the incident light angular and spatial profile, such as in the case of off-axis illumination of a lens or element.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one surface or edge of the core material with a refractive index less than a refractive index of the core material. In other embodiment, the light input coupler includes a plurality of coupling lightguides wherein a portion of light from a light source incident on a surface of at least one strip is directed into the lightguide such that light travels in a waveguide condition. The light input coupler may also include one or more of the following: a strip folding device, a strip holding element, and an input surface optical element.

In one embodiment, a first array of light input couplers is positioned to input light into the light mixing region, light emitting region, or lightguide region and a separation distance between the light input couplers varies. In one embodiment, a light emitting device includes at least three light input couplers disposed along a side of a film having a separation distance between a first pair of input couplers along the side of the film different than a separation distance between a second pair of input couplers along the side of the film. For example, in one embodiment a separation distance between the first pair of input couplers along the side of the film is great than a separation distance between a second pair of input couplers along the side of the film.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In another embodiment, a light emitting device includes a plurality of light sources within one package disposed to emit light toward a light input surface. In one embodiment, the light emitting device includes 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

In one embodiment, a light emitting device includes at least one broadband light source that emits light in a wavelength spectrum larger than 100 nanometers. In another embodiment, a light emitting device includes at least one narrowband light source that emits light in a narrow bandwidth less than 100 nanometers. In another embodiment, a light emitting device includes at least one broadband light source that emits light in a wavelength spectrum larger than 100 nanometers or at least one narrowband light source that emits light in a narrow bandwidth less than 100 nanometers. In one embodiment a light emitting device includes at least one narrowband light source with a peak wavelength within a range selected from the group: 300 nm-350 nm, 350 nm-400 nm, 400 nm-450 nm, 450 nm-500 nm, 500 nm-550 nm, 550 nm-600 nm, 600 nm-650 nm, 650 nm-700 nm, 700 nm-750 nm, 750 nm-800 nm, and 800 nm-1200 nm. The light sources may be chosen to match the spectral qualities of red, green and blue such that collectively when used in a light emitting device used as a display, the color gamut area is at least one selected from the group: 70% NTSC, 80% NTSC, 90% NTSC, 100% NTSC, and 60%, 70%, 80%, 90%, and 95% of the visible CIE u' v' color gamut of a standard viewer. In one embodiment, at least one light source is a white LED package including a red, green, and blue LED.

In another embodiment, at least two light sources with different colors are disposed to couple light into the lightguide through at least one light input coupler. In another embodiment, a light emitting device includes at least three light input couplers, at least three light sources with different colors (red, green and blue for example) and at least three lightguides. In another embodiment, a light source further includes at least one selected from the group: reflective optic, reflector, reflector cup, collimator, primary optic, secondary optic, collimating lens, compound parabolic collimator, lens, reflective region and input coupling optic. The light source may also include an optical path folding optic such as a curved reflector that can enable the light source (and possibly heat-sink) to be oriented along a different edge of the light emitting device. The light source may also include a photonic bandgap structure, nano-structure or other three-dimensional arrangement that provides light output with an angular FWHM less than one selected from the group: 120 degrees, 100 degrees, 80 degrees, 60 degrees, 40 degrees, and 20 degrees.

In another embodiment, a light emitting device includes a light source emitting light in an angular full-width at half maximum intensity of less than one selected from 150 degrees, 120 degrees, 100 degrees, 80 degrees, 70 degrees, 60 degrees, 50 degrees, 40 degrees, 30 degrees, 20 degrees, and 10 degrees. In another embodiment, the light source further includes at least one selected from the group: a primary optic, secondary optic, and photonic bandgap region and the angular full-width at half maximum intensity of the light source is less than one selected from 150 degrees, 120 degrees, 100 degrees, 80 degrees, 70 degrees, 60 degrees, 50 degrees, 40 degrees, 30 degrees, 20 degrees, and 10 degrees.

LED Array

In one embodiment, the light emitting device includes a plurality of LEDs or LED packages wherein the plurality of LEDs or LED packages includes an array of LEDs. The array components (LEDs or electrical components) may be physically (and/or electrically) coupled to a single circuit board or they may be coupled to a plurality of circuit boards that may or may not be directly physically coupled (i.e. such as not on the same circuit board). In one embodiment, the array of LEDs is an array including at least two selected from the group: red, green, blue, and white LEDs. In this embodiment, the variation in the white point due to manufacturing or component variations can be reduced. In another embodiment, the LED array includes at least one cool white LED and one red LED. In this embodiment, the CRI, or Color Rendering Index, is higher than the cool white LED illumination alone. In one embodiment, the CRI of at least one selected from the group: a light emitting region, the light emitting surface, light fixture, light emitting device, display driven in a white mode including the light emitting device, and sign is greater than one selected from the group: 70, 75, 80, 85, 90, 95, and 99. In another embodiment, the NIST Color Quality Scale (CQS) of at least one selected from the group: a light emitting region, the light emitting surface, light fixture, light emitting device, display driven in a white mode including the light emitting device, or sign is greater than one selected from the group: 70, 75, 80, 85, 90, 95, and 99. In another embodiment, a display including the light emitting device has a color gamut greater than 70%, 80%, 85%, 90%, 95%, 100%, 105%, 110%, 120%, and 130% that of the NTSC standard. In another embodiment, the LED array includes white, green, and red LEDs. In another embodiment, the LED array includes at least one green and blue LED and two types of red LEDs with one type having a lower luminous efficacy or a lower wavelength than the other type of red LED. As used herein, the white LED may be a phosphor converted blue LED or a phosphor converted UV LED.

In another embodiment, the input array of LEDs can be arranged to compensate for uneven absorption of light through longer verses shorter lightguides. In another embodiment, the absorption is compensated for by directing more light into the light input coupler corresponding to the longer coupling lightguides or longer lightguides. In another embodiment, light within a first wavelength band is absorbed within the lightguide more than light within a second wavelength band and a first ratio of the radiant light flux coupled into the light input coupler within the first wavelength band divided by the radiant light flux coupled into the light input coupler within the second wavelength band is greater than a second ratio of the radiant light flux emitted from the light emitting region within the first wavelength band divided by the radiant light flux emitted from the light emitting region within the second wavelength band.

Laser

In one embodiment, the light emitting device includes one or more lasers disposed to couple light into one or more light input couplers or the surface of one or more coupling lightguides. In one embodiment, the divergence of one or more light sources is less than one selected from the group: 20 milliradians, 10 milliradians, 5 milliradians, 3 milliradians, and 2 milliradians. In another embodiment, the light mixing region includes a light scattering or light reflecting region that increases the angular FWHM of the light from one or more lasers within the light mixing region before entering into the light emitting region of the lightguide or light emitting surface region of the light emitting device. In a further embodiment, the light scattering region within the light mixing region is a volumetric or surface light scattering region with an angular FWHM of transmitted light less than one selected from the group: 50 degrees, 40 degrees, 30 degrees, 20 degrees, 10 degrees, 5 degrees, and 2 degrees when measured normal to the large area surface of the film in the region with a 532 nm laser diode with a divergence less than 5 milliradians. In a further embodiment, the haze of the diffuser in the light mixing region is less than one selected from the group: 50%, 40%, 30%, 20%, 10%, 5%, and 2% when measured normal to the large area surface of the film (such as parallel to the light emitting surface).

Color Tuning

In one embodiment, the light emitting device includes two or more light sources and the relative output of the two light sources is adjusted to achieve a desired color in a light emitting region of the lightguide or an area of light output on the light emitting device including a plurality of lightguides overlapping in the region. For example, in one embodiment, the light emitting device includes a red, green, and blue LED disposed to couple light into the light input surface of a stack of coupling lightguides. The light mixes within the lightguide and is output in a light emitting region of the lightguide. By turning on the red and blue LEDs, for example, one can achieve a purple colored light emitting region. In another embodiment, the relative light output of the light sources is adjusted to compensate for the non-uniform spectral absorption in an optical element of the light emitting device. For example, in one embodiment, the output of the blue LED in milliwatts is increased to a level more than the red output in milliwatts in order to compensate for more blue light absorption in a lightguide (or blue light scattering) such that the light emitting region has a substantially white light output in a particular region.

LED Array Location

In one embodiment, a plurality of LED arrays are disposed to couple light into a single light input coupler or more than one light input coupler. In a further embodiment, a plurality of LEDs disposed on a circuit board are disposed to couple light into a plurality of light input couplers that direct light toward a plurality of sides of a light emitting device including a light emitting region. In a further embodiment, a light emitting device includes an LED array and light input coupler folded behind the light emitting region of the light emitting device such that the LED array and light input coupler are not visible when viewing the center of the light emitting region at an angle perpendicular to the surface. In another embodiment, a light emitting device includes a single LED array disposed to couple light into at least one light input coupler disposed to direct light into the light emitting region from the bottom region of a light emitting device. In one embodiment, a light emitting device includes a first LED array and a second LED array disposed to couple light into a first light input coupler and a second light input coupler, respectively, wherein the first light input coupler and second light input coupler are disposed to direct light into the light emitting region from the top region and bottom region, respectively, of a light emitting device. In a further embodiment, a light emitting device includes a first LED array, a second LED array, and a third LED array, disposed to couple light into a first light input coupler, a second light input coupler, and a third light input coupler, respectively, disposed to direct light into the light emitting region from the bottom region, left region, and right region, respectively, of a light emitting device. In another embodiment, a light emitting device includes a first LED array, a second LED array, a third LED array, and a fourth LED array, disposed to couple light into a first light input coupler, a second light input coupler, a third light input coupler, and a fourth light input coupler, respectively, disposed to direct light into the light emitting region from the bottom region, left region, right region, and top region, respectively, of a light emitting device.

Wavelength Conversion Material

In another embodiment, the LED is a blue or ultraviolet LED combined with a phosphor. In another embodiment, a light emitting device includes a light source with a first activating energy and a wavelength conversion material which converts a first portion of the first activating energy into a second wavelength different than the first. In another embodiment, the light emitting device includes at least one wavelength conversion material selected from the group: a fluorophore, phosphor, a fluorescent dye, an inorganic phosphor, photonic bandgap material, a quantum dot material, a fluorescent protein, a fusion protein, a fluorophores attached to protein to specific functional groups (such as amino groups (active ester, carboxylate, isothiocyanate, hydrazine), carboxyl groups (carbodiimide), thiol (maleimide, acetyl bromide), azide (via click chemistry or non-specifically (glutaraldehyde))), quantum dot fluorophores, small molecule fluorophores, aromatic fluorophores, conjugated fluorophores, a fluorescent dye, and other wavelength conversion material.

In one embodiment, the light source includes a semiconductor light emitter such as an LED and a wavelength conversion material that converts a portion of the light from the emitter to a shorter or longer wavelength. In another embodiment, at least one selected from the group: light input coupler, cladding region, coupling lightguide, input surface optic, coupling optic, light mixing region, lightguide, light extraction feature or region, and light emitting surface includes a wavelength conversion material.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

In one embodiment, the lateral edges of at least one selected from the group: light turning lateral edges of the coupling lightguides, light collimating lateral edges of the coupling lightguides, lateral edges of the coupling lightguides, lateral edges of the lightguide region, lateral edges of the light mixing region, and lateral edges of the light emitting region includes an optical smoothing material disposed at a region of the edge that reduces the surface roughness of the region of the edge in at least one of the lateral direction and thickness direction. In one embodiment, the optical smoothing material fills in gaps, grooves, scratches, pits, digs, flattens regions around protrusions or other optical blemishes such that more light totally internally reflects from the surface from within the core region of the coupling lightguide.

The light input surface may include a surface of the optical element, the surface of an adhesive, the surface of more than one optical element, the surface of the edge of one or more coupling lightguides, or a combination of one or more of the aforementioned surfaces. The light input coupler may also include an optical element that has an opening or window wherein a portion of light from a light source may directly pass into the coupling lightguides without passing through the optical element. The light input coupler or an element or region therein may also include a cladding material or region.

Light Redirecting Optical Element

In one embodiment, a light redirecting optical element is disposed to receive light from at least one light source and redirect the light into a plurality of coupling lightguides. In another embodiment, the light redirecting optical element is at least one selected from the group: secondary optic, mirrored element or surface, reflective film such as aluminized PET, giant birefringent optical films such as Vikuiti™ Enhanced Specular Reflector Film by 3M Inc., curved mirror, totally internally reflecting element, beamsplitter, and dichroic reflecting mirror or film.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane.

In one embodiment, a light emitting device includes a light input coupler and a film-based lightguide. In one embodiment the light input coupler includes a light source and a light collimating optical element disposed to receive light from one or more light sources and provide light output in a first output plane, second output plane orthogonal to the first plane, or in both output planes with an angular full-width at half maximum intensity in air less than one selected from the group: 60 degrees, 40 degrees, 30 degrees, 20 degrees, and 10 degrees from the optical axis of the light exiting the light collimating optical element.

In one embodiment, the collimation or reduction in angular FWHM intensity of the light from the light collimating element is substantially symmetric about the optical axis. In one embodiment, the light collimating optical element receives light from a light source with a substantially symmetric angular FWHM intensity about the optical axis greater than one selected from the group: 50, 60, 70, 80, 90, 100, 110, 120, and 130 degrees and provides output light with an angular FWHM intensity less than one selected from the group: 60, 50, 40, 30, and 20 degrees from the optical axis. For example, in one embodiment, the light collimating optical element receives light from a white LED with an angular FWHM intensity of about 120 degrees symmetric about its optical axis and provides output light with an angular FWHM intensity of about 30 degrees from the optical axis.

The angular full-width at half maximum intensity of the light propagating within the lightguide can be determined by measuring the far field angular intensity output of the lightguide from an optical quality end cut normal to the film surface and calculating and adjusting for refraction at the air-lightguide interface. In another embodiment, the average angular full-width at half maximum intensity of the extracted light from one or more light extraction features or light extraction regions including light extraction features of the film-based lightguide is less than one selected from the group: 50 degrees, 40 degrees, 30 degrees, 20 degrees, 10 degrees, and 5 degrees. In another embodiment, the peak angular intensity of the light extracted from the light extraction feature is within 50 degrees of the surface normal of the lightguide within the region. In another embodiment, the far-field total angular full-width at half maximum intensity of the extracted light from the light emitting region of the film-based lightguide is less than one selected from the group: 50 degrees, 40 degrees, 30 degrees, 20 degrees, 10 degrees, and 5 degrees and the peak angular intensity is within 50 degrees of the surface normal of the lightguide in the light emitting region.

Coupling Lightguides

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with a cross-sectional dimensions of 40.5 millimeters by 0.2 millimeters. In one embodiment, the extended direction of one or more coupling lightguides is the direction in which the one or more coupling lightguides extend from a common base area.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Coupling Lightguide Lateral Edges

In one embodiment, the lateral edges, defined herein as the edges of the coupling lightguide which do not substantially receive light directly from the light source and are not part of the edges of the lightguide region. The lateral edges of the coupling lightguide receive light substantially only from light propagating within the coupling light guide. In one embodiment, the lateral edges are at least one selected from the group: uncoated, coated with a reflecting material, disposed adjacent to a reflecting material, and cut with a specific cross-sectional profile. The lateral edges may be coated, bonded to or disposed adjacent to a specularly reflecting material, partially diffusely reflecting material, or diffuse reflecting material. In one embodiment, the edges are coated with a specularly reflecting ink including nano-sized or micron-sized particles or flakes which substantially reflect the light in a specular manner when the coupling lightguides are brought together from folding or bending. In another embodiment, a light reflecting element (such as a multi-layer mirror polymer film with high reflectivity) is disposed near the lateral edge of at least one region of a coupling lightguide disposed, the multi-layer mirror polymer film with high reflectivity is disposed to receive light from the edge and reflect it and direct it back into the lightguide. In another embodiment, the lateral edges are rounded and the percentage of incident light diffracted out of the lightguide from the edge is reduced. One method of achieving rounded edges is by using a laser to cut the strips, segments or coupling lightguide region from a film and edge rounding through control of the processing parameters (speed of cut, frequency of cut, laser power, etc.). Other methods for creating rounded edges include mechanical sanding/polishing or from chemical/vapor polishing. In another embodiment, the lateral edges of a region of a coupling lightguide are tapered, angled, serrated, or otherwise cut or formed such that light from a light source propagating within the coupling lightguide reflects from the edge such that it is directed into an angle closer to the optical axis of the light source, toward a folded or bent region, or toward a lightguide or lightguide region.

Width of Coupling Lightguides

In one embodiment, the dimensions of the coupling lightguides are substantially equal in width and thickness to each other such that the input surface areas for each edge surface are substantially the same. In another embodiment, the average width of the coupling lightguides, w, is determined by the equation: $w = MF * W_{LES}/NC$, where $W_{LES}$ is the total width of the light emitting surface in the direction parallel to the light entrance edge of the lightguide region or lightguide receiving light from the coupling lightguide, NC is the total number of coupling lightguides in the direction parallel to the light entrance edge of the lightguide region or lightguide receiving light from the coupling lightguide, and MF is the magnification factor. In one embodiment, the magnification factor is one selected from the group: 0.7, 0.8, 0.9, 1, 1.1, 1.2, 1.3, 1.4, 0.7-1.3, 0.8-1.2, and 0.9-1.1. In another embodiment, at least one selected from the group: coupling lightguide width, the largest width of a coupling waveguide, the average width of the coupling lightguides, and the width of each coupling lightguides is selected from a group of: 0.5 mm-1 mm, 1 mm-2 mm, 2 mm-3 mm, 3 mm-4 mm, 5 mm-6 mm, 0.5 mm-2 mm, 0.5 mm-25 mm, 0.5 mm-10 mm, 10-37 mm, and 0.5 mm-5 mm. In one embodiment, at least one selected from the group: the coupling lightguide width, the largest width of a coupling waveguide, the average width of the coupling lightguides, and the width of each coupling lightguides is less than 20 millimeters.

In one embodiment, the ratio of the average width of the coupling lightguides disposed to receive light from a first light source to the average thickness of the coupling lightguides is greater than one selected from the group: 1, 2, 4, 5, 10, 15, 20, 40, 60, 100, 150, and 200. In another embodiment, a low contact area film is placed between the lateral edges of the coupling lightguide and the folded section. In another embodiment, the folded section includes low contact area surface features such that it provides protection without significantly coupling light from the lateral and/or surface areas of the coupling lightguides. In another embodiment, a coupling lightguide includes an adhesive disposed between two regions of the coupling lightguide such that it is adhered to itself and wrapping around a stack of coupling lightguides.

Separation or Gap Between the Coupling Lightguides

In one embodiment, two or more coupling lightguides include a gap between the lightguides in the region where they connect to the lightguide region, lightguide region, or light mixing region. In another embodiment, the lightguides are formed from a manufacturing method wherein gaps between the lightguides are generated. For example, in one embodiment, the lightguides are formed by die cutting a film and the coupling lightguides have a gap between each other. In one embodiment, the gap between the coupling lightguides is greater than one selected from the group: 0.15, 0.25, 0.5, 1, 2, 4, 5, 10, 25, and 50 millimeters. If the gap between the coupling lightguides is very large relative to the coupling lightguide width, then the uniformity of the light emitting region may be reduced (with respect to luminance or color uniformity) in some embodiments if the light mixing region is not sufficiently long in a direction parallel to the optical axis of the light propagating in the lightguide because a side of the lightguide has regions (the gap regions) where light is not entering the lightguide region from coupling lightguides. In one embodiment, a film-based lightguide includes two coupling lightguides wherein the average of the width of the two coupling lightguides divided by the width of the gap between the two coupling lightguides at the region where the two coupling lightguides join the light mixing region or lightguide region is greater than one selected from the group: 0.1, 0.5, 1, 1.5, 2, 4, 6, 10, 20, 40, and 50. In another embodiment, the film-based lightguide has large gaps between the coupling lightguides and a sufficiently long light mixing region to provide the desired level of uniformity. In another embodiment, a film-based lightguide includes two coupling lightguides wherein the width of the gap between the two coupling lightguides divided by the average of the width of the two coupling lightguides at the region where the coupling lightguides join the light mixing region or lightguide region is greater than one selected from the group: 1, 1.5, 2, 4, 6, 10, 20, 40, and 50.

Variable Separation Between Coupling Lightguides

In one embodiment, a first array of coupling lightguides extends from the lightguide region or body of a film-based lightguide and the separation distance between the coupling lightguides at the lightguide region varies. In another embodiment, the separation distance between two or more coupling lightguides along a first side of a lightguide region of a film-based lightguide is greater than the separation distance between two or more coupling lightguides along the side of the lightguide region. In another embodiment, a first pair of coupling lightguides positioned along a side of the lightguide region of the film-based lightguide has a first average length and a first separation distance, and a second pair of coupling lightguides disposed along the side of the lightguide region of the film-based lightguide has a second average length and a second separation distance. In one embodiment, the first average length is less than the second average length and the first separation distance is larger than the second separation distance. In another embodiment, the first average length is greater than the second average length and the first separation distance is larger than the second separation distance. In another embodiment, the separation distance between the coupling lightguides along one side of a lightguide region of a film-based lightguide decreases and the length of the coupling lightguides increases. In another embodiment, the separation distance, taper, and/or average width of two pairs of coupling lightguides vary along a side of a lightguide region from which the two pairs of coupling lightguides extend.

Separation Between the Lightguide Region Edge and the Coupling Lightguide Nearest the Edge In one embodiment, a coupling lightguide nearest the edge of the film-based lightguide is spaced from the edge of the film adjacent the side. For example, in one embodiment, the first coupling lightguide along a side of a film-based lightguide is separated from the edge of the lightguide region by a distance greater than 1 mm). In another embodiment, the first coupling lightguide along a side of a film-based lightguide is separated from the edge of the lightguide region by a distance greater than one selected from the group: 0.5, 1, 2, 4, 6, 8, 10, 20, and 50 millimeters. In one embodiment, the distance between the lightguide region edge and the first coupling lightguide along a side improves the uniformity in the lightguide region due to the light from the first coupling lightguide reflecting from the lateral edge of the lightguide region.

Shaped or Tapered Coupling Lightguides

The width of the coupling lightguides may vary in a predetermined pattern. In one embodiment, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group: 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

The shape of a coupling lightguide is referenced herein from the lightguide region or light emitting region or body of the lightguide. One or more coupling lightguides extending from a side or region of the lightguide region may expand (widen or increase in width) or taper (narrow or decrease in width) in the direction toward the light source. In one embodiment, coupling lightguides taper in one or more regions to provide redirection or partial collimation of the light traveling within the coupling lightguides from the light source toward the lightguide region. In one embodiment, one or more coupling lightguides widens along one lateral edge and tapers along the opposite lateral edge. In this embodiment, the net effect may be that the width remains constant. The widening or tapering may have different profiles or shapes along each lateral side for one or more coupling lightguides. The widening, tapering, and the profile for each lateral edge of each coupling lightguide may be different and may be different in different regions of the coupling lightguide. For example, one coupling lightguide in an array of coupling lightguides may have a parabolic tapering profile on both sides of the coupling lightguides in the region near the light source to provide partial collimation, and at the region starting at about 50% of the length of the coupling lightguides one lateral edge tapers in a linear angle and the opposite side includes a parabolic shaped edge. The tapering, widening, shape of the profile, location of the profile, and number of profiles along each lateral edge may be used to provide control over one or more selected from the group: spatial or angular color uniformity of the light exiting the coupling lightguides into the light mixing region (or light emitting region), spatial or angular luminance uniformity of the light exiting the coupling lightguides into the light mixing region (or light emitting region), angular redirection of light into the light mixing region (or light emitting region) of the lightguide (which can affect the angular light output profile of the light exiting the light emitting region along with the shape, size, and type of light extraction features), relative flux distribution within the light emitting region, and other light redirecting benefits such as, without limitation, redirecting more light toward a second, extending light emitting region.

Interior Light Directing Edge

In one embodiment, the interior region of one or more coupling lightguides includes an interior light directing edge. The interior light directing edge may be formed by cutting or otherwise removing an interior region of the coupling lightguide. In one embodiment, the interior light directed edge redirects a first portion of light within the coupling lightguide. In one embodiment, the interior light directing edges provide an additional level of control for directing the light within the coupling lightguides and can provide light flux redistribution within the coupling lightguide and within the lightguide region to achieve a predetermined light output pattern (such as higher uniformity or higher flux output) in a specific region.

In one embodiment, at least one interior light directing edge is positioned within a coupling lightguide to receive light propagating within the coupling lightguide within a first angular range from the optical axis of light traveling within the coupling lightguide and direct the light to a second, different angular range propagating within the coupling lightguide. In one embodiment, the first angular range is selected from the group: 70-89, 70-80, 60-80, 50-80, 40-80, 30-80, 20-80, 30-70, and 30-60 degrees; and the second angular range is selected from the group: 0-10, 0-20, 0-30, 0-40, 0-50, 10-40, and 20-60 degrees. In one embodiment, a plurality of interior light directing edges are formed after the coupling lightguides are stacked. In another embodiment, one or more coupling lightguides have interior light directing edges that form a channel that spatially separates light traveling within the coupling lightguide. In one embodiment, a length along the optical axis of light travelling within the coupling lightguide of one or more interior light directing edges is greater than one selected from the group: 20%, 30%, 40%, 50%, 60%, 70%, 80%, and 90% of a length from an input surface of the coupling lightguide to the lightguide region or the light mixing region along the optical axis of light traveling within the coupling lightguide. In another embodiment, one or more coupling lightguides have interior light directing edges positioned within one selected from the group: 1, 5, 7, 10, 15, 20, 25 millimeters from the lightguide region of the film-based lightguide. In one embodiment, one or more coupling lightguides have interior light directing edges positioned within one selected from the group: 1, 5, 7, 10, 15, 20, 25 millimeters from the light input surface of the one or more coupling lightguides. In a further embodiment, one or more coupling lightguides have at least one interior light directing edge with a width of the interior light directing edge in a direction parallel to the fold line greater than one selected from the group of: 5, 10, 15, 20, 25, 30, 35, 40, 45, 50, and 60 percent of a width of the coupling lightguide at the lightguide region. In a further embodiment, at least one coupling lightguide has two adjacent interior light directing edges wherein the average separation between the interior light directing edges in a direction parallel to a fold line is greater than one selected from the group of: 5, 10, 15, 20, 25, 30, 35, 40, 45, 50, and 60 percent of the width of the coupling lightguide at the lightguide region.

In another embodiment, at least one coupling lightguide includes a plurality of channels defined by at least one interior light directing edge and a lateral edge of the coupling lightguide. In a further embodiment, the coupling lightguide includes a channel defined by a first interior light directing edge and a second interior light directing edge. In one embodiment, one or more channels defined by interior light directing edges and/or lateral edges of the coupling lightguide separate angular ranges of light from the light source into spatially separated channels that can transfer the spatial separation to the lightguide region. In one embodiment, the channels are parallel to the extended direction of an array of coupling lightguides. In another embodiment, the light source includes a plurality of light emitting diodes formed in an array such that the optical axis of a first light source enters a first channel defined in a coupling lightguide and the optical axis of a second source enters a second channel defined in a coupling lightguide. In one embodiment, one or more interior light directing edges extend from within one or more coupling lightguides into the lightguide region of the lightguide. In another embodiment, the lightguide region has one or more interior light directing edges. In a further embodiment, the lightguide region has one or more interior light directing edges and one or more coupling lightguides include one or more interior light directing edges. In another embodiment, one or more interior light directing edges extend from within one or more coupling lightguides into the light emitting region of the lightguide. In this embodiment, for example, a light source including red, green, and blue light emitting diodes in a linear array adjacent a first, second, and third channel of a plurality of coupling lightguides, respectively can be directed to an alternating first, second, and third pixel region within the light emitting region to create a spatial arrangement of repeating red, green, blue, red, green, blue, red, green, blue color pixels in a light emitting region for a color display or sign. In another embodiment, the interior region of the light mixing region or lightguide region includes at least one interior light directing edge.

Coupling Lightguide Orientation Angle

In a further embodiment, at least one portion of the array of coupling lightguides is disposed at a first coupling lightguide orientation angle to the edge of at least one of the light mixing region and light emitting region which it directs light into. The coupling lightguide orientation angle is defined as the angle between the coupling lightguide axis and the direction parallel to the major component of the direction of the coupling lightguides to the light emitting region of the lightguide. The major component of the direction of the coupling lightguide to the light emitting region of the lightguide is orthogonal to the array direction of the array of coupling lightguides at the light mixing region (or lightguide region if they extend directly from the light emitting region). In one embodiment, the orientation angle of a coupling lightguide or the average orientation angle of a plurality of coupling lightguides is at least one selected from the group: 1-10 degrees, 10-20 degrees, 20-30 degrees, 30-40 degrees, 40-50 degrees, 60-70 degrees, 70-80 degrees, 1-80 degrees, 10-70 degrees, 20-60 degrees, 30-50 degrees, greater than 5 degrees, greater than 10 degrees, and greater than 20 degrees.

Non-Folded Coupling Lightguide

In a further embodiment, the film-based lightguide includes a non-folded coupling lightguide disposed to receive light from the light input surface and direct light toward the lightguide region without turning the light. In one embodiment, the non-folded lightguide is used in conjunction with one or more light turning optical elements, light coupling optical elements, coupling lightguides with light turning edges, or coupling lightguides with collimating edges. For example, a light turning optical element may be disposed above or below a non-folded coupling lightguide such that a first portion of light from a light source substantially maintains the direction of its optical axis while passing through the non-folded coupling lightguide and the light from the source received by the light turning optical element is turned to enter into a stacked array of coupling lightguides. In another embodiment, the stacked array of coupling lightguides includes folded coupling lightguides and a non-folded coupling lightguide.

In another embodiment, the non-folded coupling lightguide is disposed near an edge of the lightguide. In one embodiment, the non-folded coupling lightguide is disposed in the middle region of the edge of the lightguide region. In a further embodiment, the non-folded coupling lightguide is disposed along a side of the lightguide region at a region between the lateral sides of the lightguide region. In one embodiment, the non-folded coupling lightguide is disposed at various regions along one edge of a lightguide region wherein a plurality of light input couplers are used to direct light into the side of a lightguide region.

In another embodiment, the folded coupling lightguides have light collimating edges, substantially linear edges, or light turning edges. In one embodiment, at least one selected from the group: array of folded coupling lightguides, light turning optical element, light collimating optical element, and light source are physically coupled to the non-folded coupling lightguide. In another embodiment, folded coupling lightguides are physically coupled to each other and to the non-folded coupling lightguide by a pressure sensitive adhesive cladding layer and the thickness of the unconstrained lightguide film including the light emitting region and the array of coupling lightguides is less than one of the following: 1.2 times, 1.5 times, 2 times, and 3 times the thickness of the array of coupling lightguides. By bonding the folded coupling lightguides only to themselves, the coupling lightguides (when un-constrained) typically bend upward and increase the thickness of the array due to the folded coupling lightguides not being physically coupled to a fixed or relatively constrained region. By physically coupling the folded coupling lightguides to a non-folded coupling lightguide, the array of coupling lightguides is physically coupled to a separate region of the film which increases the stability and thus reduces the ability of the elastic energy stored from the bend to be released.

Coupling Lightguide Stack

In one embodiment, coupling lightguides extending from a lightguide region in a film-based lightguide are folded at a 90 degree fold angle with their ends stacked. In this embodiment, the radius of curvature for each of the coupling lightguides is different due to the thickness of each of the coupling lightguides. In this embodiment, the radius of curvature for the nth coupling lightguide is determined by the equation:

$$R_n = R_1 + \frac{(n-1)}{2}t,$$

where $R_1$ is an initial (smallest radius) coupling lightguide radius, and t is a thickness of the coupling lightguides.

The coupling lightguide stack can be configured in numerous ways to compensate for the different radii of curvature. In one embodiment, the coupling lightguides have one or more compensation features selected from the group: staggered light input surfaces; coupling lightguides oriented at an angle with respect to each other; varying lateral fold locations; coupling lightguides angled in an oriented stack; non-uniform tension or torsion; a constant fold radius of curvature stack; and other compensation techniques or features.

Sacrificial Coupling Lightguide

In one embodiment, the light input coupler includes a stacked array of coupling lightguides include at least one sacrificial coupling lightguide. In another embodiment, the film-based lightguide includes a sacrificial coupling lightguide on one or both ends in an array of coupling lightguides extending from a lightguide region of the film. In one embodiment, a sacrificial coupling lightguide is folded, stacked, and positioned to couple into the coupling lightguide in a total internal reflection condition a percentage of the total light flux from the light source at the light input coupler selected from the group: 0%, less than 1%, less than 2%, less than 5%, and less than 10%. In this embodiment, for example, a wrap, housing, RPME, or other element of the light emitting device can be physically or optically coupled to the sacrificial lightguide such that the light output of the light emitting device is not substantially reduced due to absorption or scattering of light out of the top or bottom coupling lightguide in a stack of coupling lightguides. In one embodiment, one or two sacrificial coupling lightguides are cut to have a length such that when the array of coupling lightguides are folded and stacked, the distance from the ends of the one or two sacrificial coupling lightguides along the length of the folded, stacked coupling lightguides to the input surface of the remaining coupling lightguides in the array of coupling lightguides is greater than one selected from the group: 1, 2, 5, 10, 15, 20, 40, 50, 100, and 200 millimeters. In this embodiment, the light input surface formed by the end edges of the remaining, non-sacrificial coupling lightguides may be positioned to receive light from the light source and the position of the ends of the one or two sacrificial coupling lightguides and/or a light blocking element disposed between the ends of the sacrificial coupling lightguides and the light source, prevents a significant amount of flux (more than 5%, for example) from entering into the sacrificial coupling lightguides in a total internal reflection condition. In one embodiment, the one or two sacrificial coupling lightguides do not substantially "wet-out" (become optically coupled across the interfaces such that the total internal reflection condition is transferred from the first region into the second region) with their adjacent coupling lightguides in the stack. In this embodiment, an air gap between the one or two sacrificial coupling lightguides can prevent the sacrificial coupling lightguides from transferring or de-coupling the light out of their adjacent coupling lightguides such that a housing, RPME, or light absorbing wrap may be physically coupled, to the sacrificial coupling lightguides (for example, such as a light absorbing black tape wrapped around the stack of coupling lightguides such that it adheres to the top and bottom sacrificial coupling lightguides) without concern of light absorption since the light from the light source is not substantially propagating through the sacrificial coupling lightguides. In one embodiment the width of the sacrificial coupling lightguides are larger than the width of the intermediate coupling lightguides in the stack of coupling lightguides. In this embodiment, the wider width of the sacrificial coupling lightguides can enable an adhesive wrap to extended around and over a top cover region and side cover region of the sacrificial lightguides without contacting one or more lateral edges of the intermediate coupling lightguides (leaving an air gap between the wrap and lateral edges) such that it does not absorb or de-couple light from the top coupling lightguide and the lateral edges of one or more intermediate coupling lightguides because the adhesive of the wrap is not in contact with the top surface of the top coupling lightguide (it may be in contact with the top sacrificial coupling lightguide which does not include a significant light flux, if any) or the lateral edges of the coupling lightguides. In one embodiment the width of the sacrificial coupling lightguides are larger than the widths of the intermediate coupling lightguides in the stack of coupling lightguides and portions of the one or two sacrificial coupling lightguides are bent toward the lateral edges of the remaining coupling lightguides. In this embodiment, for example, the bent regions of the sacrificial coupling lightguides can help prevent wet-out and de-coupling or absorption of light from the top coupling lightguide outer surface and lateral edges of the stack of intermediate coupling lightguides by providing an intermediate, non-wetting out layer that prevents optical coupling of the lateral edges with an element such as a light absorbing wrap adhesive, RPME, housing or other element. In one embodiment, the wider sacrificial coupling lightguides are perforated in a region (such as a linear region defined laterally by the lateral edges of the stack of intermediate coupling lightguides) such that the sacrificial coupling lightguides may be easily bent and a side cover region of their film surfaces are substantially parallel to the lateral edge surfaces of the intermediate coupling lightguides. In one embodiment, one or more surfaces of the sacrificial coupling lightguides may be roughened or include surface relief features, regions, or layers such that the surface relief features are positioned between the one or two sacrificial coupling lightguides and the lateral edges of the intermediate coupling lightguides or the outer (non-lateral edge) surfaces of the outer intermediate coupling lightguides adjacent the one or two sacrificial coupling lightguides.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Width of the Light Mixing Region or Array of Coupling Lightguides

In one embodiment, the length of the array of coupling lightguides and/or the light mixing region is longer than the light emitting region or lightguide region in a direction parallel to the array direction of the coupling lightguides (perpendicular to the extended direction of the array of coupling lightguides). In one embodiment, the array of coupling lightguides and/or the light mixing region extends past a lateral side of the light emitting region in the direction parallel to the array direction of the coupling lightguides (the perpendicular to the extended direction of the coupling lightguides) by a distance selected from the group: greater than 1 millimeter; greater than 2 millimeters; greater than 4 millimeters; greater than 6 millimeters; greater than 10 millimeters; greater than 15 millimeters; greater than 20 millimeters; greater than 50% of the average width of the coupling lightguides; greater than 100% of the average width of the coupling lightguides; and greater than 1%, 2%, 5%, or 10% of the length of the light emitting region in the direction parallel to the array direction of the coupling lightguides. In one embodiment, the array of coupling lightguides or light mixing region extends past the lateral edge of the light emitting region opposite the direction of the fold. In a further embodiment, the array of coupling lightguides or light mixing region extends past the lateral side of the light emitting region in the direction of the fold. In one embodiment, more light can be introduced into the edge region (defined as the region of the light emitting area within 10% of the lateral edge) by extending the array of coupling lightguides past the lateral edge of the light emitting region and/or extending the light mixing region past the lateral edge of the light emitting region. In a further embodiment, a lateral edge of the light mixing region, a lateral edge of one or more coupling lightguides, or an internal light directing edge is oriented at a first extended orientation angle to the extended direction of the coupling lightguides to direct light from the extended region of the array of coupling lightguides or the light mixing region toward the light emitting region of the film-based lightguide. In one embodiment, the first extended orientation angle is greater than one selected from the group: 0, 2, 5, 10, 20, 30, 45, and 60 degrees. For example, in one embodiment, the array of coupling lightguides includes a coupling lightguide that extends past the far lateral edge (the edge furthest from the light source) of the light emitting area and the light mixing region includes a lateral edge with an extended orientation angle of 30 degrees. In this embodiment, the far coupling lightguides are longer in length, and thus more light is absorbed through the material. One method of compensation for the light flux difference reaching the far edge region of the light emitting area due to the longer path length of light traveling toward the far edge region of the light emitting area is to add an additional coupling lightguide that can receive a distributed portion of the light from the light source and direct it into the far edge region of the light emitting area by an angled lateral edge in the extended coupling lightguide, the light mixing region, or an internal light directing edge.

Housing or Holding Device for Light Input Coupler

In one embodiment, a light emitting device includes a housing or holding device that holds or includes at least part of a light input coupler and light source. The housing or holding device may house or contain within at least one selected from the group: light input coupler, light source, coupling lightguides, lightguide, optical components, electrical components, heat sink or other thermal components, attachment mechanisms, registration mechanisms, folding mechanisms devices, and frames. The housing or holding device may include a plurality of components or any combination of the aforementioned components. The housing or holding device may serve one or more of functions selected from the group: protect from dust and debris contamination, provide air-tight seal, provide a water-tight seal, house or contain components, provide a safety housing for electrical or optical components, assist with the folding or bending of the coupling lightguides, assist in the alignment or holding of the lightguide, coupling lightguide, light source or light input coupler relative to another component, maintain the arrangement of the coupling lightguides, recycle light (such as with reflecting inner walls), provide attachment mechanisms for attaching the light emitting device to an external object or surface, provide an opaque container such that stray light does not escape through specific regions, provide a translucent surface for displaying indicia or providing illumination to an object external to the light emitting device, include a connector for release and interchangeability of components, and provide a latch or connector to connect with other holding devices or housings.

In one embodiment, the housing or holding device includes at least one selected from the group: connector, pin, clip, latch, adhesive region, clamp, joining mechanism, and other connecting element or mechanical means to connect or hold the housing or holding device to another housing or holding device, lightguide, coupling lightguide, film, strip, cartridge, removable component or components, an exterior surface such as a window or automobile, light source, electronics or electrical component, circuit board for the electronics or light source such as an LED, heat sink or other thermal control element, frame of the light emitting device, and other component of the light emitting device.

In a another embodiment, the input ends and output ends of the coupling lightguides are held in physical contact with the relative position maintaining elements by at least one selected from the group: magnetic grips, mechanical grips, clamps, screws, mechanical adhesion, chemical adhesion, dispersive adhesion, diffusive adhesion, electrostatic adhesion, vacuum holding, or an adhesive.

Curved or Flexible Housing

In another embodiment, the housing includes at least one curved surface. A curved surface can permit non-linear shapes or devices or facilitate incorporating non-planer or bent lightguides or coupling lightguides. In one embodiment, a light emitting device includes a housing with at least one curved surface wherein the housing includes curved or bent coupling lightguides. In another embodiment, the housing is flexible such that it may be bent temporarily, permanently or semi-permanently. By using a flexible housing, for example, the light emitting device may be able to be bent such that the light emitting surface is curved along with the housing, the light emitting area may curve around a bend in a wall or corner, for example. In one embodiment, the housing or lightguide may be bent temporarily such that the initial shape is substantially restored (bending a long housing to get it through a door for example). In another embodiment, the housing or lightguide may be bent permanently or semi-permanently such that the bent shape is substantially sustained after release (such as when it is desired to have a curved light emitting device to provide a curved sign or display, for example).

Housing Including a Thermal Transfer Element

In one embodiment, the housing includes a thermal transfer element disposed to transfer heat from a component within the housing to an outer surface of the housing. In another embodiment, the thermal transfer element is one selected from the group: heat sink, metallic or ceramic element, fan, heat pipe, synthetic jet, air jet producing actuator, active cooling element, passive cooling element, rear portion of a metal core or other conductive circuit board, thermally conductive adhesive, or other component known to thermally conduct heat. In one embodiment, the thermal transfer element has a thermal conductivity (W/(m·K)) greater than one selected from the group: 0.2, 0.5, 0.7, 1, 3, 5, 50, 100, 120, 180, 237, 300, and 400. In another embodiment, a frame supporting the film-based lightguide (such as one that holds tension in the film to maintain flatness) is a thermal transfer element. In one embodiment, the light source is an LED and the LED is thermally coupled to the ballast or frame that is a thermal transfer element. In a further embodiment, a frame or ballast used to thermally transfer heat away from the light source and is also a housing for the light emitting device.

Low Contact Area Cover

In one embodiment, a low contact area cover is disposed between at least one coupling lightguide and the exterior to the light emitting device. The low contact area cover or wrap provides a low surface area of contact with a region of the lightguide or a coupling lightguide and may further provide at least one selected from the group: protection from fingerprints, protection from dust or air contaminants, protection from moisture, protection from internal or external objects that would decouple or absorb more light than the low contact area cover when in contact in one or more regions with one or more coupling lightguides, provide a means for holding or including at least one coupling lightguide, hold the relative position of one or more coupling lightguides, reflect light back through the lightguide, and prevent the coupling lightguides from unfolding into a larger volume or contact with a surface that could de-couple or absorb light. In one embodiment, the low contact area cover is disposed substantially around one or more coupling lightguide stacks or arrays and provides one or more of the functions selected from the group: reducing the dust buildup on the coupling lightguides, protecting one or more coupling lightguides from frustrated total internal reflection or absorption by contact with another light transmitting or absorbing material, and preventing or limiting scratches, cuts, dents, or deformities from physical contact with other components or assemblers and/or users of the device.

In another embodiment, the low contact area cover is disposed between the outer surface of the light emitting device and the regions of the coupling lightguides disposed between the fold or bend region and the lightguide or light mixing region. In a further embodiment, the low contact area cover is disposed between the outer surface of the light emitting device and the regions of the coupling lightguides disposed between the light input surface of the coupling lightguides and the lightguide or light mixing region. In another embodiment, the low contact area cover is disposed between the outer surface of the light emitting device and a portion of the regions of the coupling lightguides not enclosed by a housing, protective cover, or other component disposed between the coupling lightguides and the outer surface of the light emitting device. In one embodiment, the low contact area cover is the housing, relative position maintaining element, or a portion of the housing or relative positioning maintaining element. In one embodiment, the low contact area surface feature is a protrusion from a film, material, or layer. In another embodiment, the low contact area cover or wrap is disposed substantially around the light emitting device.

Film-Based Low Contact Area Cover

In one embodiment the low contact area cover is a film with at least one of a lower refractive index than the refractive index of the outer material of the coupling lightguide disposed near the low contact area cover, and a surface relief pattern or structure on the surface of the film-based low contact area cover disposed near at least one coupling lightguide. In one embodiment, the low contact area includes convex or protruding surface relief features disposed near at least one outer surface of at least one coupling lightguide and the average percentage of the area disposed adjacent to an outer surface of a coupling lightguide or the lightguide that is in physical contact with the surface relief features is less than one of the following: 70%, 50%, 30%, 10%, 5%, and 1%. In another embodiment, the low contact area cover includes surface relief features adjacent and in physical contact with a region of the film-based lightguide and the percentage of the region of the film-based lightguide (or light mixing region, or coupling lightguides) in contact with the low contact area cover is less than one of the following: 70%, 50%, 30%, 10%, 5%, and 1%. In another embodiment, the low contact area cover includes surface relief features adjacent a region of the film-based lightguide and the percentage of the area of the surface relief features that contact a region of the film-based lightguide (or light mixing region, or coupling lightguides) when a uniform planar pressure of 7 kilopascals is applied to the low contact area cover is less than one of the following: 70%, 50%, 30%, 10%, 5%, and 1%. In one embodiment, the low contact area cover is a surface relief diffuser disposed in a backlight on the side of the film-based lightguide opposite the light emitting side of the backlight such that the surface relief features are in contact with the film-based lightguide. In one embodiment, the film-based lightguide is physically coupled to the low contact area cover that is physically coupled to a rigid support or the housing of a backlight.

In one embodiment, a convex surface relief profile designed to have a low contact area with a surface of the coupling lightguide will at least one selected from the group: extract, absorb, scatter, and otherwise alter the intensity or direction of a lower percentage of light propagating within the coupling lightguide than a flat surface of the same material. In one embodiment, the surface relief profile is at least one selected from the group: random, semi-random, ordered, regular in one or 2 directions, holographic, tailored, include cones, truncated polyhedrons, truncated hemispheres, truncated cones, truncated pyramids, pyramids, prisms, pointed shapes, round tipped shapes, rods, cylinders, hemispheres, and other geometrical shapes. In one embodiment, the low contact area cover material or film is at least one selected from the group: transparent, translucent, opaque, light absorbing, light reflecting, substantially black, substantially white, has a diffuse reflectance specular component included greater than 70%, has a diffuse reflectance specular component included less than 70%, has an ASTM D1003 luminous transmittance less than 30%, has an ASTM D1003 luminous transmittance greater than 30%, absorbs at least 50% of the incident light, absorbs less than 50% of the incident light, has an electrical sheet resistance less than 10 ohms per square, and has an electrical sheet resistance greater than 10 ohms per square. In one embodiment, low contact area material has a diffuse reflectance measured in the di/0 geometry according to ASTM E 1164-07 and ASTM E 179 greater than one selected from the group: 70%, 80%, 85%, 90%, 95%, and 95%.

In another embodiment, the low contact area cover is a film with a thickness less than one selected from the group: 600 microns, 500 microns, 400 microns, 300 microns, 200 microns, 100 microns, and 50 microns.

In another embodiment, the low contact area cover includes a material with an effective refractive index less than the core layer due to microstructures and/or nanostructures. For example, in one embodiment, the low contact area includes an aerogel or arrangement of nano-structured materials disposed on a film that have an effective refractive index less than the core layer in the region near the core layer. In one embodiment, the nano-structured material includes fibers, particles, or domains with an average diameter or dimension in the plane parallel to the core layer surface or perpendicular to the core layer surface less than one selected from the group: 1000, 500, 300, 200, 100, 50, 20, 10, 5, and 2 nanometers. For example, in one embodiment, the low contact area cover is a coating or material including nanostructured fibers, including polymeric materials such as, without limitation, cellulose, polyester, PVC, PTFE, polystyrene, PMMA, PDMS, or other light transmitting or partially light transmitting materials. In one embodiment, the low contact area is a paper or similar sheet or film (such as a filter paper) including fibrous, micro-structured, or nano-structured materials or surfaces. In one embodiment, the low contact area material is a woven material. In another embodiment, the low contact area material is non-woven material. In another embodiment, the low contact area cover is a substantially transparent or translucent light transmitting film that includes "macro" surface features with average dimensions greater than 5 microns that have micro-structured, nanostructured, or fibrous materials or surface features disposed on or within the outer regions of the "macro" surface features. In one embodiment, the "macro"

surface features have an average dimension in a first direction parallel to the core surface or perpendicular to the core surface greater than one selected from the group: 5, 10, 15, 20, 30, 50, 100, 150, 200, and 500 microns and the microstructured, nanostructured, or fibrous materials or surface features have an average dimension in the first direction less than one selected from the group: 20, 10, 5, 2, 1, 0.5, 0.3, 0.1, 0.05, and 0.01 microns.

In this embodiment, the "macro" surface features can be patterned into a surface (such as by extrusion embossing or UV cured embossing) and the outer regions (outermost surfaces of the protruded regions that would be in contact with the core layer) can remain, be formed, coated, roughened, or otherwise modified to include micro-structured, nanostructured, or fibrous materials or surface features such that when in contact with the core layer couple less light out of the core layer due to the smaller surface area in contact with the core layer. In one embodiment, by only coating the tips of the "macro" protrusions, for example, less nanostructured material is needed than coating the entire low contact area film or a planar film and the "valleys" or areas around the "macro" protrusions may be light transmitting, transparent, or translucent. In another embodiment, the micro-structured, nanostructured, or fibrous materials or surface features disposed on or within the "macro" surface features create an effective lower refractive index region that functions as a cladding layer. In one embodiment, the low contact area cover extracts less than one selected from the group: 30%, 20%, 10%, 5%, 2%, and 1% of the light from the core region in at least one region (or the entire region) of contact with the core layer or region adjacent the core layer. In another embodiment, the low contact area cover extracts more than one selected from the group: 1%, 5%, 10%, 15%, and 20% of the light from the lightguide in the light emitting region.

In one embodiment, the low contact area includes standoffs, posts, or other protrusions that provide a separation distance between the low contact area cover and the core layer. In one embodiment, the standoffs, posts, or other protrusions are disposed in one or more regions of the low contact area cover selected from the group: the region adjacent the light emitting region, the region adjacent the surface opposite the light emitting surface, the region adjacent the light mixing region, the region adjacent the light input coupler, the region adjacent the coupling lightguides, in a pattern on one surface of the low contact area cover, and in a pattern on both surfaces of the low contact area cover. In one embodiment, the standoffs, posts, or other protrusions of the low contact area cover have an average dimension in a direction parallel to the surface of the core layer or perpendicular to the core layer greater than one selected from the group: 5, 10, 20, 50, 100, 200, 500, and 1000 microns. In another embodiment, the aspect ratio (the height divided by the average width in the plane parallel to the core surface) is greater than one selected from the group: 1, 2, 5, 10, 15, 20, 50, and 100.

In another embodiment, the low contact area cover is physically coupled to the lightguide or core layer in one or more regions selected from the group: an area around the light emitting region of the lightguide, a periphery region of the lightguide that emits less than 5% of the total light flux emitted from the lightguide, a region of the housing of the input coupler, a cladded layer or region, a standoff region, a post region, a protrusions region, a "macro" surface feature region, a nano-structured feature region, a micro-structured feature region, and a plateau region disposed between valley regions by one or more selected from the group: chemical bonds, physical bonds, adhesive layer, magnetic attraction, electrostatic force, van der Waals force, covalent bonds, and ionic bonds. In another embodiment, the low contact area cover is laminated to the core layer.

In one embodiment, the low contact area cover is a sheet, film, or component including one or more selected from the group: paper, fibrous film or sheet, cellulosic material, pulp, low-acidity paper, synthetic paper, flashspun fibers, flashspun high-density polyethylene fibers, and a micro-porous film. In another embodiment, the film material of the low contact area cover or the area of the low contact area cover in contact with the core layer of the lightguide in the light emitting region includes a material with a bulk refractive index or an effective refractive index in a direction parallel or perpendicular to the core surface less than one selected from the group: 1.6, 1.55, 1.5, 1.45, 1.41, 1.38, 1.35, 1.34, 1.33, 1.30, 1.25, and 1.20.

Wrap Around Low Contact Area Cover

In a further embodiment, the low contact area cover is the inner surface or physically coupled to a surface of a housing, holding device, or relative position maintaining element. In a further embodiment, the low contact area cover is a film which wraps around at least one coupling lightguide such that at least one lateral edge and at least one lateral surface is substantially covered such that the low contact area cover is disposed between the coupling lightguide and the outer surface of the device.

In another embodiment, a film-based lightguide includes a low contact area cover wrapped around a first group of coupling lightguides wherein the low contact area cover is physically coupled to at least one selected from the group: lightguide, lightguide film, light input coupler, lightguide, housing, and thermal transfer element by a low contact area cover physical coupling mechanism. In another embodiment, the light emitting device includes a first cylindrical tension rod disposed to apply tension to the low contact area cover film and hold the coupling lightguides close together and close to the lightguide such that the light input coupler has a lower profile. In another embodiment, the low contact area cover can be pulled taught after physically coupling to at least one selected from the group: lightguide, lightguide film, light input coupler, lightguide, housing, thermal transfer element, and other element or housing by moving the first cylindrical tension rod away from a second tension bar or away from a physical coupling point of the mechanism holding the tension bar such as a brace. Other shapes and forms for the tension forming element may be used such as a rod with a rectangular cross-section, a hemispherical cross-section, or other element longer in a first direction capable of providing tension when translated or supporting tension when held stationary relative to other components. In another embodiment, a first cylindrical tension rod may be translated in a first direction to provide tension while remaining in a brace region and the position of the cylindrical tension rod may be locked or forced to remain in place by tightening a screw for example. In another embodiment, the tension forming element and the brace or physical coupling mechanism for coupling it to the another component of the light input coupler does not extend more than one selected from the group: 1 millimeter, 2 millimeters, 3 millimeters, 5 millimeters, 7 millimeters and 10 millimeters past at least one edge of the lightguide in the direction parallel to the longer dimension of the tension forming element.

In one embodiment, the low contact area cover substantially wraps around the film-based lightguide in one or more planes. In another embodiment, the low contact area cover substantially wraps around the film-based lightguide and one or more light input couplers. For example, in one embodiment the low contact area cover wraps around two input couplers disposed along opposite sides of a film based lightguide and the light emitting region of the lightguide disposed between the light input couplers. The other edges of the low contact cover may be sealed, bonded, clamped together or another material or enclosing method may seal or provide a barrier at the opposite edges to prevent dust or dirt contamination, for example. In this embodiment, for example, a backlight may include a substantially air-tight sealed film-based lightguide (and sealed coupling lightguides within the light input coupler) that does not have one or more cladding regions and is substantially protected from scratches or dust during assembly or use that could cause non-uniformities or reduce luminance or optical efficiency.

Properties of the Wrap Around the Coupling Lightguides

In one embodiment, a wrap includes a low contact area cover wrapped around at least one surface of a stack of coupling lightguides. In another embodiment, the wrap includes a material wrapped around the RPME. In one embodiment, the wrap is a low contact area cover. In a further embodiment, the wrap is a material or film that extends across at least one surface of a stack of coupling lightguides.

In one embodiment, the wrap has a Young's modulus less than one selected from the group: 10, 8, 6, 4, 2, 1, 0.5, and 0.1 gigapascals. In another embodiment, the wrap can be sufficiently stretched around the stack of coupling lightguides such that it conforms to one or more of the outer surfaces of the stack under tension in the wrapping operation. In another embodiment, the wrap is plastically deformable. In one embodiment, the wrap material has a yield strength in one or more regions less than one selected from the group: 200, 100, 90, 75, 50, 40, 30, 20, and 10 megapascals. In one embodiment, the wrap has perforations in one or more regions that reduce the yield strength in those regions. For example, in one embodiment, the wrap material is a thin aluminum sheet with one or more linear perforations corresponding to one or more corners of the stack of coupling lightguides such that the aluminum sheet may be easily bent around one or more corners of the stack. In one embodiment, the wrap material includes one or more materials selected from the group: tape, metal sheet, aluminum sheet, stainless steel sheet, copper sheet, cellulose, polymer film, silicone, polyethylene, polypropylene, polyester, polycarbonate, polymethyl methacrylate, polyimide, fluoropolymer, polymethyl pentene, elastomer, and a rubber. In one embodiment, the wrap material is non-homogeneous. For example, in one embodiment, the wrap includes a region including a pressure sensitive adhesive and one or more regions without a pressure sensitive adhesive. For example, in one embodiment, the region of the wrap corresponding to the regions adjacent the lateral edges of the stack of coupling lightguides does not have an adhesive in order to prevent or reduce light coupling from the edges into the wrap material. In one embodiment, the wrap is a stamped metal or plastic component. In this embodiment, the stamped metal or plastic component may include one or more curved edges to prevent the edge from cutting or tearing the lightguide. In one embodiment, the wrap includes a metal and dissipates heat from one or more light sources, an intermediate element thermally coupled to the light source (such as a metal core substrate to which an LED is thermally coupled), one or more coupling lightguides, the lightguide region, the light mixing region, an optical element, a heat sink, a heat pipe, or a thermally conductive element in the light emitting device.

In another embodiment, the wrap includes one or more alignment holes. The alignment holes may be used, for example, to align the wrap with the film-based lightguide, the stack of coupling lightguides, or an intermediate component that is physical coupled (and possibly registered) to the lightguide. In another embodiment, the wrap includes one or more tabs that facilitate the holding and/or wrapping of the wrap material. In one embodiment, the tab regions are perforated such that they may be removed after the wrap material is wrapped around the stack of coupling lightguides, or folded behind or in front of a region of the wrap or light emitting device (and possibly adhered to the region). In one embodiment the wrap material is separated from one or more lateral edges of the coupling lightguides along at least one side of a stack of coupling lightguides by an air gap. In one embodiment, the air gap allows more light to propagate through the coupling lightguides without coupling into and/or being absorbed into the wrap material. In one embodiment, the wrap couples out light (and possibly absorbs the light) propagating within the coupling lightguides, light mixing region, or lightguide region at high angles from the optical axis that would be coupled directly into a display and create a non-uniform bright region if the film based lightguide was adhered to the display using an adhesive with a similar or lower refractive index as the adhesive material of the wrap. In another embodiment, the wrap provides one or more of the following functions: protection of one or more surfaces of the coupling lightguides or film-based lightguide from scratches or dust or other material contamination; holding the stack of coupling lightguides together and/or holding one or more coupling lightguide in a position relative to a region of the film-based lightguide; and absorbing stray light from the light source, or stray or undesired reflection or transmission out of one or more coupling lightguides or regions of the lightguide.

In one embodiment, the wrap is a conformal coating or material. For example, in one embodiment the wrap is a conformal low refractive index silicone coating that is coated over at least one surface of at least one light input coupler element selected from the group: one or more coupling lightguides, the stack of coupling lightguides, the RPME, the light source, a light collimating optical element, a circuit board for the light source, and the housing of the light input coupler. In one embodiment, the conformal material is molded onto one or more surfaces of the one or more of the aforementioned light input coupler elements. For example, in one embodiment, the wrap is a low refractive index conformal fluoropolymer coating spray coated or dip coated onto one or more of the aforementioned light input coupler elements, such as the stack of coupling lightguides. In another embodiment, the conformal wrap material is vacuum thermoformed or injection molded onto the surface of one or more of the aforementioned light input coupler elements. In another embodiment, the wrap includes a UV curable material that is vacuum pulled into a mold around one or more light input coupler elements and subsequently cured or cross-linked by heat or UV radiation. In one embodiment, one or more side walls or surfaces of the mold is defined by an inner surface region of the housing for the light input coupler. For example, in one embodiment, a black plastic light input coupler housing with an opening or gate is positioned around the stack of coupling lightguides and a low refractive index silicone wrap material flows through the aperture or gate and substantially fills the interior volume and subsequently cures, hardens, or sets. In another embodiment, in addition to providing a wrap function, the injected conformal coating material forms a light collimating optical element or a light redirecting optical element positioned between the light source and the light input surface. In one embodiment, a portion of the housing, the light input coupler, or a removable mold provides the mold (or a portion of the mold) for the optical element formed from the wrap material.

In one embodiment, after the wrap material is wrapped around the stack of coupling lightguides, the RPME is removed. In one embodiment, the adhesive strength or modulus of the wrap is sufficient to hold the stack of coupling lightguides together. In one embodiment, the mold for a conformal coating maintains the relative positions of the stack of coupling lightguides after the RPME is removed while the coating is injected into the mold (or a material is vacuum thermoformed over the stack, for example). In one embodiment, the wrap material maintains the relative positions of the coupling lightguides after curing, solidifying, or wrapping. In one embodiment, the stack of coupling lightguides comprise an adhesive in contact with at least one outer surface and the wrap is adhered to one or more coupling lightguides using the adhesive. In one embodiment, the wrap comprises a thin metal bent around at least two sides of the stack of coupling lightguides. In one embodiment, the wrap comprises a thin sheet of metal (such as a sheet of aluminum less than 0.4 mm thick) bent around four sides of the stack of coupling lightguides. In this embodiment, the wrap may comprise physical attachment features that enable it to be physically coupled to the relative position maintaining element such as holes in the sheet metal that can snap over protrusions in the relative position maintaining element or extensions in the sheet metal that extend outward from a slot in the relative position maintaining element.

In one embodiment, the wrap includes a polymer and an adhesive or a metal and adhesive. In another embodiment, the wrap includes a flat lower surface, a flat upper surface, and two or more connecting supports between the upper surface and the lower surface along one or both sides adjacent the lateral edges of the stacked array of coupling lightguides. In one embodiment, the connecting supports have a curved surface region positioned adjacent the lateral edges of the stack of coupling lightguides such that the area of contact is minimized. In one embodiment, the connecting supports are rod shaped. In another embodiment, the connecting supports have a polygonal, arcuate, semicircular, annulus, or a portion of an annulus cross-sectional shape.

Low Hardness Low Contact Area Cover

In another embodiment, the low contact area cover has an ASTM D3363 pencil hardness under force from a 300 gram weight less than the outer surface region of the coupling lightguide disposed near the low contact area cover. In one embodiment, the low contact area cover includes a silicone, polyurethane, rubber, or thermoplastic polyurethane with a surface relief pattern or structure. In a further embodiment, the ASTM D3363 pencil hardness under force from a 300 gram weight of the low contact area cover is at least 2 grades less than the outer surface region of the coupling lightguide disposed near the low contact area cover. In another embodiment, the low contact area cover has an ASTM D 3363 pencil hardness less than one selected from the group: 5H, 4H, 3H, 2H, H, and F.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, $n_m$, of the surface to which it is optically coupled. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides.

In one embodiment, the cladding is one selected from the group: methyl based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E-Ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive.

In one embodiment, the cladding region is optically coupled to one or more surfaces of the light mixing region to prevent out-coupling of light from the lightguide when it is in contact with another component. In this embodiment, the cladding also enables the cladding and light mixing region to be physically coupled to another component.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide and the cladding material is not disposed on one or more coupling lightguides. In one embodiment, the coupling lightguides do not include a cladding layer between the core regions in the region near the light input surface or light source. In another embodiment, the core regions may be pressed or held together and the edges may be cut and/or polished after stacking or assembly to form a light input surface or a light turning edge that is flat, curved, or a combination thereof. In another embodiment, the cladding layer is a pressure sensitive adhesive and the release liner for the pressure sensitive adhesive is selectively removed in the region of one or more coupling lightguides that are stacked or aligned together into an array such that the cladding helps maintain the relative position of the coupling lightguides relative to each other. In another embodiment, the protective liner is removed from the inner cladding regions of the coupling lightguides and is left on one or both outer surfaces of the outer coupling lightguides.

In one embodiment, a cladding layer is disposed on one or both opposite surfaces of the light emitting region and is not disposed between two or more coupling lightguides at the light input surface. For example, in one embodiment, a mask layer is applied to a film based lightguide corresponding to the end regions of the coupling lightguides that will form the light input surface after cutting (and possibly the coupling lightguides) and the film is coated on one or both sides with a low refractive index coating. In this embodiment, when the mask is removed and the coupling lightguides are folded (using, for example a relative position maintaining element) and stacked, the light input surface can includes core layers without cladding layers and the light emitting region can include a cladding layer (and the light mixing region may also include a cladding and/or light absorbing region), which is beneficial for optical efficiency (light is directed into the cladding at the input surface) and in applications such as film-based frontlights for reflective or transflective displays where a cladding may be desired in the light emitting region.

In another embodiment, the protective liner of at least one outer surface of the outer coupling lightguides is removed such that the stack of coupling lightguides may be bonded to one of the following: a circuit board, a non-folded coupling lightguide, a light collimating optical element, a light turning optical element, a light coupling optical element, a flexible connector or substrate for a display or touchscreen, a second array of stacked coupling lightguides, a light input coupler housing, a light emitting device housing, a thermal transfer element, a heat sink, a light source, an alignment guide, a registration guide or component including a window for the light input surface, and any suitable element disposed on and/or physically coupled to an element of the light input surface or light emitting device. In one embodiment, the coupling lightguides do not include a cladding region on either planar side and optical loss at the bends or folds in the coupling lightguides is reduced. In another embodiment, the coupling lightguides do not include a cladding region on either planar side and the light input surface input coupling efficiency is increased due to the light input surface area having a higher concentration of lightguide received surface relative to a lightguide with at least one cladding.

In one embodiment, the cladding on at least one surface of the lightguide is applied (such as coated or co-extruded) and the cladding on the coupling lightguides is subsequently removed. In a further embodiment, the cladding applied on the surface of the lightguide (or the lightguide is applied onto the surface of the cladding) such that the regions corresponding to the coupling lightguides do not have a cladding. For example, the cladding material could be extruded or coated onto a lightguide film in a central region wherein the outer sides of the film will include coupling lightguides. Similarly, the cladding may be absent on the coupling lightguides in the region disposed in close proximity to one or more light sources or the light input surface.

In one embodiment, two or more core regions of the coupling lightguides do not include a cladding region between the core regions in a region of the coupling lightguide disposed within a distance selected from the group: 1 millimeter, 2 millimeters, 4 millimeters, and 8 millimeters from the light input surface edge of the coupling lightguides. In a further embodiment, two or more core regions of the coupling lightguides do not include a cladding region between the core regions in a region of the coupling lightguide disposed within a distance selected from the group: 10%, 20%, 50%, 100%, 200%, and 300% of the combined thicknesses of the cores of the coupling lightguides disposed to receive light from the light source from the light input surface edge of the coupling lightguides. In one embodiment, the coupling lightguides in the region proximate the light input surface do not include cladding between the core regions (but may include cladding on the outer surfaces of the collection of coupling lightguides) and the coupling lightguides are optically coupled together with an index-matching adhesive or material or the coupling lightguides are optically bonded, fused, or thermo-mechanically welded together by applying heat and pressure. In a further embodiment, a light source is disposed at a distance to the light input surface of the coupling lightguides less than one selected from the group: 0.5 millimeter, 1 millimeter, 2 millimeters, 4 millimeters, and 6 millimeters and the dimension of the light input surface in the first direction parallel to the thickness direction of the coupling lightguides is greater than one selected from the group: 100%, 110%, 120%, 130%, 150%, 180%, and 200% the dimension of the light emitting surface of the light source in the first direction. In another embodiment, disposing an index-matching material between the core regions of the coupling lightguides or optically coupling or boding the coupling lightguides together in the region proximate the light source optically couples at least one selected from the group: 10%, 20%, 30%, 40%, and 50% more light into the coupling lightguides than would be coupled into the coupling lightguides with the cladding regions extending substantially to the light input edge of the coupling lightguide. In one embodiment, the index-matching adhesive or material has a refractive index difference from the core region less than one selected from the group: 0.1, 0.08, 0.05, and 0.02. In another embodiment, the index-matching adhesive or material has a refractive index greater by less than one selected from the group: 0.1, 0.08, 0.05, and 0.02 the refractive index of the core region. In a further embodiment, a cladding region is disposed between a first set of core regions of coupling lightguides for a second set of coupling lightguides an index-matching region is disposed between the core regions of the coupling lightguides or they are fused together. In a further embodiment, the coupling lightguides disposed to receive light from the geometric center of the light emitting area of the light source within a first angle of the optical axis of the light source have cladding regions disposed between the core regions, and the core regions at angles larger than the first angle have index-matching regions disposed between the core regions of the coupling lightguides or they are fused together. In one embodiment, the first angle is selected from the group: 10 degrees, 20 degrees, 30 degrees, 40 degrees, 50 degrees, and 60 degrees. In the aforementioned embodiments, the cladding region may be a low refractive index material or air. In a further embodiment, the total thickness of the coupling lightguides in the region disposed to receive light from a light source to be coupled into the coupling lightguides is less than n times the thickness of the lightguide region where n is the number of coupling lightguides. In a further embodiment, the total thickness of the coupling lightguides in the region disposed to receive light from a light source to be coupled into the coupling lightguides is substantially equal to n times the thickness of the lightguide layer within the lightguide region.

Cladding Thickness

In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns.

In a total internal reflection condition, the penetration depth, $\lambda_e$ of the evanescent wave light from the denser region into the rarer medium from the interface at which the amplitude of the light in the rarer medium is 1/e that at the boundary is given by the equation:

$$\lambda_e = \frac{\lambda_0}{2\pi[(n_s^2(\sin\vartheta_i)^2) - n_e^2]^{\frac{1}{2}}}$$

where $\lambda_0$ is the wavelength of the light in a vacuum, $n_s$ is the refractive index of the denser medium (core region) and $n_e$ is the refractive index of the rarer medium (cladding layer) and $\theta_i$ is the angle of incidence to the interface within the denser medium. The equation for the penetration depth illustrates that for many of the angular ranges above the critical angle, the light propagating within the lightguide does not need a very thick cladding thickness to maintain the lightguide condition. For example, light within the visible wavelength range of 400 nanometers to 700 nanometers propagating within a silicone film-based core region of refractive index 1.47 with a fluoropolymer cladding material with a refractive index of 1.33 has a critical angle at about 65 degrees and the light propagating between 70 degrees and 90 degrees has a 1/e penetration depth, $\lambda_e$, less than about 0.3 microns. In this example, the cladding region thickness can be about 0.3 microns and the lightguide will significantly maintain visible light transmission in a lightguide condition from about 70 degrees and 90 degrees from the normal to the interface. In another embodiment, the ratio of the thickness of the core layer to one or more cladding layers is greater than one selected from the group: 2, 4, 6, 8, 10, 20, 30, 40, and 60 to one. In one embodiment, a high core to cladding layer thickness ratio where the cladding extends over the light emitting region and the coupling lightguides enables more light to be coupled into the core layer at the light input surface because the cladding regions represent a lower percentage of the surface area at the light input surface.

In one embodiment, the cladding layer includes an adhesive such as a silicone-based adhesive, acrylate-based adhesive, epoxy, radiation curable adhesive, UV curable adhesive, or other light transmitting adhesive.

Cladding Layer Materials

Fluoropolymer materials may be used as a low refractive index cladding material and may be broadly categorized into one of two basic classes. A first class includes those amorphous fluoropolymers including interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers that can be used in embodiments are, for example, VDF-chlorotrifluoroethylene copolymers. One such VDF-chlorotrifluoroethylene copolymer is commercially known as Kel-F™ 3700, available from 3M Company. As used herein, amorphous fluoropolymers are materials that include essentially no crystallinity or possess no significant melting point as determined for example by differential scanning calorimetry (DSC). For the purpose of this discussion, a copolymer is defined as a polymeric material resulting from the simultaneous polymerization of two or more dissimilar monomers and a homopolymer is a polymeric material resulting from the polymerization of a single monomer.

The second significant class of fluoropolymers useful in an embodiment are those homo and copolymers based on fluorinated monomers such as TFE or VDF which have a crystalline melting point such as polyvinylidene fluoride (PVDF, available commercially from 3M company as Dyneon™ PVDF, or more preferable thermoplastic copolymers of TFE such as those based on the crystalline microstructure of TFE-HFP-VDF. Examples of such polymers are those available from 3M under the trade name Dyneon™ Fluoroplastics THV™ 200.

In one embodiment, the cladding material is birefringent and the refractive index in at least a first direction is less than refractive index of the lightguide region, lightguide core, or material to which it is optically coupled.

Collimated light propagating through a material may be reduced in intensity after passing through the material due to scattering (scattering loss coefficient), absorption (absorption coefficient), or a combination of scattering and absorption (attenuation coefficient). In one embodiment, the cladding includes a material with an average absorption coefficient for collimated light less than one selected from the group: 0.03 cm$^{-1}$, 0.02 cm$^{-1}$, 0.01 cm$^{-1}$, and 0.005 cm$^{-1}$ over the visible wavelength spectrum from 400 nanometers to 700 nanometers. In another embodiment, the cladding includes a material with an average scattering loss coefficient for collimated light less than one selected from the group: 0.03 cm$^{-1}$, 0.02 cm$^{-1}$, 0.01 cm$^{-1}$, and 0.005 cm$^{-1}$ over the visible wavelength spectrum from 400 nanometers to 700 nanometers. In another embodiment, the cladding includes a material with an average attenuation coefficient for collimated light less than one selected from the group: 0.03 cm$^{-1}$, 0.02 cm$^{-1}$, 0.01 cm$^{-1}$, and 0.005 cm$^{-1}$ over the visible wavelength spectrum from 400 nanometers to 700 nanometers.

In a further embodiment, a lightguide includes a hard cladding layer that substantially protects a soft core layer (such as a soft silicone or silicone elastomer).

In one embodiment, a lightguide includes a core material with a Durometer Shore A hardness (JIS) less than 50 and at least one cladding layer with a Durometer Shore A hardness (JIS) greater than 50. In one embodiment, a lightguide includes a core material with an ASTM D638-10 Young's Modulus less than 2 MPa and at least one cladding layer with an ASTM D638-10 Young's Modulus greater than 2 MPa at 25 degrees Celsius. In another embodiment, a lightguide includes a core material with an ASTM D638-10 Young's Modulus less than 1.5 MPa and at least one cladding layer with an ASTM D638-10 Young's Modulus greater than 2 MPa at 25 degrees Celsius. In a further embodiment, a lightguide includes a core material with an ASTM D638-10 Young's Modulus less than 1 MPa and at least one cladding layer with an ASTM D638-10 Young's Modulus greater than 2 MPa at 25 degrees Celsius.

In one embodiment, a lightguide includes a core material with an ASTM D638-10 Young's Modulus less than 2 MPa and the lightguide film has an ASTM D638-10 Young's Modulus greater than 2 MPa at 25 degrees Celsius. In another embodiment, a lightguide includes a core material with an ASTM D638-10 Young's Modulus less than 1.5 MPa and the lightguide film has an ASTM D638-10 Young's Modulus greater than 2 MPa at 25 degrees Celsius. In one embodiment, a lightguide includes a core material with an ASTM D638-10 Young's Modulus less than 1 MPa and the lightguide film has an ASTM D638-10 Young's Modulus greater than 2 MPa at 25 degrees Celsius.

In another embodiment, the cladding includes a material with an effective refractive index less than the core layer due to microstructures or nanostructures. In another embodiment, the cladding layer includes an a porous region including air or other gas or material with a refractive index less than 1.2 such that the effective refractive index of the cladding layer is than that of the material around the porous regions. For example, in one embodiment, the cladding layer is an aerogel or arrangement of nano-structured materials disposed on the core layer that creates a cladding layer with an effective refractive index less than the core layer. In one embodiment, the nano-structured material includes fibers, particles, or domains with an average diameter or dimension in the plane parallel to the core layer surface or perpendicular to the core layer surface less than one selected from the group: 1000, 500, 300, 200, 100, 50, 20, 10, 5, and 2 nanometers. For example, in one embodiment, the cladding layer is a coating including nanostructured fibers, including polymeric materials such as, without limitation, cellulose, polyester, PVC, PTFE, polystyrene, PMMA, PDMS, or other light transmitting or partially light transmitting materials. In another embodiment, materials that normally scatter too much light in bulk form (such as HDPE or polypropylene) to be used as a core or cladding material for lightguide lengths greater than 1 meter (such as scattering greater than 10% of the light out of the lightguide over the 1 meter length) are used in a nanostructured form. For example, in one embodiment, the nanostructured cladding material on the film based lightguide, when formed into a bulk solid form (such as a 200 micron thick homogeneous film formed without mechanically formed physical structures volumetrically or on the surface under film processing conditions designed to minimize haze substantially) has an ASTM haze greater than 0.5%.

In a further embodiment, the microstructured or nanostructured cladding material includes a structure that will "wet-out" or optically couple light into a light extraction feature disposed in physical contact with the microstructured or nanostructured cladding material. For example, in one embodiment, the light extraction feature includes nanostructured surface features that when in close proximity or contact with the nanostructured cladding region couple light from the cladding region. In one embodiment, the microstructured or nanostructured cladding material has complementary structures to the light extraction feature structures, such as a male-female part or other simple or complex complementary structures such that the effective refractive index in the region including the two structures is larger than that of the cladding region without the light extraction features.

Layers or Regions on Opposite Sides of the Lightguide of Materials with Higher and Lower Refractive Indexes In one embodiment, a light emitting region of the film-based lightguide comprises: a first layer or coating of a first material with a first refractive index optically coupled to a first surface of the film-based lightguide in the light emitting region, a second layer or coating of a second material with a second refractive index optically coupled to the opposite surface of the film-based lightguide in the light emitting region, the second refractive index higher than the first refractive index, the second refractive index and the first refractive index less than the refractive index of the material in the core region of the lightguide. In this embodiment, light propagating within the core layer or region of the film-based lightguide in the light emitting region that undergoes a low angle light redirection, such as by a low angle directing feature, will preferentially leak or exit the lightguide on the side with the second refractive index since it is higher than the first refractive index and the critical angle is higher. In this embodiment, light deviating from angles higher than the critical angle to smaller angles from the thickness direction of the film will first pass the total internal reflection interface on the side of the core layer or region optically coupled to the cladding layer or region with the higher refractive index.

Lightguide Configuration and Properties

In one embodiment, the thickness of the film, light redirecting optical element, reflective display, lightguide, and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters.

Optical Properties of the Lightguide or Light Transmitting Material

With regards to the optical properties of lightguides, light redirecting optical element or region, light extraction film or region, or light transmitting materials for certain embodiments, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide).

Refractive Index of the Light Transmitting Material

In one embodiment, the core material of the lightguide has a higher refractive index than the cladding material. In one embodiment, the core is formed from a material with a refractive index ($n_D$) greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index ($n_D$) of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Surface Quality of Lightguide Core or Cladding

In one embodiment, the lightguide core and/or cladding region has an optical quality surface finish and the loss in light flux propagating through the lightguide due to the surface finish of the core region or a cladding region is less than one selected from the group: 1%, 2%, 5%, 10%, 20%, 30%, and 40%. The loss in light flux propagating through the lightguide due to surface finish can be measured by optically index-matching with a fluid a rigid planar element with an optically flat surface finish to the core region or cladding region and measuring the difference in the amount of light flux reaching the end of the newly created lightguide relative to the lightguide without the index matched optically smooth surface finish using an integrating sphere. In this method, the index matching fluid and the rigid planar element with an optically smooth surface finish are optically non-scattering, optically homogenous, have refractive indices within 0.001 units of the core or cladding region to which they are optically coupled, and have low absorption relative to the core and/or cladding material (any low absorption effects can be calculated and accounted for by using the cutback method). In this method, the optically smooth surface finish of the rigid planar element has a surface finish with at least one of the following properties: an arithmetic mean roughness parameter, Ra (DIN 4768 standard method), of 50 nanometers or less; a scratch-dig less than 80 units, and a flatness value (peak to valley) less than 50 nanometers.

In one embodiment, the optical quality surface finish is a surface with one or more of the following surface properties: an arithmetic mean roughness parameter, Ra (DIN 4768 standard method), less than 500, 200, 100, or 50 nanometers; a flatness value (peak to valley) less than 500, 200, 100, or 50 nanometers; an RMS slope of the profile within the sampling length, R$\Delta$q, less than 1, 0.8, 0.6, 0.4, 0.2, 0.1, and 0.005 milliradians; and an ASTM D523-08 gloss at 20 degrees greater than 80, 90, 100, 110, 120, and 130 gloss units.

In another embodiment, the average haze of the lightguide measured within at least one selected from the group: the light emitting region, the light mixing region, and the lightguide measured with a BYK Gardner haze meter is less than one selected from the group: 70%, 60%, 50%, 40%, 30%, 20%, 10%, 5% and 3%. In another embodiment, the average clarity of the lightguide measured within at least one selected from the group: the light emitting region, the light mixing region, and the lightguide according to the measurement procedure associated with ASTM D1003 with a BYK Gardner haze meter is greater than one selected from the group: 70%, 80%, 88%, 92%, 94%, 96%, 98%, and 99%.

The effects of the surface roughness on the light propagating within the lightguide depend upon the number of surface reflections occurring during the propagation. In one embodiment, the average number of surface reflections from the top and bottom surfaces of the film-based lightguide for light traveling within the central coupling lightguide (or average of the two central coupling lightguides) from the center of the coupling lightguide light input surface to the closest light extraction feature in the light emitting region is greater than one selected from the group: $1\times10^2$, $1\times10^3$, $1\times10^4$, $1\times10^5$, $1\times10^6$, $1\times10^7$, $1\times10^8$, $1\times10^9$, and $1\times10^{10}$. The average number of reflections can be calculated using optical modeling software and averaging over the range of light propagation angles due to the incident light source output profile and position taking into account the proportional angular distribution of the flux and the optical properties of the lightguide core and cladding (which could be air), and any intermediate optics such as collimating lenses or reflectors. In one embodiment, the reduced thickness of the lightguide core region in a film-based lightguide increases the surface reflections and increases the requirements for a low surface roughness.

Edges of the Lightguide

In one embodiment, the edges of the lightguide or lightguide region are coated, bonded to or disposed adjacent to a specularly reflecting material, partially diffusely reflecting material, or diffuse reflecting material. In one embodiment, the lightguide edges are coated with a specularly reflecting ink including nano-sized or micron-sized particles or flakes which reflect the light substantially specularly. In another embodiment, a light reflecting element (such as a specularly reflecting multi-layer polymer film with high reflectivity) is disposed near the lightguide edge and is disposed to receive light from the edge and reflect it and direct it back into the lightguide. In another embodiment, the lightguide edges are rounded and the percentage of light diffracted from the edge is reduced. One method of achieving rounded edges is by using a laser to cut the lightguide from a film and achieve edge rounding through control of the processing parameters (speed of cut, frequency of cut, laser power, etc.). In another embodiment, the edges of the lightguide are tapered, angled serrated, or otherwise cut or formed such that light from a light source propagating within the coupling lightguide reflects from the edge such that it is directed into an angle closer to the optical axis of the light source, toward a folded region, toward a bent region, toward a lightguide, toward a lightguide region, or toward the optical axis of the light emitting device. In a further embodiment, two or more light sources are disposed to each couple light into two or more coupling lightguides including light re-directing regions for each of the two or more light sources that include first and second reflective surfaces which direct a portion of light from the light source into an angle closer to the optical axis of the light source, toward a folded or bent region, toward a lightguide region, toward a lightguide region, or toward the optical axis of the light emitting device. In one embodiment, one or more edges of the coupling lightguides, the lightguide, the light mixing region, or the lightguide region include a curve or arcuate profile in the region of intersection between two or more surfaces of the film in a region.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes. In one embodiment, the lightguide is a film formed into a shape by thermoforming or other suitable forming techniques. In another embodiment, the film or region of the film is tapered in at least one direction. In a further embodiment, a light emitting device includes a plurality of lightguides and a plurality of light sources physically coupled or arranged together (such as tiled in a 1×2 array for example). In another embodiment, the surface of the lightguide region of the film is substantially in the shape of a polygon, triangle, rectangle, square, trapezoid, diamond, ellipse, circle, semicircle, segment or sector of a circle, crescent, oval, annulus, alphanumeric character shaped (such as "U-shaped" or "T-shaped), or a combination of one or more of the aforementioned shapes. In another embodiment, the shape of the lightguide region of the film is substantially in the shape of a polyhedron, toroidal polyhedron, curved polyhedron, spherical polyhedron, rectangular cuboid, cuboid, cube, orthotope, stellation, prism, pyramid, cylinder, cone, truncated cone, ellipsoid, paraboloid, hyperboloid, sphere, or a combination of one or more of the aforementioned shapes.

Thickness of the Lightguide

In one embodiment, the thickness of the film, lightguide, lightguide region, and/or light emitting region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, greater than 90% of the entire thickness of the film, a lightguide, and a lightguide region is less than 0.2 millimeters. In one embodiment, the separation between the two surfaces of the core layer or region of the lightguide in the light emitting region deviates from the average separation by less than one selected from the group of 30%, 20%, 10%, and 5% of the average separation. In another embodiment, the separation distance between the two surfaces defining the total internal reflection surfaces for the lightguide within the light emitting region deviates from the average separation distance by less than one selected from the group of 30%, 20%, 10%, and 5% of the average separation distance. In one embodiment, the average angle between the two surfaces defining the total internal reflection surfaces for the lightguide within the light emitting region is less than one selected from the group of 10, 8, 6, 5, 4, 3, 2, 1 and 0.5 degrees.

In one embodiment, the light emitting region tapers from a first thickness at a first side of the light emitting region receiving light from the light mixing region and/or the light input coupler to a second thickness less than the first thickness at an opposite side of the light emitting region along the direction of propagation of the light within the core region or layer of the lightguide in the light emitting region. In one embodiment, the average angle of the taper, the average angle between the two opposite layer surfaces or regions of the core layer of the lightguide from the first side to the second side, is less than one selected from the group 10, 8, 6, 5, 4, 3, 2, 1, and 0.5 degrees.

In another embodiment the light emitting region comprises one or more regions or layers optically coupled to the core region of the film-based lightguide that increase the effective thickness of the lightguide defined by the interfaces that define the total internal reflection of light propagating from the first end to the opposite end of the lightguide in the light emitting region. In another embodiment, the ratio of the average thickness of the light emitting region defined by the interfaces that define the total internal reflection of light propagating from the first end to the opposite end of the light emitting region to the average thickness of the light mixing region is greater than one or more selected from the group: 1, 2, 5, 10, 15, 20, 25, 30, 40, and 50. In another embodiment the light emitting region comprises one or more regions or layers optically coupled to the core region of the film-based lightguide that increase the effective thickness of the lightguide defined by the interfaces that define the total internal reflection of light propagating lightguide from the first end to the opposite end of the light emitting region.

In another embodiment, a light emitting device (such as a frontlight for a reflective display, for example) comprises a film-based lightguide with the surfaces of the film defining a first lightguide and the first lightguide is optically coupled to a light redirecting optical element or other film and one or more surfaces of the light redirecting optical element or other film in combination with a surface of the first lightguide define a second lightguide, wherein the second lightguide may comprise the first lightguide. In this embodiment, the ratio of the average thickness of the light emitting region defined by the interfaces that define the total internal reflection of light propagating from the first end to the opposite end of the light emitting region of the second lightguide or first lightguide to the average thickness of the light mixing region or the film is greater than one or more selected from the group: 1, 2, 5, 10, 15, 20, 25, 30, 40, and 50. In another embodiment, the ratio of the largest dimension of the light emitting area of the first lightguide or second lightguide in a plane orthogonal to the thickness direction of the light emitting surface or region of the light emitting surface (parallel to a surface of the core layer) to the average thickness of the first lightguide or second lightguide in the light emitting region is greater than one or more selected from the group: 1, 2, 5, 10, 15, 20, 25, 30, 40, 50.100, 200, 300, 500, 700, 1000, and 2000.

In one embodiment, a reflective display comprises a lightguide wherein an effective thickness of the lightguide bounded by total internal reflection interfaces is increased for totally internally reflected light within the core layer that is frustrated by the plurality of light extraction features such that it passes through the first cladding layer and totally internally reflects at one of the total internal reflection interfaces of a light redirecting optical element. In another embodiment, a light emitting device comprises a first lightguide having a core layer having opposing surfaces with a thickness not greater than about 0.5 millimeters therebetween, the first lightguide defined by the opposing surfaces guiding light by total internal reflection, and a second lightguide comprising the core layer, the second lightguide defined by a second portion of the frustrated totally internally reflected light from the first lightguide propagating by total internal reflection between a surface of the first lightguide and an area of the surface of the light redirecting optical element between the light redirecting features. In a further embodiment, a first lightguide and a second lightguide comprise the core layer, the second lightguide defined by a portion of the frustrated totally internally reflected light from the first lightguide propagating by total internal reflection between a surface of the first lightguide and an area of a surface of the light redirecting optical element, wherein the light redirecting features of a light redirecting optical element occupy less than 50% of the surface of the light redirecting optical element, the area of the surface of the light redirecting element is defined between the light redirecting features and reflects by total internal reflection a second portion of the frustrated totally internally reflected light from the light extraction features back through a first cladding layer and into a core layer of the first lightguide where it totally internally reflects from the surface of the first lightguide and is subsequently reflected by a light redirecting feature toward a reflective spatial light modulator.

Lightguide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins (e.g., homopolyesters, for example, polyalkylene terephthalates such as polyethylene terephthalate and polybutylene terephthalate, polyalkylene naphthalates corresponding to the polyalkylene terephthalates; copolyesters including an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

Lightguide Material with Adhesive Properties

In another embodiment, the lightguide includes a material with at least one selected from the group: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film). In a further embodiment, at least one of the core material or cladding material of the lightguide is an adhesive material. In a further embodiment, at least one selected from the group: core material, cladding material, and a material disposed on a cladding material of the lightguide is at least one selected from the group: a pressure sensitive adhesive, a contact adhesive, a hot adhesive, a drying adhesive, a multi-part reactive adhesive, a one-part reactive adhesive, a natural adhesive, and a synthetic adhesive. In a further embodiment, the first core material of a first coupling lightguide is adhered to the second core material of a second coupling lightguide due to the adhesion properties of the first core material, second core material, or a combination thereof. In another embodiment, the cladding material of a first coupling lightguide is adhered to the core material of a second coupling lightguide due to the adhesion properties of the cladding material. In another embodiment, the first cladding material of a first coupling lightguide is adhered to the second cladding material of a second coupling lightguide due to the adhesion properties of the first cladding material, second cladding material, or a combination thereof. In one embodiment, the core layer is an adhesive and is coated onto at least one selected from the group: cladding layer, removable support layer, protective film, second adhesive layer, polymer film, metal film, second core layer, low contact area cover, and planarization layer. In another embodiment, the cladding material or core material has adhesive properties and has an ASTM D3330 Peel strength greater than one selected from the group: 8.929, 17.858, 35.716, 53.574, 71.432, 89.29, 107.148, 125.006, 142.864, 160.722, 178.580 kilograms per meter of bond width when adhered to an element of the light emitting device, such as for example without limitation, a cladding layer, a core layer, a low contact area cover, a circuit board, or a housing.

In another embodiment, a tie layer, primer, or coating is used to promote adhesion between at least one selected from the group: core material and cladding material, lightguide and housing, core material and element of the light emitting device, cladding material and element of the light emitting device. In one embodiment, the tie layer or coating includes a dimethyl silicone or variant thereof and a solvent. In another embodiment, the tie layer includes a phenyl based primer such as those used to bridge phenylsiloxane-based silicones with substrate materials. In another embodiment, the tie layer includes a platinum-catalyzed, addition-cure silicone primer such as those used to bond plastic film substrates and silicone pressure sensitive adhesives.

In a further embodiment, at least one region of the core material or cladding material has adhesive properties and is optical coupled to a second region of the core or cladding material such that the ASTM D1003 luminous transmittance through the interface is at least one selected from the group: 1%, 2%, 3%, and 4% greater than the transmission through the same two material at the same region with an air gap disposed between them.

In one embodiment, the core material of the lightguide includes a material with a critical surface tension less than one selected from the group: 33, 32, 30, 27, 25, 24 and 20 mN/m. In another embodiment, the core material has a critical surface tension less than one selected from the group: 33, 30, 27, 25, 24 and 20 mN/m and is surface treated to increase the critical surface tension to greater than one selected from the group: 27, 30, 33, 35, 37, 40, and 50. In one embodiment, the surface treatment includes exposing the surface to at least one selected from the group: a plasma, a flame, and a tie layer material. In one embodiment, the surface tension of the core material of the lightguide is reduced to reduce light extraction from a surface in contact due to "wet-out" and optical coupling. In another embodiment, the surface tension of the surface of the lightguide Multilayer Lightguide In one embodiment, the lightguide includes at least two layers or coatings. In another embodiment, the layers or coatings function as at least one selected from the group: a core layer, a cladding layer, a tie layer (to promote adhesion between two other layers), a layer to increase flexural strength, a layer to increase the impact strength (such as Izod, Charpy, Gardner, for example), and a carrier layer. In a further embodiment, at least one layer or coating includes a microstructure, surface relief pattern, light extraction features, lenses, or other non-flat surface features which redirect a portion of incident light from within the lightguide to an angle whereupon it escapes the lightguide in the region near the feature. For example, the carrier film may be a silicone film with embossed light extraction features disposed to receive a thermoset polycarbonate resin core region including a thermoset material In one embodiment, a thermoset material is coated onto a thermoplastic film wherein the thermoset material is the core material and the cladding material is the thermoplastic film or material. In another embodiment, a first thermoset material is coated onto a film including a second thermoset material wherein the first thermoset material is the core material and the cladding material is the second thermoset plastic.

Environmental Properties

In one embodiment, the light emitting device, display, lightguide, component of the light emitting device, or assembly of components of the light emitting device (including the adhesives, hardcoating layers, substrates, film-based lightguide, for example) has one or more environmental properties selected from the group: shrinkage or elongation less than 5% at a temperature of 80 degrees Celsius; maintains correct light propagation at air pressures greater than 100 pounds per square inch or less than 7 pounds per square inch; and a yellowness index of less than 0.1, 0.3, 0.5, 0.7, or 1 measured using the ASTM D1925 standard after exposure to 5-sun UV light (300-400 nm) from a solar simulator at a black panel temperature (BPT) of 44±2 degrees Celsius for 100 hours. In one embodiment, the light emitting device includes a layer, coating, or material that substantially absorbs UV-A and/or UV-B wavelengths to reduce UV degradation or yellowing of one or more layers or materials. In another embodiment, the UV absorbing materials is physically or optically coupled to (or defined within) a cladding layer or material (including an adhesive, for example) on the viewing side of the display.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micron long, 45 degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. For example, the light extraction feature may be a substantially specularly reflecting ink disposed at an angle (such as coated onto a groove) or the light extraction feature may be a substantially diffusely reflective ink such as an ink including titanium dioxide particles within a methacrylate-based binder. In one embodiment, the thin lightguide film permits smaller features to be used for light extraction features or light extracting surface features to be spaced further apart due to the thinness of the lightguide. In one embodiment, the average largest dimensional size of the light extracting surface features in the plane parallel to the light emitting surface corresponding to a light emitting region of the light emitting device is less than one selected from the group of 3 mm, 2 mm, 1 mm, 0.5 mm, 0.25 mm, 0.1 mm, 0.080, 0.050 mm, 0.040 mm, 0.025 mm, and 0.010 mm.

In another embodiment, the fill factor of the light extracting features, light turning features, or low angle directing features defined as the percentage of the area comprising the features in a square centimeter in a light emitting region, surface or layer of the lightguide or film, is one selected from the group of less than 80%, less than 70%, less than 60%, less than 50%, less than 40%, less than 30%, less than 20%, and less than 10%. The fill factor can be measured within a full light emitting square centimeter surface region or area of the lightguide or film (bounded by region is all directions within the plane of the lightguide which emit light) or it may be the average of the light emitting areas of the lightguides. The fill factor may be measured when the light emitting device is in the on state or in the off state (not emitting light) where in the off state, the light extracting features are defined as visual discontinuities seen by a person with average visual acuity at a distance of less than 10 cm.

The light extraction region may comprise volumetric scattering regions having dispersed phase domains, voids, absence of other materials or regions (gaps, holes), air gaps, boundaries between layers and regions, and other refractive index discontinuities within the volume of the material different than co-planar layers with parallel interfacial surfaces. In one embodiment, the light extracting region comprises angled or curved surface or volumetric light extracting features that redirect a first redirection percentage of light into an angular range within 5 degrees of the normal to the light emitting surface of the light emitting device or within 80-90 or 85-90 degrees from the direction normal to the light emitting surface of the light emitting device. In another embodiment, the first redirection percentage is greater than one selected from the group of 5, 10, 20, 30, 40, 50, 60, 70, 80, and 90. In one embodiment, the light extraction features are light redirecting features, light extracting regions, or light output coupling features.

In one embodiment, the lightguide or lightguide region comprises light extraction features in a plurality of regions. In one embodiment, the lightguide or lightguide region comprises light extraction features on or within at least one selected from the group of one outer surface, two outer surfaces, two outer and opposite surfaces, an outer surface and at least one region disposed between the two outer surfaces, within two different volumetric regions substantially within two different volumetric planes parallel to at least one outer surface or light emitting surface or plane, within a plurality of volumetric planes. In another embodiment, a light emitting device comprises a light emitting region on the lightguide region of a lightguide comprising more than one region of light extraction features. In another embodiment, one or more light extraction features are disposed on top of another light extraction feature. For example, grooved light extraction features could comprise light scattering hollow microspheres which may increase the amount of light extracted from the lightguide or which could further scatter or redirect the light that is extracted by the grooves. More than one type of light extraction feature may be used on the surface, within the volume of a lightguide or lightguide region, or a combination thereof.

In one embodiment, a first lightguide including a film layer comprises light extraction features, a second lightguide is defined by a surface of a light redirecting optical element and a surface of the first lightguide, and the light redirecting optical element comprises light redirecting features or light turning features that are also light extraction features for the second lightguide.

In a further embodiment, the light extraction features are grooves, indentations, curved, or angled features that redirect a portion of light incident in a first direction to a second direction within the same plane through total internal reflection. In another embodiment, the light extraction features redirect a first portion of light incident at a first angle into a second angle greater than the critical angle in a first output plane and increase the angular full width at half maximum intensity in a second output plane orthogonal to the first. In a further embodiment, the light extraction feature is a region comprising a groove, indentation, curved or angled feature and further comprises a substantially symmetric or isotropic light scattering region of material such as dispersed voids, beads, microspheres, substantially spherical domains, or a collection of randomly shaped domains wherein the average scattering profile is substantially symmetric or isotropic. In a further embodiment, the light extraction feature is a region comprising a groove, indentation, curved or angled feature and further comprises a substantially anisotropic or asymmetric light scattering region of material such as dispersed elongated voids, stretched beads, asymmetrically shaped ellipsoidal particles, fibers, or a collection of shaped domains wherein the average scattering profile is substantially asymmetric or an isotropic. In one embodiment, the Bidirectional Scattering Distribution Function (BSDF) of the light extraction feature is controlled to create a predetermined light output profile of the light emitting device or light input profile to a light redirecting element.

In one embodiment, at least one light extraction feature is an array, pattern or arrangement of a wavelength conversion material selected from the group of a fluorophore, phosphor, a fluorescent dye, an inorganic phosphor, photonic bandgap material, a quantum dot material, a fluorescent protein, a fusion protein, a fluorophores attached to protein to specific functional groups, quantum dot fluorophores, small molecule fluorophores, aromatic fluorophores, conjugated fluorophores, and a fluorescent dye scintillators, phosphors such as Cadmium sulfide, rare-earth doped phosphor, and other known wavelength conversion materials.

In one embodiment, the light extraction feature is a specularly, diffusive, or a combination thereof reflective material. For example, the light extraction feature may be a substantially specularly reflecting ink disposed at an angle (such as coated onto a groove) or it may be a substantially diffusely reflective ink such as an ink comprising titanium dioxide particles within a methacrylate-based binder (white paint). Alternatively, the light extraction feature may be a partially diffusively reflecting ink such as an ink with small silver particles (micron or sub-micron, spherical or non-spherical, plate-like shaped or non-plate-like shaped, or silver (or aluminum) coated onto flakes) further comprising titanium dioxide particles. In another embodiment, the degree of diffusive reflection is controlled to optimize at least one of the angular output of the device, the degree of collimation of the light output, and the percentage of light extracted from the region.

The pattern or arrangement of light extraction features may vary in size, shape, pitch, location, height, width, depth, shape, orientation, in the x, y, or z directions. Patterns and formulas or equations to assist in the determination of the arrangement to achieve spatial luminance or color uniformity are known in the art of edge-illuminated backlights. In one embodiment, a light emitting device comprises a film-based lightguide comprising light extraction features disposed beneath lenticules wherein the light extraction features are substantially arranged in the form of dashed lines beneath the lenticules such that the light extracted from the line features has a lower angular FHWM intensity after redirection from the lenticular lens array light redirecting element and the length of the dashes varies to assist with the uniformity of light extraction. In another embodiment, the dashed line pattern of the light extraction features varies in the x and y directions (where the z direction is the optical axis of the light emitting device). Similarly, a two-dimensional microlens array film (close-packed or regular array) or an arrangement of microlenses may be used as a light redirecting element and the light extraction features may comprise a regular, irregular, or other arrangement of circles, ellipsoidal shapes, or other pattern or shape that may vary in size, shape, or position in the x direction, y direction, or a combination thereof. In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density of the low angle directing features in the first and/or second direction is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In another embodiment, the low angle directing features are light extraction features for a first lightguide and a second lightguide. In another embodiment, the light emitting device comprises low angle directing features in two or more layers or regions in the direction of the light output of the light emitting device.

Low Angle Directing Features

In one embodiment, at least one of the coupling lightguides, light mixing region, or light emitting region comprises two or more low angle directing features. As used herein, low angle directing features are refractive, total internal reflection, diffractive, or scattering surfaces, features, or interfaces that redirect light propagating within a totally internally reflecting lightguide at a first angle to the thickness direction of the film in the core region of the lightguide to a second angle in the core region of the lightguide smaller than the first angle by an average total angle of deviation of less than 20 degrees. In another embodiment, the low angle directing features redirect incident light to a second angle with an average total angle of deviation less than one selected from the group 18, 16, 14, 12, 10, 8, 6, 5, 4, 3, 2, and 1 degrees from the angle of incidence. In one embodiment, the low angle directing features are defined by one or more reflective surfaces of the reflective spatial light modulator. For example, in one embodiment, the rear reflective surface of a reflective spatial light modulator comprises low angle directing features and the reflective spatial light modulator is optically coupled to the lightguide in the light emitting region. In another example, the reflective pixels of a reflective spatial light modulator are low angle directing features and the reflective spatial light modulator is optically coupled to the lightguide in the light emitting region.

In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In a further embodiment, the light redirecting features are low angle directing features. In another embodiment, the low angle directing features are light extraction features for a first lightguide and a second lightguide. In another embodiment, the light emitting device comprises low angle directing features in two or more layers or regions in the direction of the light output of the light emitting device.

In one embodiment, the light redirecting element has a refractive index less than or equal to the refractive index of the core layer of the film-based lightguide. For example, in one embodiment a reflective display comprises a frontlight having a light redirecting element formed in a polycarbonate material with a refractive index of about 1.6 that is optically coupled to a polycarbonate lightguide with a refractive index of about 1.6 using an adhesive functioning as a cladding layer with a refractive index of about 1.5 where the lightguide comprises low angle directing features that are light extracting features for the film-based lightguide and the lightguide is optically coupled to a reflective spatial light modulator on a side opposite the light redirecting optical element using an adhesive that functions as a cladding with a refractive index of about 1.42.

In one embodiment, a light emitting device comprises a film-based lightguide comprising a core layer having opposing surfaces with a thickness not greater than about 0.5 millimeters therebetween wherein light propagates by total internal reflection between the opposing surfaces; a first cladding layer having a first side optically coupled to the core layer and an opposing second side; an array of coupling lightguides continuous with a lightguide region of the lightguide, each coupling lightguide of the array of coupling lightguides terminates in a bounding edge, and each coupling lightguide is folded in a fold region such that the bounding edges of the array of coupling lightguides are stacked; a light emitting region comprising a plurality of light extraction features arranged in a pattern that varies spatially in the light emitting region, the plurality of light extraction features frustrate totally internally reflected light propagating within the core layer such that light exits the core layer in the light emitting region into the first cladding layer; a light source positioned to emit light into the stacked bounding edges, the light propagating within the array of coupling lightguides to the lightguide region, with light from each coupling lightguide combining and totally internally reflecting within the lightguide region; a light redirecting optical element optically coupled to the second side of the first cladding layer, the light redirecting optical element comprising light redirecting features that direct frustrated totally internally reflected light from the light extraction features toward the reflective spatial light modulator, the light redirecting features occupy less than 50% of a surface of the light redirecting optical element in the light emitting region, and wherein the core layer has an average thickness in the light emitting region, the light emitting region has a largest dimension in a plane of the light emitting region orthogonal to the thickness direction of the core layer, the largest dimension of the light emitting region divided by the average thickness of the core layer in the light emitting region is greater than 100, the light extraction features are low angle directing features, the light exiting the light source has a first full angular width at half maximum intensity in a plane orthogonal to the thickness direction of the film, the light exiting the light emitting device has second full angular width at half maximum intensity in a second plane parallel to the thickness direction and a third full angular width at half maximum intensity in a third plane parallel to the thickness direction of the film and orthogonal to the second plane. In one embodiment, the first full angular width is less than one selected from the group: 1, 2, 5, 7, 10, 15, 20, 25, 30, 35, 40, 45, and 50 degrees. In another embodiment, the second full angular width is less than one selected from the group: 1, 2, 5, 7, 10, 15, 20, 25, 30, 35, 40, 45, and 50 degrees. In another embodiment, the third full angular width is less than one selected from the group: 1, 2, 5, 7, 10, 15, 20, 25, 30, 35, 40, 45, and 50 degrees. In another embodiment, the first, second, and third full angular widths are each less than one selected from the group 1, 2, 5, 7, 10, 15, 20, 25, 30, 35, 40, 45, and 50 degrees. In one embodiment, the light exiting the light source has a full angular width at half maximum intensity in a plane parallel to the thickness direction of the film greater than the first full angular width. For example, in one embodiment, a light source is substantially collimated in a plane perpendicular to the thickness direction of the lightguide, film, or stack of coupling lightguides, in the light emitting region (or has a first angular width at half maximum intensity less than 10 degrees) and is not collimated or has a larger full angular width at half maximum intensity in the plane parallel to the thickness direction of the film or stack of coupling lightguides. In one embodiment, light from the light sources passes through the coupling lightguides and into the lightguide region, it is redirected by the low angle directing features, passes through the first cladding layer, is redirected by the light redirecting optical element and exits the light emitting device with second angular full width at half maximum intensity that can be low (such as less than 10 degrees) due to the collimation of the light source output (such as by a primary and/or secondary lens or reflector) and a third angular full width at half maximum intensity that can be low (such as less than 10 degrees) due to the collimation from the combination of the low angle directing features, the difference in refractive index between the two cladding layers, and the light redirecting features of the light redirecting optical element.

Reflecting Low Angle Directing Features

In one embodiment, a film-based lightguide comprises a light emitting region with low angle directing features defined by angled or curved interfaces between materials with two different refractive indexes. In this embodiment, the refractive index difference can cause at least a portion of the incident light to be reflected with an average total angle of deviation less than 20 degrees from the angle of incidence. In one embodiment, light propagating within a core region of a lightguide of a first core material with a first core refractive index adjacent a region with a second refractive index less than the first refractive index interacts and reflects from angled surface features embossed into the first core material such that at least a portion of the incident light is reflected with an average total angle of deviation less than 20 degrees from the angle of incidence. In one embodiment, the reflection at the angled or curved surface feature is a total internal reflection. For example, in one embodiment, a film-based lightguide comprises a light emitting region with low angle directing features defined by an arrangement of linear surface features angled at an average of 4 degrees from the direction parallel to the film surface (or core region layer interface) in the light emitting region (an average of 86 degrees from the surface normal of the film in the light emitting region). In this example, the surfaces can be formed (such as by scribing or embossing) in the core layer of material and a material with a lower refractive index may be positioned adjacent the surface such that a portion of the light incident on the surface is reflected (low angle directed) at a total angle of deviation of 8 degrees.

Refractive Low Angle Directing Features

In another example, a film-based lightguide comprises a light emitting region with low angle directing features defined by an arrangement of surfaces wherein light passing through the surface is refracted (and optionally reflected) at least once to a new angle with an average total angle of deviation less than 20 degrees from the angle of incidence. In this example, the surfaces can be formed in the core layer of material and have a material with a lower refractive index adjacent the surface such that a portion of the light incident on the surface is refracted (low angle directed) at the interface, passes through the lower refractive index material and reflects off a second interface, passes back through the lower refractive index material and back through the lightguide where it may escape the lightguide at the opposite surface interface and be subsequently redirected by light turning features.

Diffracting Low Angle Directing Features

In another example, a film-based lightguide comprises a light emitting region with low angle directing features defined by an arrangement of diffractive features or surfaces wherein light passing through the features or surfaces is diffracted (and optionally reflected) at least once to a new angle with an average total angle of deviation less than 20 degrees from the angle of incidence. For example, in one embodiment, one surface of the film-based lightguide in the light emitting region of the film comprises binary gratings or blazed diffraction gratings that redirect light incident at a first angle within a first wavelength bandwidth to a second angle different from the first angle with an average total angle deviation less than 20 degrees from the angle of incidence. In one embodiment, the pitch, size, length size, depth, or angle of the one or more diffractive features or surfaces varies in a first direction from the first side of the light emitting region to the opposite side in the direction of light propagation within the light emitting region. For example, in one embodiment, the core region of the lightguide in the light emitting region comprises diffraction gratings with a repeating array of first, second, and third pitches configured to diffract the average angle of incident light into average total angle deviations less than 20 degrees for blue, green, and red light, respectively.

Scattering Low Angle Directing Features

In a further example, a film-based lightguide comprises a light emitting region with low angle directing features defined by a layer or region with light scattering features, domains, or particles wherein light passing through the light scattering layer or region is scattered at least once to a new angle with an average total angle of deviation less than 20, 15, 10, 8, 6, 4, 3, 2, or 1 degrees from the angle of incidence. In one embodiment, the light scattering layer or region can be formed adjacent, above, below, or within a region of the core layer of material. In this example, the light scattering layer or region may comprise or be defined by a light scattering interface with a regular or irregular surface structure on a first material with a first refractive index in contact with a second surface of a second material conforming to the first material surface with a lower or higher refractive index than the first material such that a portion of the light incident on the interface is scattered (forward and/or back scattering) such that it escapes the lightguide at a surface interface and is subsequently redirected by light turning features. In another embodiment, the film-based lightguide comprises low angle scattering features defined by a dispersed phase of a first material in a second matrix material (such as dispersed beads within a coating matrix). In this embodiment, the light incident scatters or refracts from one or more domain-matrix interfaces such that the average total angle of deviation of the incident light is less than 20 degrees from the angle of incidence. In one embodiment, the low angle directing features progressively redirect light such that the light is deviated into an angle such that all or a portion of the light escapes the total internal reflection condition within the lightguide.

Polarization Dependent Low Angle Directing Features

In one embodiment, the low angle directing features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light and the second polarization is p-polarized light. In one embodiment, the low angle directing features or surface or a material optically coupled to the low angle directing features or surface comprise a substantially isotropic material, a birefringent material, or a trirefringent material. In one embodiment, a structured low angle directing feature in a birefringent material is used to redirect light of a first polarization such that the average total angle of deviation of the incident light is less than 20 degrees from the angle of incidence. For example, in one embodiment, light of the first polarization, such as s-polarized light, is directed into a low angle such that it is at an angle less than the critical angle for the side of the lightguide optically coupled to the cladding layer with a higher refractive index than the cladding layer on the opposite side. Thus, in this example, light of the desired polarization state, s-polarized light, is preferentially extracted by the low angle directing features. In another embodiment, one or more layers or regions optically coupled to the lightguide comprises a waveplate, birefringent material, trirefringent material, or anisotropic material that converts light remaining in the lightguide into the desired polarization state such that it can be redirected through a second or subsequent interaction with the polarization dependent low angle directing feature.

Light Turning Features

In one embodiment, the light emitting region of the lightguide comprises or is optically coupled to a layer or region with light turning features. As used herein, light turning features are refractive, total internal reflection, diffractive, or scattering surfaces, features, or interfaces that redirect at least a portion of light incident within a first angular range to a second angular range different from the first, wherein the second angular range is within 30 degrees from the thickness direction of the film in the light emitting region. For example in one embodiment, a polycarbonate film with grooves on a first outer surface is optically coupled to a film-based lightguide using a pressure sensitive adhesive on the second surface of the polycarbonate film opposite the first outer surface. In this embodiment, light escaping the lightguide (such as by low angle directing features) through the pressure sensitive adhesive totally internally reflects at the groove-air interface in the polycarbonate film and is directed to an angle within 30 degrees from the thickness direction of the film in the light emitting region where it further passes through the lightguide to illuminate an object, such as a reflective LCD, and may optionally pass back through the lightguide. In one embodiment, the light turning features receive light from the low angle directing features and redirect the light into an angle less than 30 degrees from the thickness direction in the light emitting region. The light turning feature may be formed on a surface or within a volume of material and the material may be thermoplastic, thermoset, or adhesive material. In one embodiment, the light turning features are embossed (UV cured or thermomechanically embossed) surface features in a light turning film that is optically coupled (such as by using a pressure sensitive adhesive) to the film-based lightguide in the light emitting region. In one embodiment, a light turning film comprising light turning features on a first surface of the film is optically coupled to the lightguide on the second surface opposite the first surface, the light turning features comprise recessed regions or grooves in the first surface, and the first surface is adhered to a second film in regions between the recessed regions or grooves using a pressure sensitive adhesive that leaves an air gap in the recessed region or grooves. In this embodiment, the large refractive index difference between the polymer light turning film and the air within the recessed region or grooves increases the percentage of totally internally reflected light at the interface over that of an adhesive that effectively planarizes the surface by filing in the recessed regions or grooves with the adhesive. In another embodiment, the light turning film or region or layer comprising the light turning features extends into less than one selected from the group of 30%, 20%, 10%, and 5% of the light mixing region of the film-based lightguide.

Size and Shape of the Light Turning Features

In one embodiment, a light emitting device comprises the film-based lightguide providing front illumination, such as a frontlight for a reflective display, and the density of the light turning features in the light emitting region of the film (or in a film optically coupled to the light emitting region) is less than about 50% in order to reduce undesired second light deviations (such as unwanted reflections) of the light reflected from the object illuminated and passing back through the lightguide and layer or region comprising the light turning features. In one embodiment, the area density or density along a first direction of the light turning features in the light emitting region of the lightguide is a first density selected from the group: less than 50%; less than 40%; less than 30%; between 1% and 50%; between 1% and 40%; between 1% and 30%; between 5% and 30%; and between 5% and 20%. In another embodiment, the density and/or dimension of the light turning features in the first and/or second direction is less than the first density and the light turning features are not visible from distance of 18 inches or more by a person with a visual acuity of 1 arcminute. In another embodiment, the angle subtended by the dimension of the light turning features in the first direction and/or second direction is less than one arcminute at a distance of 18 inches. In a further embodiment, area density in a plane comprising the first direction and the second direction of the light turning features is less than the first density and the light turning features redirect less than one selected from the group: 50%, 40%, 30%, 20%, and 10% of the light reflected from the object of illumination (such as a reflective display) back toward the object of illumination. Thus, in this embodiment, the density and/or dimensions of the light turning features can be configured to reduce the light reflected back toward the object which could reduce the visible luminance contrast of the object.

In another embodiment, the average depth of the light turning features in the thickness direction of the layer or region of film comprising the light turning features is one or more selected from the group: between 1 and 500 microns, between 3 and 300 microns, between 5 and 200 microns, greater than 2 microns, less than 500 microns, less than 200 microns, less than 100 microns, less than 75 microns, less than 50 microns, and less than 10 microns.

In another embodiment, the average width of the light turning features in the direction of light propagation from a first input side of the light emitting region of the lightguide to the opposite side of the light emitting region of the lightguide is one or more selected from the group: between 2 and 500 microns, between 5 and 300 microns, between 10 and 200 microns, greater than 5 microns, less than 500 microns, less than 200 microns, less than 100 microns, less than 75 microns, less than 50 microns, less than 25 microns, and less than 10 microns.

In one embodiment, the light turning feature includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, a composite of symmetric or asymmetrically shaped materials, a laser ablated surface feature, an embossed surface feature, a coated surface feature, an injection molded surface feature, an extruded surface feature, and one of the aforementioned features positioned in the volume of the lightguide.

In one embodiment, a reflective display comprises a light emitting device with a film-based lightguide and a reflective spatial light modulator. In this embodiment, the light emitting device comprises a light redirecting optical element with light redirecting features or light turning features with a dimension in a plane orthogonal to the thickness direction of the film-based lightguide larger than the average size of a pixel of the reflective spatial light modulator or larger than the size of 2, 3, 4, 5, 7, 10, 20, 30, or 50 average size pixels.

In another embodiment, the ratio of the average spacing between light redirecting features or light turning features to the average dimension of the light redirecting features or light turning features in a direction in a plane orthogonal to the thickness direction of the film-based lightguide is greater than one selected from the group 1, 1.5, 2, 3, 4, 5, 7, 10, 15, 20, 30, 40, 50, 70, and 100.

Pitch of the Light Turning Features

In one embodiment the average pitch or spacing between the light redirecting features or light turning features is constant. In one embodiment, the average pitch of the light turning features in the direction of light propagation from a first input side of the light emitting region of the lightguide to the opposite side of the light emitting region of the lightguide (such as the direction of the average angle of propagation within the lightguide in the light emitting region, for example) is one or more selected from the group: between 5 and 500 microns, between 10 and 300 microns, between 20 and 200 microns, greater than 5 microns, less than 500 microns, less than 200 microns, less than 100 microns, less than 75 microns, and less than 50 microns. In one embodiment, the pitch of the light turning features is substantially constant. In one embodiment, the pitch of the light turning features or light redirecting features is configured to reduce moiré contrast with regularly spaced elements of the object of illumination, such as a reflective or transmissive LCD.

The visibility of the moiré interference pattern can be visually distracting in a light emitting device such as a display and reduces the luminance uniformity. The visibility, or luminance contrast of the moiré patterns is defined as LMmax−LMmin/(LMmax+LMmin) where LMmax and LMmin are the maximum and minimum luminance, respectively, along a cross section substantially perpendicular to the repeating moiré pattern when the elements are illuminated. In one embodiment, the moiré contrast of the light emitting device comprising the light turning features or light redirecting features, is low such that the moiré contrast is less than one selected from the group of 50%, 40%, 30%, 20% and 10%. The moiré contrast may be reduced by shifting the pitch of the light turning features or light redirecting features relative to the regular features of the object of illumination such that the moiré contrast is sufficiently small enough not to be visible to the naked eye or be seen without close inspection. The moiré contrast can be reduced or essentially eliminated by one or more of the following methods: adjusting the pitch of the light turning features or light redirecting features, rotating the light turning features or light redirecting features relative to the regular array of features in the object of illumination, randomizing the pitch of the light turning features or light redirecting features, or increasing the spacing between the light turning features or light redirecting features and the object of illumination.

In another embodiment, the light redirecting features or light turning features are spaced at a first distance from the pixels of a spatial light modulator, where the first distance is greater than one selected from the group: 0.05, 0.1, 0.2, 0.3, 0.4, 0.5, 0.6, 0.7, 0.8, 0.9, 1, 1.5, and 2 millimeters. In another embodiment, a light emitting device comprises a lens positioned to receive light redirected by the light redirecting features or light turning features that reflects or transmits through a spatial light modulator, wherein the modulation transfer function for the lens at the first distance or location of the light turning features or light redirecting features is less than 0.5 and modulation transfer function for the lens is greater than 0.7 at a plane comprising the pixels of the spatial light modulator. For example, in one embodiment, a head-mounted display comprises a film-based lightguide, a light redirecting element, a reflective spatial light modulator, and a lens (or combination of lenses) to magnify the pixels of the reflective spatial light modulator wherein the light redirecting features of the light redirecting element are positioned at a first distance from the pixels of the reflective spatial light modulator such that the modulation transfer function for the light redirecting features is less than 0.5 and the light redirecting features are not discernable or barely discernable for a person with an average acuity of 1 arcminute. Similarly, in a projection system, the modulation transfer function of a lens for the location of the light turning features or light redirecting features may be less than 0.5.

By adjusting the pitch of the light turning features when they are substantially parallel to the features in the object of illumination, the moiré contrast can be reduced. In one embodiment, the ratio of the pitches between the array of light turning features and the pitch of the regular features in the object of illumination (such as pixels in a display) is equal to $1/(N+0.5)$ where N is an integer and the moiré contrast is reduced or eliminated. A pitch ratio from $0.9/(N+0.5)$ to $1.1/(N+0.5)$ will have a relatively low visibility of moiré. In one embodiment, the pitch of the light turning features and the pitch of the regular array of elements on the object of illumination (such a regular array of pixels in a reflective LCD) is in accordance with the above equation and has an acceptable level of moiré visibility. In one embodiment, a light emitting device comprises light turning features with a first pitch P1, the light turning features positioned to redirect light to an angle within 30 degrees from the thickness direction of the film toward an object of illumination with a regular array of elements (such as pixels in a reflective LCD) with a second pitch P2 wherein $0.9/(N+0.5)<P2/P1<1.1/(N+0.5)$ where N is an integer.

Polarization Dependent Light Turning Features

In one embodiment, the light turning features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light and the second polarization is p-polarized light. In one embodiment, the light turning features or surface or a material optically coupled to the light turning features or surface comprise a substantially isotropic material, a birefringent material, or a trirefringent material. In one embodiment, a structured light turning feature in a birefringent material is used to redirect light of a first polarization such that the average total angle of deviation of the incident light is less than 20 degrees from the angle of incidence. For example, in one embodiment, light from low angle directing features incident on the light turning feature of the first polarization, such as s-polarized light, is directed into an angle from the thickness direction of the film in the light emitting region less than 30 degrees such that it escapes the film-based lightguide in the light emitting region, such as to illuminate a reflective display, and may optionally pass back through the lightguide. Light of the second polarization may pass through the light turning feature and totally internally reflect at an interface further from the core region of the lightguide. In this example, the light of the second polarization may be changed to the first polarization state and be recycled within the lightguide and layers optically coupled to the lightguide. Thus, in this example, light of the desired polarization state, s-polarized light for example, is preferentially directed to an angle such that it can transmit out of the lightguide and layers by the light turning features. The light turning features may directly couple light out of the lightguide without passing back through the core region of the lightguide or the light turning features may direct the light to the opposite side of the lightguide toward an object for front illumination. In another embodiment, one or more layers or region optically coupled to the lightguide comprises a waveplate, birefringent, trirefringent, or anisotropic material that converts light remaining in the lightguide into the desired polarization state such that it can be redirected through a second or subsequent interaction with the polarization dependent light turning feature.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices including smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

Multiple Lightguides to Provide Pixelated Color

In one embodiment, a light emitting device includes a first lightguide and second lightguide disposed to receive light from a first and second light source, respectively, through two different optical paths wherein the first and second light source emit light of different colors and the light emitting regions of the first and second lightguides include pixelated regions spatially separated in the plane including the light output plane of the light emitting device at the pixelated regions (for example, separated in the thickness direction of the film-based lightguides). In one embodiment, the colors of the first and second pixelated light emitting regions are perceived by a viewer with a visual acuity of 1 arcminute without magnification at a distance of two times the diagonal (or diameter) of the light emitting region to be the additive color of the combination of sub-pixels. For example, in one embodiment, the color in different spatial regions of the display is spatially controlled to achieve different colors in different regions, similar to liquid crystal displays using red, green, and blue pixels and LED signs using red green and blue LEDs grouped together. For example, in one embodiment, a light emitting device includes a red light emitting lightguide optically coupled to a green light emitting lightguide that is optically coupled to a blue lightguide. Various regions of the lightguides and the light output of this embodiment are described hereafter. In a first light emitting region of the light emitting device, the blue and green lightguides have no light extraction features and the red lightguide has light extraction features such that the first light emitting region emits red in one or more directions (for example, emitting red light toward a spatial light modulator or out of the light emitting device). In a second light emitting region of the light emitting device, the red and green lightguides have no light extraction features and the blue lightguide has light extraction features such that the second light emitting region emits blue light in one or more directions. In a third light emitting region of the light emitting device, the blue and red lightguides have light extraction features and the green lightguide does not have any light extraction features such that the third light emitting region emits purple light in one or more directions. In a fourth light emitting region of the light emitting device, the blue, green, and red lightguides have light extraction features such that the fourth light emitting region emits white light in one or more directions. Thus, by using multiple lightguides to create light emitting regions emitting light in different colors, the light emitting device, display, or sign, for example, can be multi-colored with different regions emitting different colors simultaneously or sequentially. In another embodiment, the light emitting regions include light extraction features of appropriate size and density on a plurality of lightguides such that a full-color graphic, image, indicia, logo or photograph, for example, is reproduced.

Lightguide Folding Around Components

In one embodiment, at least one selected from the group: lightguide, lightguide region, light mixing region, plurality of lightguides, coupling lightguides, and light input coupler bends or folds such that the component other components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or other region or component. In one embodiment, a frontlight for a reflective display includes a lightguide, coupling lightguides and a light source wherein one or more regions of the lightguide are folded and the light source is disposed substantially behind the display. In one embodiment, the light mixing region includes a fold and the light source and/or coupling lightguides are substantially disposed on the side of the film-based lightguide opposite the light emitting region of the device or reflective display. In one embodiment, a reflective display includes a lightguide that is folded such that a region of the lightguide is disposed behind the reflective spatial light modulator of the reflective display. In one embodiment, the fold angle is between 150 and 210 degrees in one plane. In another embodiment, the fold angle is substantially 180 degrees in one plane. In one embodiment, the fold is substantially 150 and 210 degrees in a plane parallel to the optical axis of the light propagating in the film-based lightguide. In one embodiment, more than one input coupler or component is folded behind or around the lightguide, light mixing region or light emitting region. In this embodiment, for example, two light input couplers from opposite sides of the light emitting region of the same film may be disposed adjacent each other or utilize a common light source and be folded behind the spatial light modulator of a display. In another embodiment, tiled light emitting devices include light input couplers folded behind and adjacent or physically coupled to each other using the same or different light sources. In one embodiment, the light source or light emitting area of the light source is disposed within the volume bounded by the edge of the light emitting region and the normal to the light emitting region on the side of the lightguide opposite the viewing side. In another embodiment, at least one of the light source, light input coupler, coupling lightguides, or region of the light mixing region is disposed behind the light emitting region (on the side of the lightguide opposite the viewing side) or within the volume bounded by the edge of the light emitting region and the normal to the light emitting region on the side of the lightguide opposite the viewing side.

In another embodiment, the lightguide region, light mixing region, or body of the lightguide extends across at least a portion of the array of coupling lightguides or a light emitting device component. In another embodiment, the lightguide region, light mixing region, or body of the lightguide extends across a first side of the array of coupling lightguides or a first side of the light emitting device component. In a further embodiment, the lightguide region, light mixing region or body of the lightguide extends across a first side and a second side of the array of coupling lightguides. For example, in one embodiment, the body of a film-based lightguide extends across two sides of a stack of coupling lightguides with a substantially rectangular cross section. In one embodiment, the stacked array of coupling lightguides is oriented in a first orientation direction substantially parallel to their stacked surfaces toward the direction of light propagation within the coupling lightguides, and the light emitting region is oriented in a second direction parallel to the optical axis of light propagating within the light emitting region where the orientation difference angle is the angular difference between the first orientation direction and the second orientation direction. In one embodiment, the orientation difference angle is selected from the group: 0 degrees, greater than 0 degrees, greater than 0 degrees and less than 90 degrees, between 70 degrees and 110 degrees, between 80 degrees and 100 degrees, greater than 0 degrees and less than 180 degrees, between 160 degrees and 200 degrees, between 170 degrees and 190 degrees, and greater than 0 degrees and less than 360 degrees.

In one embodiment, at least one selected from the group: lightguide, lightguide region, light mixing region, plurality of lightguides, coupling lightguides, and light input coupler bends or folds such that it wraps around a component of the light emitting device more than once. For example, in one embodiment, a lightguide wraps around the coupling lightguides two times, three times, four times, five times, or more than five times. In another embodiment, the lightguide, lightguide region, light mixing region, plurality of lightguides, coupling lightguides, or light input coupler may bend or fold such that it wraps completely around a component of the light emitting device and partially wraps again around. For example, a lightguide may wrap around a relative position maintaining element 1.5 times (one time around and half way around again). In another embodiment, the lightguide region, light mixing region or body of the lightguide further extends across a third, fourth, fifth, or sixth side of the array of coupling lightguides or light emitting device component. For example, in one embodiment, the light mixing region of a film-based lightguide extends completely around four sides of the relative position maintaining element plus across a side again (fifth side). In another example, the light mixing region wraps around a stack of coupling lightguides and relative position maintaining element more than three times.

In one embodiment, wrapping the lightguide, lightguide region, light mixing region, plurality of lightguides, coupling lightguides, or light input coupler around a component provides a compact method for extending the length of a region of the lightguide. For example, in one embodiment, the light mixing region is wrapped around the stack of coupling lightguides to increase the light mixing distance within the light mixing region such that the spatial color or the light flux uniformity of the light entering the light emitting region is improved.

In one embodiment, the wrapped or extended region of the lightguide is operatively coupled to the stack of coupling lightguides or a component of the light emitting device. In one embodiment, the wrapped or extended region of the lightguide is held with adhesive to the stack of coupling lightguides or the component of the light emitting device. For example, in one embodiment, the light mixing region includes a pressure sensitive adhesive cladding layer that extends or wraps and adheres to one or more surfaces of one or more coupling lightguides or to the component of the light emitting device. In another embodiment, the light mixing region includes a pressure sensitive adhesive layer that adheres to at least one surface of a relative position maintaining element. In another embodiment, a portion of the film-based lightguide includes a layer that extends or wraps to one or more surfaces of one or more coupling lightguides or a component of the light emitting device. In another embodiment, the wrapped or extended region of the lightguide extends across one or more surfaces or sides, or wraps around one or more light sources. The wrapping or extending of a lightguide or lightguide region across one or more sides or surfaces of the stack of coupling lightguides or the component of the light emitting device, may occur by physically translating or rotating the lightguide or the lightguide region, or may occur by rotating the stack of coupling lightguides or the component. Thus, the physical configuration does not require a particular method of achieving the wrapping or extending.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Adhesion Properties of the Lightguide, Film, Cladding or Other Layer

In one embodiment, one or more of the lightguide, the core material, the light transmitting film, the cladding material, and a layer disposed in contact with a layer of the film has adhesive properties or includes a material with one or more of the following: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film) or an element external to the light emitting device such as a window, wall, or ceiling.

Optical Phase Variation

In one embodiment, the film-based lightguide substantially maintains the spatial coherence of the input light. In another embodiment, the spatial phase of the light propagating through the lightguide or prior to propagating through the lightguide is adjusted to compensate for phase variation upon propagating through the lightguide. In one embodiment, the light input surface of a light input coupler in a film-based lightguide receives light with a first wavefront, the light propagates through the film-based lightguide and exits the light emitting area of the film-based lightguide with a second wavefront, wherein the first wavefront and the second wavefront have an interferometric visibility greater than one selected from the group 0.3, 0.4, 0.5, 0.6, 0.7, 0.8, 0.9, and 0.95. The interferometric visibility is the difference between the maximum and minimum fringe intensity divided by the sum of the maximum and minimum fringe intensity across the area of the interference. In this embodiment, the fringe intensity can be measured by combining and interfering light from the light source that has not passed through the film-based lightguide with the light output from the film-based lightguide. In one embodiment, the light exiting the light emitting region of the lightguide has a first phase variation across the light emitting area less than one selected from the group: 60, 50, 40, 30, 20, 10, 5, 3, 2, 1, and 0.5 degrees. In one embodiment, a phase compensating element is positioned to receive light from the one or more light sources and transmit light that enters into the light input coupler input surface. In this embodiment, the phase compensating element can compensate for the variation in phase (due to different path lengths of travel within the coupling lightguides, for example) such that the phase output from the light emitting region of the lightguide has a first phase variation across the light emitting region. In one embodiment, the phase compensating element is a light transmitting element where the thickness varies in the input plane or surface for the light input coupler. In one embodiment, the phase compensating element comprises a shape or region with a shape or feature comprising one or more selected from the group: wedge, tapered element, stepped wedge element, sheet with a thickness varying in two directions orthogonal to the thickness, sheet with a thickness varying in one direction orthogonal to the thickness, printed retarder, printed waveplate, microstructured optical element, diffractive optical element, and printed optical element. In another embodiment, the phase compensation element comprises one or more coatings or elements added to the optical path of the light propagating within the coupling lightguides, light mixing region, or light emitting region. For example, in one embodiment, a coating of a first material is applied in different lengths and/or thicknesses on the surface of a plurality of coupling lightguides such that light propagating through the coupling lightguides has a longer path length due to propagating through the coatings (two passes at each reflection). In this manner, coatings can be individually applied to different coupling lightguides to adjust the phase output. Similarly, coatings with different thickness, sizes/shapes, or materials with different refractive indexes could be applied to different regions of the light mixing region and/or the light emitting region to adjust the phase output and phase variation of the light emitting from the light emitting device or display.

In one embodiment, the phase variation across the light emitting area, region of the light emitting area, or display is measured and a phase compensation element is added to the light emitting device to compensate for the phase variation (or path length difference through different regions and/or coupling lightguide lengths) and generate a second phase variation (or path length difference) less than the first phase variation. In another embodiment, the relative phase variation across the light emitting area of the light output from the light emitting area is less than the first phase variation and the light emitting device comprises a reflective optical element such as a reflective liquid crystal on silicon display positioned to receive the light output from the light emitting area of the lightguide.

In another embodiment, the low angle directing features or the light turning features are positioned along the direction of light propagation in the lightguide such that the light extracted from the light emitting area of the lightguide has a uniform, constant, predetermined, or controlled phase due to the control of the path length of the light propagating in the lightguide. For example, in this embodiment, the path length for light propagating through a relatively short coupling lightguide may be increased by extracting the light further along in the propagation direction in the light emitting area (at the far side of the light emitting area) to adjust the phase of the light output.

Optical Path Length Variation

In one embodiment, the optical path length variation across the light emitting area, region of the light emitting area, or display is measured and one or more path length compensation elements are added to the light emitting device to compensate for the path length difference for light propagating through different regions and/or coupling lightguide lengths.

In one embodiment, a path length compensating element is positioned to receive light from the one or more light sources and transmit light that enters into the light input coupler input surface. In this embodiment, the path length compensating element can compensate for the variation in path lengths of travel within the lightguide, light mixing region and coupling lightguides such that the variation in path length of light exiting the light emitting region of the lightguide is less than a first path length variation. In one embodiment, the first path length variation across the light emitting area of the film-based lightguide from the light input surface is less than one selected from the group: 1 meter, 0.5 meters, 0.2 meters, 10 centimeters, 5 centimeters, 1 centimeter, 5 millimeters, 2 millimeters, 1 millimeter, 500 microns, 200 microns, 100 microns, 50 microns, 20 microns, 10 microns, 5 microns, 1 micron and 500 nanometers. For example in one embodiment, a large film-based lightguide is used to illuminate a 5 meter sized object with a depth of 5 meters with laser light for a transmission hologram and the path length difference across the large light emitting area should be less than the coherence length of the laser (which could be 10 meters) and less than the depth (5 meters) of the object to be recorded to allow for high contrast interference fringes. Similarly, a digital holographic recording of a microscopic cellular event may require maintaining a very low (on the order of tens of microns) variation of path length difference across the light emitting area. In one embodiment, the light source is a laser with a beam expanded and collimated to illuminate a spatial light modulator.

In one embodiment, the path length compensating element is a light transmitting element where the thickness varies in the input plane or surface for the light input coupler. In one embodiment, the path length compensating element comprises a shape or region with a shape or feature comprising one or more selected from the group: wedge, tapered element, stepped wedge element, sheet with a thickness varying in two directions orthogonal to the thickness, sheet with a thickness varying in one direction orthogonal to the thickness, printed retarder, printed waveplate, microstructured optical element, diffractive optical element, and printed optical element. In another embodiment, the path length compensation element comprises one or more coatings or elements added to the optical path of the light propagating within the coupling lightguides, light mixing region, or light emitting region. For example, in one embodiment, a coating of a first material is applied in different lengths and/or thicknesses on the surface of a plurality of coupling lightguides such that light propagating through the coupling lightguides has a longer path length due to propagating through the coatings (two passes at each reflection). In this manner, coatings can be individually applied to different coupling lightguides to adjust the path length difference across the light emitting region. Similarly, coatings with different thickness, sizes/shapes, or materials with different refractive indexes could be applied to different regions of the light mixing region and/or the light emitting region to adjust the path length variation of the light emitting from the light emitting area, light emitting device, or light emitting display.

Soft or Shock Absorbing Lightguide, Cladding or Adhesive

In one embodiment, the lightguide, cladding, or adhesive optically coupled to the lightguide includes a pliable or impact absorbing material. In this embodiment, the lightguide or adhesive optically coupled to the lightguide (such as the adhesive used to bond the lightguide to the electro-optical region of the display) can function to absorb impact or other external pressure on the display or active area of the display. In another embodiment, the lightguide, the adhesive, or a component physically and/or optically coupled to the lightguide includes a surface relief profile and the display has a higher ASTM D1709-09 impact strength than would a lightguide or component of a thickness the same as the region of the lightguide or component without the surface relief profile. In one embodiment, the ASTM D2240 Shore A hardness of the light transmitting lightguide, adhesive, or component physically and/or optically coupled to the lightguide is greater than one selected from the group: 5, 10, 20, 30, 40, 50, 60, 70, and 80. In one embodiment, the light emitting device includes an adhesive that conforms to a non-planar color filter array. In a further embodiment, the adhesive is vacuum filed into a region between the lightguide and the electro-optical material of the display. In another embodiment, the adhesive is a pressure sensitive adhesive, two-part epoxy, UV curable adhesive, thermoset adhesive, silicone adhesive, acrylate-based adhesive, UV curable pressure sensitive adhesive, or thermally setting adhesive. In another embodiment, at least one of the surfaces of the film-based lightguide; cladding layer of the film based lightguide; touchscreen layer or substrate; hardcoating layer or substrate; anti-glare layer or substrate; color filter layer or substrate; electro-optic layer or substrate; reflective material, film, layer, or substrate; polarizer layer or substrate; light redirecting layer or substrate; light extraction feature film, layer or substrate; impact protection layer or substrate; internal coating or layer; conformal coating or layer; circuit board or layer; thermally conducting film, layer or substrate; sealant layer or substrate; spacer layer or substrate; electrically conducting layer (transparent or opaque) or substrate; anode layer or substrate; cathode layer or substrate; active matrix layer or substrate; and passive matrix layer or substrate is modified by coating, spraying, sputtering, electroplating, sputter deposition, electrophoretic deposition, chemical vapor deposition, mechanical plating, physical vapor deposition, vacuum plating, chemical surface treatment, or plasma surface treatment (atmospheric, flame, or chemical). In one embodiment, the aforementioned modification reduces the size or apparent size of display artifacts, improves the display appearance, increases adhesion or wettability with the adhesive, increases wettability with other components of the light emitting device (such as color filter materials, electro-optical materials, inks, and sealants), increases corrosion resistance, increases tarnish resistance, increases chemical resistance, increases wear resistance, increases hardness, increases or decreases electrical conductivity, removes surface flaws, or increases or decrease the surface tension.

Light Redirecting Element Disposed to Redirect Light from the Lightguide

In one embodiment, a light emitting device includes a lightguide with light redirecting elements disposed on or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region.

In a further embodiment, light redirecting elements are disposed to redirect light which was redirected from a light extraction feature such that the light exiting the light redirecting elements is one selected from the group of more collimated than a similar lightguide with a substantially planar surface; has a full angular width at half maximum intensity less than 60 degrees, 50 degrees, 40 degrees, 30 degrees, 20 degrees, 10 degrees, or 5 degrees in a first light output plane; has a full angular width at half maximum intensity less than 60 degrees, 50 degrees, 40 degrees, 30 degrees, 20 degrees, 10 degrees, or 5 degrees in a first light output plane and second light output plane orthogonal to the first output plane; and has a full angular width at half maximum intensity less than 60 degrees, 50 degrees, 40 degrees, 30 degrees, 20 degrees, 10 degrees, or 5 degrees in all planes parallel to the optical axis of the light emitting device.

In one embodiment, the lightguide comprises a substantially linear array of lenticules disposed on at least one surface opposite a substantially linear array of light extraction features wherein the light redirecting element collimates a first portion of the light extracted from the lightguide by the light extraction features. In a further embodiment, a light emitting device comprises a lenticular lens film lightguide further comprising coupling lightguides, wherein the coupling lightguides are disposed substantially parallel to the lenticules at the lightguide region or light mixing region and the lenticular lens film further comprises linear regions of light reflecting ink light extraction features disposed substantially opposite the lenticules on the opposite surface of the lenticular lens film lightguide and the light exiting the light emitting device is collimated. In a further embodiment, the light extraction features are light redirecting features (such as TIR grooves or linear diffraction gratings) that redirect light incident within one plane significantly more than light incident from a plane orthogonal to the first plane. In one embodiment, a lenticular lens film comprises grooves on the opposite surface of the lenticules oriented at a first angle greater than 0 degrees to the lenticules.

In another embodiment, a light emitting device comprises a microlens array film lightguide with an array of microlenses on one surface and the film further comprises regions of reflecting ink light extraction features disposed substantially opposite the microlenses on the opposite surface of the lenticular lens film lightguide and the light exiting the light emitting device is substantially collimated or has an angular FWHM luminous intensity less than 60 degrees. A microlens array film, for example, can collimate light from the light extraction features in radially symmetric directions. In one embodiment, the microlens array film is separated from the lightguide by an air gap.

The width of the light extraction features (reflecting line of ink in the aforementioned lenticular lens lightguide film embodiment) will contribute to the degree of collimation of the light exiting the light emitting device. In one embodiment, light redirecting elements are disposed substantially opposite light extraction features and the average width of the light extraction features in a first direction divided by the average width in a first direction of the light redirecting elements is less than one selected from the group of 1, 0.9, 0.7, 0.5, 0.4, 0.3, 0.2, and 0.1. In a further embodiment, the focal point of collimated visible light incident on a light redirecting element in a direction opposite from the surface comprising the light extraction feature is within at most one selected from the group of 5%, 10%, 20%, 30%, 40%, 50% and 60% of the width of light redirecting element from the light extraction feature. In another embodiment, the focal length of at least one light redirecting element or the average focal length of the light redirecting elements when illuminated by collimated light from the direction opposite the lightguide is less than one selected from the group of 1 millimeter, 500 microns, 300 microns, 200 microns, 100 microns, 75 microns, 50 microns and 25 microns.

In one embodiment, the focal length of the light redirecting element divided by the width of the light redirecting element is less than one selected from the group of 3, 2, 1.5, 1, 0.8, and 0.6. In another embodiment, the optical f-number of the light redirecting elements is less than one selected from the group of 3, 2, 1.5, 1, 0.8, and 0.6. In another embodiment, the light redirecting element is a linear Fresnel lens array with a cross-section of refractive Fresnel structures. In another embodiment, the light redirecting element is a linear Fresnel-TIR hybrid lens array with a cross-section of refractive Fresnel structures and totally internally reflective structures.

In a further embodiment, light redirecting elements are disposed to redirect light which was redirected from a light extraction feature such that a portion of the light exiting the light redirecting elements is redirected with an optical axis at an angle greater than 0 degrees from the direction perpendicular to the light emitting region, lightguide region, lightguide, or light emitting surface. In another embodiment, the light redirecting elements are disposed to redirect light which was redirected from a light extraction feature such that the light exiting the light redirecting elements is redirected to an optical axis substantially parallel to the direction perpendicular to the light emitting region, lightguide region, lightguide, or light emitting surface. In a further embodiment, the light redirecting element decreases the full angular width at half maximum intensity of the light incident on a region of the light redirecting element and redirects the optical axis of the light incident to a region of the light redirecting element at a first angle to a second angle different than the first angle.

In another embodiment, the angular spread of the light redirected by the light extraction feature is controlled to optimize a light control factor. One light control factor is the percentage of light reaching a neighboring light redirecting element which could redirect light into an undesirable angle. This could cause side-lobes or light output into undesirable areas. For example, a strongly diffusively reflective scattering light extraction feature disposed directly beneath a lenticule in a lenticular lens array may scatter light into a neighboring lenticule such that there is a side lobe of light at higher angular intensity which is undesirable in an application desiring collimated light output. Similarly a light extraction feature which redirects light into a large angular range such as a hemispherical dome with a relatively small radius of curvature may also redirect light into neighboring lenticules and create side-lobes. In one embodiment, the Bidirectional Scattering Distribution Function (BSDF) of the light extraction feature is controlled to direct a first portion of incident light within a first angular range into a second angular range into the light redirecting element to create a predetermined third angular range of light exiting the light emitting device.

Light Redirecting Element

As used herein, the light redirecting element is an optical element which redirects a portion of light of a first wavelength range incident in a first angular range into a second angular range different than the first. In one embodiment, the light redirecting element includes at least one element selected from the group: refractive features, totally internally reflected feature, reflective surface, prismatic surface, microlens surface, diffractive feature, holographic feature, diffraction grating, surface feature, volumetric feature, and lens. In a further embodiment, the light redirecting element includes a plurality of the aforementioned elements. The plurality of elements may be in the form of a 2-D array (such as a grid of microlenses or close-packed array of microlenses), a one-dimensional array (such as a lenticular lens array), random arrangement, predetermined non-regular spacing, semi-random arrangement, or other predetermined arrangement. The elements may include different features, with different surface or volumetric features or interfaces and may be disposed at different thicknesses within the volume of the light redirecting element, lightguide, or lightguide region. The individual elements may vary in the x, y, or z direction by at least one selected from the group: height, width, thickness, position, angle, radius of curvature, pitch, orientation, spacing, cross-sectional profile, and location in the x, y, or z axis. In one embodiment, the light redirecting element comprises light turning features.

In one embodiment, the light redirecting element is optically coupled to the lightguide in at least one region. In another embodiment, the light redirecting element, film, or layer comprising the light redirecting element is separated in a direction perpendicular to the lightguide, lightguide region, or light emitting surface of the lightguide by an air gap. In a further embodiment, the lightguide, lightguide region, or light emitting surface of the lightguide is disposed substantially between two or more light redirecting elements. In another embodiment, a cladding layer or region is disposed between the lightguide or lightguide region and the light redirecting element. In another embodiment, the lightguide or lightguide region is disposed between two light redirecting elements wherein light is extracted from the lightguide or lightguide region from both sides and redirected by light redirecting elements. In this embodiment, a backlight may be designed to emit light in opposite directions to illuminate two displays, or the light emitting device could be designed to emit light from one side of the lightguide by adding a reflective element to reflect light emitted out of the lightguide in the opposite direction back through the lightguide and out the other side.

In another embodiment, the average or maximum dimension of an element of a light redirecting element in at least one output plane of the light redirecting element is equal to or less than one selected from the group of 100%, 90%, 80%, 70%, 60%, 50%, 40%, 30%, 20%, and 10% the average or maximum dimension of a pixel or sub-pixel of a spatial light modulator or display. In another embodiment, a backlight comprises light redirecting elements that redirect light to within a FWHM of 30 degrees toward a display wherein each pixel or sub-pixel of the display receives light from two or more light redirecting elements.

In another embodiment, the light redirecting element is a collection of prisms disposed to refract and totally internally reflect light toward the spatial light modulator. In one embodiment, the collection of prisms is a linear array of prisms with an apex angle between 50 degrees and 70 degrees. In another embodiment, the collection of prisms is a linear array of prisms with an apex angle between 50 degrees and 70 degrees to which a light transmitting material has been applied or disposed between the prisms and the lightguide or lightguide region within regions such that the film is effectively planarized in these regions and the collection of prisms is now a two-dimensionally varying arrangement of prisms (thus on the surface it no longer appears to be a linear array). Other forms of light redirecting elements, reverse prisms, hybrid elements, with refractive or totally internally reflective features, or a combination thereof, may be used in one embodiment. Modifications of elements such as "wave-like" variations, variations in size, dimensions, shapes, spacing, pitch, curvature, orientation and structures in the x, y, or z direction, combining curved and straight sections, etc. are known in the art. Such elements are known in the area of backlights and optical films for displays and include those disclosed in "Optical film to enhance cosmetic appearance and brightness in liquid crystal displays," Lee et al., OPTICS EXPRESS, 9 Jul. 2007, Vol. 15, No. 14, pp. 8609-8618; "Hybrid normal-reverse prism coupler for light-emitting diode backlight systems," Aoyama et al., APPLIED OPTICS, 1 Oct. 2006, Vol. 45, No. 28, pp. 7273-7278; Japanese Patent Application No. 2001190876, "Optical Sheet," Kamikita Masakazu; U.S. patent application Ser. No. 11/743,159; U.S. Pat. Nos. 7,085,060, 6,545,827, 5,594,830, 6,151,169, 6,746,130, and 5,126,882. In a further embodiment, at least one light extraction feature is centered in a first plane off-axis from the axis of the light redirecting element. In this embodiment, a portion of the light extraction feature may intersect the optical axis of the light extraction feature or it may be disposed sufficiently far from the optical axis that it does not intersect the optical axis of the light extraction feature. In another embodiment, the distance between the centers of the light extraction features and the corresponding light redirecting elements in first plane varies across the array or arrangement of light redirecting elements.

In one embodiment, the locations of the light extraction features relative to the locations of the corresponding light redirecting elements varies in at least a first plane and the optical axis of the light emitted from different regions of the light emitting surface varies relative to the orientation of the light redirecting elements. In this embodiment, for example, light from two different regions of a planar light emitting surface can be directed in two different directions. In another example of this embodiment, light from two different regions (the bottom and side regions, for example) of a light fixture with a convex curved light emitting surface directed downwards is directed in the same direction (the optical axes of each region are directed downwards toward the nadir wherein the optical axis of the light redirecting elements in the bottom region are substantially parallel to the nadir, and the optical axis of the light redirecting elements in the side region are at an angle, such as 45 degrees, from the nadir). In another embodiment, the location of the light extraction features are further from the optical axes of the corresponding light redirecting elements in the outer regions of the light emitting surface in a direction perpendicular to lenticules than the central regions where the light extraction regions are substantially on-axis and the light emitted from the light emitting device is more collimated. Similarly, if the light extraction features are located further from the optical axes of the light redirecting elements in a direction orthogonal to the lenticules from a first edge of a light emitting surface, the light emitted from the light emitting surface can be directed substantially off-axis. Other combinations of locations of light extraction features relative to light redirecting elements can readily be envisioned including varying the distance of the light extraction features from the optical axis of the light redirecting element in a nonlinear fashion, moving closer to the axis then further from the axis then closer to the axis in a first direction, moving further from the axis then closer to the axis then further to the axis in a first direction, upper and lower apexes of curved regions of a light emitting surface with a sinusoidal-like cross-sectional (wave-like) profile having light extraction features substantially on-axis and the walls of the profile having light extraction features further from the optical axis of the light redirecting elements, regular or irregular variations in separation distances of the light extraction features from the optical axes of the light redirecting elements, etc.

Angular Width Control

In one embodiment, the widths of the light extraction features relative to the corresponding widths of the light redirecting elements varies in at least a first plane and the full angular width at half maximum intensity of the light emitted from the light redirecting elements varies in at least a first plane. For example, in one embodiment, a light emitting device comprises a lenticular lens array lightguide film wherein the central region of the light emitting surface in a direction perpendicular to the lenticules comprises light extraction features that have an average width of approximately 20% of the average width of the lenticules and the outer region of the light emitting surface in a direction perpendicular to the lenticules comprises light extraction features with an average width of approximately 5% of the average width of the lenticules and the angular full width at half maximum intensity of the light emitted from the central region is larger than that from the outer regions.

Off-Axes Light Redirection

In a further embodiment, the light redirecting element is disposed to receive light from an electro-optical element wherein the optical properties may be changed in one or more regions, selectively or as a whole by applying a voltage or a current to the device. In one embodiment, the light extraction features are regions of a polymer dispersed liquid crystal material wherein the light scattering from the lightguide in a diffuse state is redirected by the light redirecting element. In another embodiment, the light extraction feature has a small passive region and a larger active region disposed to change from substantially clear to substantially transmissive diffuse (forward scattering) such that when used in conjunction with the light redirecting element, the display can be changed from a narrow viewing angle display to a larger viewing angle display through the application or removal of voltage or current from the electro-optical region or material. For example, lines of grooved light extraction features are disposed adjacent (x, y, or z direction) a film comprising wider lines polymer dispersed liquid crystal (PDLC) material disposed to change from substantially clear to substantially diffuse upon application of a voltage across the electrodes. Other electro-optical materials such as electrophoretic, electro-wetting, electrochromic, liquid crystal, electroactive, MEMS devices, smart materials and other materials that can change their optical properties through application of a voltage, current, or electromagnetic field may also be used.

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

In one embodiment, the film based lightguide is positioned between the color filter layer and the electro-optical layer such that the parallax effects due to high angle light are minimized (thus resulting in higher contrast, greater resolution, or increased brightness). In another embodiment, the film-based lightguide is the substrate for the color filter material or layer. In another embodiment, the film-based lightguide is the substrate for the electro-optic material or layer.

In one embodiment, the distance between the light extraction features and the color filters in a multi-color display is minimized by positioning the film-based lightguide within the display or using the film-based lightguide as a substrate for a layer or material of the display (such as, for example, the substrate for the color filter layer, transparent conductor layer, adhesive layer, or electro-optical material layer). In one embodiment, the light emitting device includes a plurality of light absorbing adhesive regions that adhere to one or more layers of the display or film-based lightguide (such as on the cladding layer of the film-based lightguide or on the electro-optical material layer).

In one embodiment, the light emitting device includes a film-based lightguide and a force sensitive touchscreen wherein the film based lightguide is sufficiently thin to permit a force sensitive touchscreen to function by finger pressure on the display.

In one embodiment, a film-based lightguide frontlight is disposed between a touchscreen film and a reflective spatial light modulator. In another embodiment, a touchscreen film is disposed between the film-based lightguide and the reflective spatial light modulator. In another embodiment, the reflective spatial light modulator, the film-based lightguide frontlight and the touchscreen are all film-based devices and the individual films may be laminated together. In another embodiment, the light transmitting electrically conductive coating for the touchscreen device or the display device is coated onto the film-based lightguide frontlight. In a further embodiment, the film-based lightguide is physically coupled to the flexible electrical connectors of the display or the touchscreen. In one embodiment, the flexible connector is a "flexible cable", "flex cable," "ribbon cable," or "flexible harness" including a rubber film, polymer film, polyimide film, polyester film or other suitable film.

In one embodiment, a reflective display includes one or more film-based lightguides disposed within or adjacent to one or more regions selected from the group: the region between the touchscreen layer and the reflective light modulating pixels, the region on the viewing side of the touchscreen layer, the region between a diffusing layer and the reflective light modulating pixels, the viewing side of the diffusing layer in a reflective display, the region between a diffusing layer and the light modulating pixels, the region between the diffusing layer and the reflective element, the region between the light modulating pixels and a reflective element, the viewing side of a substrate for a component or the light modulating pixels, the reflective display, between the color filters and the spatial light modulating pixels, the viewing side of the color filters, between the color filters and the reflective element, the substrate for the color filter, the substrate for the light modulating pixels, the substrate for the touchscreen, the region between a protective lens and the reflective display, the region between a light extraction layer and the light modulating pixels, the region on the viewing side of a light extraction layer, the region between an adhesive and a component of a reflective display, and between two or more components of a reflective display known in the art. In the aforementioned embodiment, the film-based lightguide may include volumetric light extraction features or light extraction features on one or more surfaces of the lightguide and the lightguide may include one or more lightguide regions, one or more cladding regions, or one or more adhesive regions.

In one embodiment, the film-based lightguide is folded around a first edge of the active area of a reflective spatial light modulator behind a reflective spatial light modulator and one or more selected from the group: a touchscreen connector, touchscreen film substrate, reflective spatial light modulator connector, and reflective spatial light modulator film substrate is folded behind the first edge, a second edges substantially orthogonal to the first edge, or an opposite edge to the first edge. In the aforementioned embodiment, a portion of the lightguide region, light mixing region, or coupling lightguide includes the bend region of the fold and may extend beyond the reflective spatial light modulator flexible connector, reflective spatial light modulator substrate, touchscreen flexible connector or touchscreen flexible substrate.

Orientation of Light within the Display

In one embodiment, a film-based lightguide illumination device illuminates a spatial light modulator (from the viewer side, from the side opposite the viewer, or from within the display) at a display illumination angle within the layer or material adjacent the electro-optical material or layer of the spatial light modulator in a first illumination plane. As used herein, the display illumination angle is defined as the angle of peak intensity from the surface normal of the spatial light modulating component or layer measured (or calculated) within the layer or material adjacent (on the viewer side) the spatial light modulating component or layer (such as for example, the electro-optical elements of an electrophoretic display, or liquid crystal layer in a liquid crystal display) in a first illumination plane. In one embodiment, the display illumination angle is less than one selected from the group: 60, 50, 40, 30, 20, 10, and 5 degrees. In one embodiment, the first illumination plane is parallel to the extended direction of the coupling lightguides. In another embodiment, the first illumination plane is perpendicular to the extended direction of the coupling lightguides.

In another embodiment, a film-based lightguide illumination device illuminates a color filter layer or material (from the viewer side, from the side opposite the viewer, or from within the display) at a color filter illumination angle within the material or layer adjacent the color filter layer or material in a first illumination plane. As used herein, the color filter illumination angle is defined as the angle of peak intensity from the surface normal of the color filter layer or material measured (or calculated) within the layer or material adjacent (on the viewer side) the color filter layer or material (such as for example, a red, green, and blue array of color filter materials in an electrophoretic display) in a first illumination plane. In one embodiment, the color filter illumination angle is less than one selected from the group: 70, 60, 50, 40, 30, 20, 10, and 5 degrees.

As used herein, the lightguide illumination angle in a first illumination plane is the peak angular intensity of light exiting the film-based lightguide (due to extraction features) measured or calculated within the core layer (or within the cladding layer if present) from the normal to the light emitting device surface (or normal to the film-based lightguide surface). In one embodiment, the lightguide illumination angle is less than one selected from the group: 70, 60, 50, 40, 30, 20, 10, and 5 degrees in a first illumination plane. In one embodiment the lightguide illumination angle is the same as the display illumination angle or the color filter illumination angle.

In another embodiment, the angular bandwidth illumination angle is the full angular width at half maximum intensity of the light exiting the film-based lightguide due to extraction features measured or calculated within the core layer (or within the cladding layer if present) in a first illumination plane from the normal to the light emitting device surface. In one embodiment, the angular bandwidth illumination angle is less than one selected from the group: 60, 50, 40, 30, 20, 10, and 5 degrees in a first illumination plane.

By reducing the full angular width at half maximum intensity of the light exiting the film-based lightguide due to extraction features or redirecting the light using extraction features such that the lightguide illumination angle, display illumination angle, or color filter illumination angle is closer to zero degrees, the resolution, contrast, and/or brightness of the display can be increased by reducing higher angle light that can pass through two light modulating pixels or color filters in a display.

In one embodiment, the light emitting device includes a light collimating optical element that reduces the full angular width at half maximum intensity of the light exiting the film-based lightguide by reducing the full angular width at half maximum intensity of the light incident upon one or more light extraction features. In another embodiment, the thickness of the film-based lightguide is increased to allow for greater collimation in the plane normal to the surface of the film through the use of a larger light collimating optical element to direct light into the light input surface. In another embodiment, at least one of the size, spacing, shape, depth, width, location, and density of the light extraction features is adjusted to reduce the full angular width at half maximum intensity of the light exiting the film-based lightguide or direct the lightguide illumination angle, display illumination angle, or color filter illumination angle closer to zero degrees.

In one embodiment, a light extraction feature on the film-based lightguide defines a recessed (concave) or protruding (convex) feature on the film surface, and a light absorbing material on the viewer side of the recessed or protruding feature absorbs stray light reflecting, refracting or diffracting from the feature directly, therefore absorbing the light that does not pass through the display that would reduce the display contrast. In one embodiment, the light extracting feature is a refractive surface, diffractive surface, a total internal reflection surface, or a combination of one or more of these surfaces. In one embodiment, the light extraction feature is defined by a plurality of facets, such as for example, two, three, or four linear facets per groove, linear feature, two-dimensionally arrayed feature, or three-dimensionally arrayed feature. In another embodiment, the light extraction feature is defined in a separate layer or material and optically coupled to the lightguide. In one embodiment, a light absorbing material with a first refractive index less than the refractive index of the core material is optically coupled to the core or a cladding layer such that higher angle light is absorbed by the light absorbing material. In one embodiment, the higher angle light is the light traveling within the core region of the lightguide at an angle to the optical axis of the lightguide greater than one selected from the group 40, 50, 60, 70, 80, and 85 degrees.

In one embodiment, illumination from two or more sides of the light emitting area of the film-based lightguide interacting with the light extraction features reduces the full angular width at half maximum intensity of the light exiting the film-based lightguide or directs the lightguide illumination angle, display illumination angle, or color filter illumination angle closer to zero degrees.

In another embodiment, an adhesive layer adjacent to the recessed light extraction features permits a gas or air cavity of a low refractive index that causes light propagating within the lightguide (or material or layer that the extraction feature is formed within) to totally internally reflect at the interface between the lightguide (or material or layer that the extraction feature is formed within) and the gas or air cavity at the light extraction feature. For example, in one embodiment, a pressure sensitive adhesive layer is laminated onto a film-based lightguide including groove cavities in a core region of the lightguide such that there is an air gap for total internal reflection of the light within the lightguide at the extraction feature—air cavity interface. In another embodiment, the thickness of the adhesive layer adjacent one or more cavity based light extraction features is less than one selected from the group 2, 1.5, 1, 0.75, 0.5, 0.2, and 0.1 times the depth of the light extraction feature in the thickness direction of the film. In another embodiment, the thickness of the adhesive adjacent one or more cavity based light extraction features is less than one selected from the group: 200, 175, 150, 125, 100, 75, 60, 50, 40, 30, 20, and 10 microns. In another embodiment, the thickness of the cladding adjacent one or more cavity based light extraction features is less than one selected from the group: 200, 175, 150, 125, 100, 75, 60, 50, 40, 30, 20, and 10 microns.

In one embodiment, the full angular width at half maximum intensity of the light from the light source exiting the coupling lightguides is greater in a first plane including the thickness direction of the film than in a second plane including the direction orthogonal to the thickness direction. In one embodiment, the light output profile from the light source is rotated such that the collimation or plane including the lowest divergence is rotated or switched within the light mixing region, lightguide region, or light emitting region. In one embodiment, the light propagating within the film-based lightguide is redirected by light redirecting features, internal light directing edges or optical elements such that the full angular width at half maximum intensity of the light from the light source incident upon one or more light extraction features is greater in the second plane than in the first plane.

Light Emitting Device

In one embodiment, a light emitting device comprises: a film lightguide of a lightguide material with a lightguide refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first cladding layer comprising a first material with a first refractive index, $n_{D1}$, a second cladding layer comprising a second material with a second refractive index $n_{D2}$ where $n_{DL} > n_{D2} > n_{D1}$; a plurality of low angle directing features optically coupled to the body of the lightguide; a plurality of light turning features optically coupled to the lightguide, wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In this embodiment, light propagating within the core layer or region of the film-based lightguide in the light emitting region that undergoes a low angle light redirection, such as by a low angle directing feature, will preferentially leak or exit the core layer or region of the lightguide on the side with the second refractive index since it is higher than the first refractive index and the critical angle is higher. In this embodiment, light deviating from angles higher than the critical angle to smaller angles to the normal of the film surface (or core-layer interface) will first pass the critical angle boundary on the side of the core layer or region optically coupled to the cladding layer or region with the higher refractive index than the cladding layer or region on the opposite side of the core region or layer.

In one embodiment, the low angle directing feature is configured to deviate light by a total angle of deviation less than a maximum first total angle of deviation $\theta_f$, from the angle of incidence, following the equation: $\theta_f = \theta_{c2} - \theta_{c1}$, where $\theta_{c2}$ is the critical angle between the core layer or region and the second cladding layer or region and can also be expressed as $\theta_{c2} = \sin^{-1}(n_{D2}/n_{DL})$, and $\theta_{c1}$ is the critical angle between the core layer or region and the first cladding layer or region and can be expressed as $\theta_{c1} = \sin^{-1}(n_{D1}/n_{DL})$. In another embodiment, the low angle directing feature is configured to provide a maximum total angle of deviation, $\theta_{max}$ of less than 110% of the maximum first total angle of deviation or $\theta_{max} < 1.1 \times \theta_f$. In another embodiment, the low angle directing feature is configured to provide an average first total angle of deviation, $\theta_{fave}$, from the angle of incidence of $\theta_{fave} = \theta_{c2} - \theta_{c1}$. In another embodiment, the low angle directing feature is configured to provide an average total angle of deviation, $\theta_{ave}$ of less than 110% of the average first total angle of deviation or $\theta_{ave} < 1.1 \times \theta_{fave}$.

For example, in one embodiment, the first material has a refractive index of $n_{D1}=1.4$, the second material has a refractive index of $n_{D2}=1.5$, and the core layer or region material has a refractive index of $n_{DL}=1.6$. In this example, a low angle light directing feature comprises an angled reflective surface wherein the angle of the surface causes a total light deviation less than $\theta_f$ such that the light preferentially escapes the core layer of the lightguide through the higher index cladding layer or region. In this example, $\theta_{c1}=61$ degree, $\theta_{c2}=70$ degrees, and thus the maximum first total angle of deviation for optimum coupling into the second cladding region is less than 9 degrees. Since light reflecting from an angled surface undergoes a total angle of deviation of twice the angle of the feature, the angle of the features are chosen to be less than 4.5 degrees $$\left(\frac{\theta_f}{2}\right)$$

from the direction perpendicular to the thickness direction of the film at the feature. In one embodiment the average angle from a direction perpendicular to the thickness direction of the film at the feature of the surface of a reflective low angle directing feature receiving light propagating within the lightguide is less than $$\left(\frac{\theta_f}{2}\right)$$

degrees or less than $$1.1 \times \left(\frac{\theta_f}{2}\right)$$

degrees. In another embodiment, the thickness of the core layer or region of the film-based lightguide is less than 100 microns and the low angle directing feature directs (such as by reflection or refraction, for example) less than one selected from the group 100%, 80%, 60%, 40%, 30%, 20%, 10%, and 5% of the incident light in a single interaction (such as a single reflection or single refraction, for example). In a further embodiment, the light propagating within the lightguide that interacts with the low angle light directing features and propagates to the light turning features interacts with an average of more than 1, 2, 3, 4, 5, 10, 15, or 20 low angle directing features before reaching a light turning feature.

In one embodiment, the ratio of the length of the light emitting region in the direction of light propagating from the first side to the second side of the light emitting region to the average thickness of the light emitting region is greater than one selected from the group: 300, 500, 1000, 5,000, 7,000, 10,000, 15,000, and 20,000.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMs based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used and the color may be controlled directly by modulating the light sources.

In a further embodiment, the backlight or frontlight includes a lightguide disposed to receive light from a blue or UV light emitting source and further includes a region including a wavelength conversion material such as a phosphor film. In another embodiment, the backlight includes 3 layers of film lightguides wherein each lightguide illuminates a display with substantially uniform luminance when the corresponding light source is turned on. In this embodiment, the color gamut can be increased by reducing the requirements of the color filters and the display can operate in a color sequential mode or all-colors-on simultaneously mode. In a further embodiment, the backlight or frontlight includes 3 layers of film lightguides with 3 spatially distinct light emitting regions including light extraction features wherein each light extraction region for a particular lightguide corresponds to a set of color pixels in the display. In this embodiment, by registering the light extracting features (or regions) to the corresponding red, green, and blue pixels (for example) in a display panel, the color filters are not necessarily needed and the display is more efficient. In this embodiment, color filters may be used, however, to reduce crosstalk.

In a further embodiment, the light emitting device includes a plurality of lightguides (such as a red, green and blue lightguide) disposed to receive light from a plurality of light sources emitting light with different wavelength spectrums (and thus different colored light) and emit the light from substantially different regions corresponding to different colored sub-pixels of a spatial light modulator (such as an LCD panel), and further includes a plurality of light redirecting elements disposed to redirect light from the lightguides towards the spatial light modulator. For example, each lightguide may include a cladding region between the lightguide and the spatial light modulator wherein light redirecting elements such as microlenses are disposed between the light extraction features on the lightguide and the spatial light modulator and direct the light toward the spatial light modulator with a FWHM of less than 60 degrees, a FWHM of less than 30 degrees, an optical axis of emitted light within 50 degrees from the normal to the spatial light modulator output surface, an optical axis of emitted light within 30 degrees from the normal to the spatial light modulator output surface, or an optical axis of emitted light within 10 degrees from the normal to the spatial light modulator output surface. In a further embodiment, an arrangement of light redirecting elements are disposed within a region disposed between the plurality of lightguides and the spatial light modulator to reduce the FWHM of the light emitted from the plurality of lightguides. The light redirecting elements arranged within a region, such as on the surface of a film layer, may have similar or dissimilar light redirecting features. In one embodiment, the light redirecting elements are designed to redirect light from light extraction features from a plurality of lightguides into FWHM angles or optical axes within 10 degrees of each other. For example, a backlight including a red, green, and blue film-based lightguides may include an array of microlenses with different focal lengths substantially near the 3 depths of the light extraction features on the 3 lightguides. In one embodiment, lightguide films less than 100 microns thick enable light redirecting elements to be closer to the light extraction features on the lightguide and therefore capture more light from the light extraction feature. In another embodiment, a light redirecting element such as a microlens array with substantially the same light redirection features (such as the same radius of curvature) may be used with thin lightguides with light extraction features at different depths since the distance between the nearest corresponding light extraction feature and farthest corresponding light extraction feature in the thickness direction is small relative to the diameter (or a dimension) of the light redirecting element, pixel, or sub-pixel.

Reflective Display

In one embodiment, a method of producing a display includes: forming an array of coupling lightguides from a lightguide region of a film including a core region and a cladding region by separating the coupling lightguides from each other such that they remain continuous with the lightguide region of the film and include bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

The lightguides disclosed herein may be used to illuminate a reflective display. In one embodiment, a reflective display comprises a first reflective surface and a film-based lightguide comprising a plurality of coupling lightguides. In this embodiment, the reflective display may be a diffusely reflective spatial light modulator or a specularly reflecting spatial light modulator. For example, a diffusely reflective spatial light modulator can include a reflective display such as an electrophoretic particle based reflective display and a specularly reflecting spatial light modulator can include a reflective LCD with specularly reflecting rear electrodes. The reflective spatial light modulator, or a component of the light emitting device, lightguide, or a coating or layer positioned within, may include a light scattering or diffusive surface or volumetric light scattering particles or domains.

In one embodiment, the light emitting device is a frontlight for a watch that comprises a reflective display. In another embodiment, the largest dimension in a plane orthogonal to the thickness direction of the lightguide or display of the light emitting region is less than one selected from the group of 100, 75, 50, 40, 30, and 25 millimeters.

Modes of the Light Emitting Device

In another embodiment, a light emitting device includes one or more modes selected from the group: normal viewing mode, daytime viewing mode, high brightness mode, low brightness mode, nighttime viewing mode, night vision or NVIS compatible mode, dual display mode, monochrome mode, grayscale mode, transparent mode, full color mode, high color gamut mode, color corrected mode, redundant mode, touchscreen mode, 3D mode, field sequential color mode, privacy mode, video display mode, photo display mode, alarm mode, nightlight mode, emergency lighting/ sign mode. The daytime viewing mode may include driving the device (such as a display or light fixture) at a high brightness (greater than 300 Cd/m2 for example) and may include using two or more lightguides, two or more light input couplers, or driving additional LEDs at one or more light input couplers to produce the increase in brightness. The nighttime viewing mode may include driving the device at a low brightness (less than 50 Cd/m2 for example). The dual display mode may include a backlight (or frontlight) wherein the lightguide illuminates more than one spatial light modulator or display. For example, in a cellphone where there are two displays in a flip configuration, each display can be illuminated by the same film lightguide that emits light toward each display. In a transparent mode, the lightguide may be designed to be substantially transparent such that one can see through the display or backlight. In another embodiment, the light emitting device includes at least one lightguide for a first mode, and a second backlight for a second mode different than the first mode. For example, the transparent mode backlight lightguide on a device may have a lower light extraction feature density, yet enable see-through. For a high brightness mode on the same device, a second lightguide may provide increased display luminance relative to the transparent mode. The increased color gamut mode may provide an increased color gamut (such as greater than 100% NTSC) by using one or more spectrally narrow colored LEDs or light sources. These LEDs used in the high color gamut mode may provide increased color gamut by illumination through the same or different lightguide or light input coupler. The color corrected mode may compensate for light source color variation over time (such as phosphor variation), LED color binning differences, or due to temperature or the environment. The touchscreen mode may allow one or more lightguides to operate as an optical frustrated TIR based touchscreen. The redundant backlight mode may include one or more lightguides or light sources that can operate upon failure or other need. The 3D mode for the light emitting device may include a display and light redirecting elements or a display and polarization based, LC shutter based, or spectrally selective based glasses to enable stereoscopic display. The mode may, for example, include one or more separate film-based backlight lightguide for 3D mode or a film-based lightguide and a display configured to display images stereoscopically. The privacy mode, for example, may include a switchable region of a polymer dispersed liquid crystal disposed beneath a light redirecting element to increase or decrease the viewing angle by switching to a substantially diffuse mode, or substantially clear mode, respectively. In another embodiment, the light emitting device further includes a video display mode or a photo display mode wherein the color gamut is increased in the mode. In a further embodiment, the light emitting device includes an alarm mode wherein one or more lightguides is turned on to draw attention to a region or a display. For example, when a cellphone is ringing, the lightguide that is formed around or on a portion of the exterior of the cellphone may be illuminated to "light up" the phone when it is ringing. By using a film-based lightguide, the lightguide film may be formed into a phone housing (thermoforming for example) or it may be film-insert molded to the interior (translucent or transparent housing) or exterior of the housing. In another embodiment, the light emitting device has an emergency mode wherein at least one lightguide is illuminated to provide notification (such as displaying the illuminated word "EXIT") or illumination (such as emergency lighting for a hallway). The illumination in one or more modes may be a different color to provide increased visibility through smoke (red for example).

NVIS Compatible Mode

The night vision or NVIS mode may include illuminating one or more lightguides, two or more light input couplers, or driving additional LEDs at one or more light input couplers to produce the desired luminance and spectral output. In this mode, the spectrum of the LEDs for an NVIS mode may be compatible with US Military specifications MIL-STD-3009, for example. In applications requiring an NVIS compatible mode, a combination of LEDs or other light sources with different colors may be used to achieve the desired color and compatibility in a daytime mode and nighttime mode. For example, a daytime mode may incorporate white LEDs and blue LEDs, and a nighttime or NVIS mode may incorporate white, red, and blue LEDs where the relative output of one or more of the LEDs can be controlled. These white or colored LEDs may be disposed on the same light input coupler or different light input couplers, the same lightguide or different lightguides, on the same side of the lightguide, or on a different side of the lightguide. Thus, each lightguide may include a single color or a mixture of colors and feedback mechanisms (such as photodiodes or LEDs used in reverse mode) may be used to control the relative output or compensate for color variation over time or background (ambient) lighting conditions. The light emitting device may further include an NVIS compatible filter to minimize undesired light output, such as a white film-based backlight lightguide with a multilayer dielectric NVIS compatible filter where the white lightguide is illuminated by white LEDs or white LEDs and Red LEDs. In a further embodiment, a backlight includes one or more lightguides illuminated by light from one or more LEDs of color selected from the group: red, green, blue, warm white, cool white, yellow, and amber. In another embodiment, the aforementioned backlight further includes a NVIS compatible filter disposed between the backlight or lightguide and a liquid crystal display.

Field Sequential Color Mode

In a further embodiment, a backlight or frontlight includes a lightguide including light extraction features and a light redirecting element disposed to receive a portion of the light extracted from the lightguide and direct a portion of this light into a predetermined angular range. In another embodiment, the light redirecting element substantially collimates, reduces the angular full-width at half maximum intensity to 60 degrees, reduces the angular full-width at half maximum intensity to 30 degrees, reduces the angular full-width at half maximum intensity to 20 degrees, or reduces the angular full-width at half maximum intensity to 10 degrees, a portion of light from the lightguide and reduces the percentage of cross-talk light from one light extraction region reaching an undesired neighboring pixel, sub-pixel, or color filter. When the relative positions of the light extraction features, light redirecting elements, and pixels, sub-pixels, or color filters are controlled then light from a predetermined light extraction feature can be controlled such that there is little leakage of light into a neighboring pixel, sub-pixel, or color filter. This can be useful in a backlight or frontlight such as a color sequential backlight wherein three lightguides (one for red, green, and blue) extract light in a pattern such that color filters are not needed (or color filters are included and the color quality, contrast or gamut is increased) since the light is substantially collimated and no light or a small percentage of light extracted from the lightguide by a light extraction feature on the red lightguide beneath a pixel corresponding to a red pixel will be directed into the neighboring blue pixel. In one embodiment, the light emitting device is a reflective display including a frontlight including three lightguides, each with a set of light extraction regions wherein the three light extraction regions do not substantially overlap when viewed under magnification looking from the viewing side of the display and the light extraction regions substantially align with individual light modulating pixels on the light emitting display. In this embodiment, color filters are not required and the efficiency of the lightguides and light emitting device can be increased. In one embodiment, each lightguide includes a plurality of light extraction regions including substantially one light extraction feature aligned substantially above a light modulating pixel in a reflective spatial light modulator. In another embodiment, each lightguide includes a plurality of light extraction regions including a plurality of light extraction features with each light extraction region aligned substantially above a light modulating pixel in a reflective spatial light modulator. In one embodiment, a light emitting display includes a reflective or transmissive spatial light modulator and a film-based lightguide including an average of one or more selected from the group: 1, 2, 5, 10, 20, 50, more than 1, more than 2, more than 5, more than 10, more than 20, more than 20, and more than 50 light extraction features per spatial light modulating pixel when viewed normal to the light emitting surface of the display.

In another embodiment, the light emitting device is a reflective display including a reflective spatial light modulator and a frontlight or backlight including three lightguides, each including a set of light extraction regions wherein the uniformity of the light emitting from the first lightguide, second lightguide and third lightguide is greater than one selected from the group: 60%, 70%, 80%, and 90% when illuminated individually. In this embodiment, the intensity of the light source(s) directing light into each lightguide may be modulated to provide sequential color illumination for the reflective spatial light modulator.

Single or Multi-Color Mode

In one embodiment, the light emitting device includes a first lightguide and a second lightguide disposed to receive light in a lightguide condition from a first light source and second light source, respectively, wherein the first light source has a color difference $\Delta u'v'$ greater than 0.004 from the second light source. In another embodiment, the light emitting device includes a three lightguides disposed to receive light in a lightguide condition from three light sources wherein the three light sources each have a color difference $\Delta u'v'$ greater than 0.004. For example, in one embodiment, a reflective display includes a frontlight including a first, second, and third lightguide disposed to receive light from a red, green, and blue LED and each lightguide emits light toward the reflective spatial light modulator where it is modulated spatially and when driven with all pixels in the "on" or reflective mode, the spatial luminance uniformity of the light emitting pattern from each lightguide individually is greater than one selected from the group: 60%, 70%, 80%, and 90%.

Multi-Color or Full-Color Display

In one embodiment, the light emitting device includes at least one monochromatic light source (such as a red light emitting diode) and a white light source (such as a white light emitting diode). In another embodiment, the light emitting device includes a light emitting region with a first color light emitting region emitting light from a first light source and a second color light emitting region emitting light from a second light source. In one embodiment, the first color light emitting region is spatially separate from the second color light emitting region. For example, in one embodiment, the light emitting device is a display including a monochrome (first color) display area used for icons or buttons within or adjacent a display area and a full-color display area for viewing full-color content. In a further embodiment, the first color light emitting region overlaps at least a portion of the second color light emitting region. For example, in one embodiment, the light emitting device is a display including a first color light emitting region used for icons or buttons within or adjacent a display area and a second color light emitting display area for viewing of full-color content. In this embodiment, the first color light emitting area can be illuminated by monochrome light (in a low power mode for example) or full-color light (in a higher color gamut mode, for example). In another embodiment, the first color light emitting region overlaps the second color light emitting region. For example, in one embodiment, the light emitting device includes a display with a light emitting region including a white illumination lightguide configured to receive light from at least one white LED, where the white illumination lightguide is above or below a full-color illumination lightguide disposed to receive light from at least one red, green, and blue LED. In this embodiment, the display can be operated in a high brightness, low color saturation mode by turning one or more white LEDs for illumination, or the display can be operated in a high color saturation, reduced brightness mode. In one embodiment, two or more light sources with different colors (such as white, red, green, and blue) are positioned to illuminate the same light input surface of a stack of coupling lightguides such that the light emitted from the light emitting area can be a first color mode (white only, for example), or multi-colored mode (red, green, and blue mode, for example). In this embodiment, for example, the display can be illuminated from a single film-based lightguide, and the display can be driven in a monochrome mode, a full color high saturation mode using light from red, green, and blue LEDs, or a lower saturation full-color, higher brightness mode using red, green, blue, and white LEDs.

In one embodiment, the display includes color filters. In one embodiment, a display including color filters has a first color gamut when illuminated by white light source (such as a white light emitting LED including a Yttrium Aluminum Garnet (YAG) phosphor with a correlated color temperature between 3700K and 4000K) and has a second color gamut, different from the first color gamut, when illuminated by one or more monochrome light source (such as a red, green, and blue LEDs). In one embodiment, the first color gamut is one selected from the group: less than 60%, less than 70%, less than 80%, less than 90%, less than 100%, greater than 60%, greater than 70%, greater than 80%, greater than 90%, and greater than 100% of the National Television System Committee (NTSC) color gamut, and the second color gamut is one selected from the group: less than 70%, less than 80%, less than 90%, less than 100%, greater than 70%, greater than 80%, greater than 90%, greater than 100%, greater than 110%, and greater than 120% of the National Television System Committee (NTSC) color gamut.

In one embodiment, the light emitting device monitors the intensity or color of one or more light sources directly or indirectly. In another embodiment, the light emitting device monitors the intensity or color of the light emitting region.

The intensity or color can be monitored in real-time using a photodetector, such as, for example, a photodiode, photocell, or light emitting diode used in reverse mode to detect light within a specific wavelength band. In one embodiment, the light emitting device monitors the color and/or intensity to adjust for ambient light conditions or degradation of a component. For example, in one embodiment, the light emitting device includes a light emitting diode positioned to receive light from a plurality of light sources and when the light output reduces over time, the current is increased such that the light output remains substantially the same. In another embodiment, the relative light output of two light sources, such as a red and blue LED are monitored such that the relative light output can be maintained and the color remains substantially the same. In this embodiment, the light emitting device can include multiple lightguides illuminated by multiple monochrome light sources such that the light emitting device is in a color sequential mode. In another embodiment, the light emitting device monitors the light after it passes through the lightguide region. In one embodiment, the light emitting device includes a first light input coupler positioned to receive light from a first light source and a second light input coupler positioned to receive light from a second light source. In this embodiment, the light passing through the lightguide region is monitored by measuring the relative intensity of light passing through the first array of coupling lightguides in the first light input coupler, the lightguide region, and the second array of coupling lightguides in the second light input coupler to the second array of LEDs that also includes at least one LED driven in reverse mode to detect intensity of the light exiting the coupling lightguides at the light input surface. In this embodiment, the degradation of the lightguide or one or more components of the lightguide or optical system can be monitored for degradation such as yellowing due to UV exposure and the relative output of the light source could be increased (increasing the light output from the blue LED to maintain the color, for example). In one embodiment, one or more light sources in a first input coupler are turned on while the light sources in the second input coupler are turned off such that a photodiode or light emitting diode in the second light input coupler can measure the light from the one or more light sources in the first input coupler that travels through the input couplers and lightguide. This could be performed in a testing mode before, during, or the display is turned on or in a viewing mode. In one embodiment, the light transmitting material of the core and/or cladding region of the film-based lightguide has an absorption coefficient, alpha (absorption), greater than one selected from the group: 0.01, 0.02, 0.03, 0.04, 0.05, 0.06, 0.07, 0.08, 0.09, 0.1, 0.2, 0.3, 0.4, 0.5, 0.6, 0.7, and 0.8 per inch. In one embodiment, the light transmitting material of the core and/or cladding region of the film-based lightguide has an attenuation coefficient, alpha (attenuation), accounting for absorption and scatter greater than one selected from the group: 0.01, 0.02, 0.03, 0.04, 0.05, 0.06, 0.07, 0.08, 0.09, 0.1, 0.2, 0.3, 0.4, 0.5, 0.6, 0.7, and 0.8 per inch. The attenuation or absorption coefficient can be measured by sequentially measuring the light output from a length of lightguide material by cutting the material and fitting the data to the curve model analogous to the "cutback" method for evaluating attenuation in optical fibers.

In one embodiment, the intensity of light from a first light source of a first monochrome color is increased in order to adjust for the absorption and/or attenuation loss within the light transmitting material within the wavelength range. For example, in one embodiment, a light emitting device includes at least one red, green, and blue LED light sources, the light transmitting material of the core layer of the lightguide absorbs more blue light than red light, and the intensity of light from the blue light emitting diode is at least a first intensity adjustment percentage more than the intensity required to meet at least 70%, 80%, or 90% of the NTSC color gamut at a specific luminance (such as 50, 100, 200, or 300 candelas/m$^2$) if the light was not absorbed or attenuated by the light transmitting material in the film-based lightguide. This comparison can be made by measuring the color gamut of the light from the red, green, and blue LEDs directly (without passing through the lightguide) and the light that exits the light emitting area of the film-based lightguide. For example, in one embodiment, in order to meet an 80% NTSC color gamut in the light emitting area of the display at 300 candelas/m$^2$, the intensity of the light from the blue LED is increased by a first intensity adjustment percentage of 20% over the intensity that would be required to reach the 80% NTSC color gamut due to direct illumination from the LEDs without using the film-based lightguide. In one embodiment, the first intensity adjustment percentage is greater than one selected from the group: 5%, 10%, 20%, 30%, 40%, 50%, 60%, 70%, 80%, 90%, and 100%.

In one embodiment, the array of color filters includes one or more color filters selected from the colors: red, green, blue, cyan, magenta, yellow, orange, and violet. In one embodiment, the light emitting device is a color display including at least one color filter with a first wavelength transmission bandwidth with a transmission greater than 60% at normal incidence and at least one light source with a peak wavelength output within the first wavelength transmission bandwidth. In another embodiment, the light emitting device is a display including an array of color filters including a first color filter, second color filter, and third color filter with first, second and third wavelength bandwidths, respectively. In this embodiment, the display further includes a first, second and third light sources emitting light within the first, second, and third wavelength bandwidths, respectively, or emitting light with a peak intensity within the first, second, and third wavelength bandwidths, respectively.

In one embodiment, the light emitting device includes one or more monochrome light sources and the light extraction features are diffractive in nature. For example, in one embodiment, the light extraction features are diffractive elements positioned to diffract incident light out of the lightguide directly (by transmission) or indirectly (by reflection such that the light exits the lightguide on the side of the lightguide opposite the diffractive elements). In one embodiment, the diffractive elements include linear blazed gratings. In one embodiment, the light emitting device includes a lightguide with first diffractive element light extraction features and second diffractive element light extraction features different than the first diffractive element light extraction features, a first light source emitting light with a first peak wavelength, a second light source emitting light with a second peak wavelength different from than the first peak wavelength, wherein the first diffractive element light extraction features diffract light from the first light source out of the lightguide (directly or indirectly from the opposite side) and do not diffract incident light from the second light source out of the lightguide (directly or indirectly). In a further embodiment, the second diffractive element light extraction features diffract light from the second light source out of the lightguide (directly or indirectly from the opposite side) and do not diffract incident light from the first light source out of the lightguide (directly or indirectly). In another embodiment, the light incident upon the diffractive element light extraction features within the lightguide has an angular full width at half maximum intensity within the lightguide less than one selected from the group: 100, 90, 80, 70, 60, 50, 40, 30, 20, and 10 degrees in one or more illumination planes.

Automatic or User Controlled Color Adjustment

In one embodiment, the light emitting device can be operated in a monochrome mode (such as blue-only mode). In another embodiment, the user of the light emitting device can selectively choose the color of the light emitted from the display or light emitting device. In another embodiment, the user can choose to change the mode and relative light output intensities from one or more light sources. For example, in one embodiment, the user can switch from a full-color 2D display using only the frontlight to a stereoscopic 3D display mode. In one embodiment, the user can adjust the color temperature of the white point of the display including a film-based lightguide and a light input coupler disposed to couple light from a red LED and a white LED into the coupling lightguides of the lightguide by adjusting the light output of the red LED relative to the white LED. In another embodiment, the user can switch a reflective display from a fixed white point color temperature frontlight only mode to an automatic white color temperature adjustment frontlight and ambient light mode that automatically adjusts the light output from a red LED relative to a white LED (or the relative intensities of blue, green, and red LEDs, etc.) to maintain the color temperature of the white point of the display in a variety of environmental ambient light spectral conditions such as "cool" fluorescent lighting and "warm" lighting from an incandescent bulb. In another embodiment, the user can select to change from a full-color RGB display mode to an NVIS compatible display mode with less red light output. In another embodiment, the user can select to change from an RGB illumination with light from red, green, and blue LEDs to a monochrome mode with light from white LEDs.

In a further embodiment, a film-based lightguide is disposed to receive light from a substantially white light source and a red light source. For example, by coupling light from a white LED and a red LED, the color temperature of the display can be adjusted. This can, for example, be changed by the user (for color preference, for example) or automatically. For example, in one embodiment, a light emitting device includes a reflective display and a photosensor (such as one or more photodiodes with color filters or LEDs operated in reverse) that detects the color or spectral intensity of light within one or more wavelength bandwidths and adjusts the overall and/or relative light output intensities of the frontlights (or LEDs disposed to couple light into a single frontlight) to increase or decrease the luminance and/or adjust the combined color of light emitted from the reflective display. In another embodiment the light detector (or photosensor) used to detect the color or spectral intensity of light within one or more wavelength bandwidths also determines the relative brightness of the ambient light and the intensity of the light from the frontlight is increased or decreased based on predetermined or user adjusted settings. In one embodiment, the photosensor includes one or more light sensors such as LEDs used in reverse mode. In one embodiment, the photosensor is disposed in one or more locations selected from the group: behind the display, behind the frontlight, between the light emitting region of the display and the bevel, bezel or frame of the display, within the frame of the display, behind the housing or a light transmitting window of the housing or casing of the display or light emitting device, and in a region of the light emitting device separate from the display region. In another embodiment, the photosensor includes a red, green, and blue LED driven in reverse to detect the relative intensities of the red, green, and blue spectral components of the ambient light. In another embodiment, the photosensor is disposed at the input surface of an arrangement of coupling lightguides disposed to transmit light from one or more light sources to the light emitting region of a film-based lightguide or at the output surface of output coupling lightguides extending from the film-based lightguide. In this embodiment, the photosensor can effectively collect the average intensity of the light incident on the display and the film-based lightguide frontlight and this can be compared to the relative output of the light from the light sources in the device. In this embodiment, the photosensor is less susceptible to shadows since the area of light collection is larger due to the larger spatial area including the light extraction features that are effectively working in reverse mode as light input coupling features coupling a portion of ambient light into the lightguide in a waveguide condition toward the photosensor.

One or more modes of the light emitting device may be configured to turn on automatically in response to an event. Events may be user oriented, such as turning on the high color gamut mode when the cellphone is used in the video mode, or in response to an environmental condition such as a film-based emergency light fixture electrically coupled to a smoke detection system (internal or external to the device) to turn on when smoke is detected, or a high brightness display mode automatically turning on when high ambient light levels are detected.

In another embodiment, the display mode may be changed from a lower luminance, higher color gamut mode (such as a mode using red, green, and blue LEDs for display illumination) to a higher luminance, lower color gamut mode (such as using white LEDs for illumination). In another embodiment, the display may switch (automatically or by user controls) from a higher color gamut mode (such as a light emitting device emitting light from red, green, and blue LEDs) to a lower color gamut mode (such as one using white phosphor based LEDs). In another embodiment, the display switches automatically or by user controls from a high electrical power mode (such as light emitting device emitting light from red, green, and blue LEDs) to a relatively low electrical power mode (such as a mode using only substantially white LEDs) for equal display luminances.

In a further embodiment, the display switches automatically or by user controls from a color sequential or field sequential color mode frontlight or backlight illumination mode to an ambient-light illumination mode that turns off or substantially reduces the light output from the frontlight or backlight and ambient light contributes to more than 50% of the flux exiting the display.

In one embodiment, a display includes a film-based lightguide with a light input coupler disposed to receive light from one or more light sources emitting light with one or more colors selected from the group: a red, green, blue, cyan, magenta, and yellow. For example, in one embodiment, a display includes a film-based lightguide including one or more light input couplers disposed to receive light from a red, green, blue, cyan and yellow LED. In this embodiment, the color gamut of the display can be increased significantly over a display including only red, green, and blue illumination LEDs. In one embodiment, the LEDs are disposed within one light input coupler. In another embodiment, two or more LEDs of two different colors are disposed to input light into an arrangement of coupling lightguides. In another embodiment, a first light input coupler includes one or more LEDs with a first spectral output profile of light entering a film-based lightguide and a second light input coupler with a second spectral output profile of light entering the film-based lightguide different than the first spectral output profile and the coupling lightguides in the first or second light input coupler are disposed to receive light at the input surface from an LED with a first peak wavelength and output wavelength bandwidth less than 100 nm and the coupling lightguides in the other light input coupler are not disposed to receive light at the input surface from an LED with substantially similar peak wavelength and substantially similar output wavelength bandwidth. In another embodiment, a light emitting device includes two or more light input couplers including different configurations of different colored LEDs. In another embodiment, a light emitting device includes two or more light input couplers including substantially the same configurations of different colored LEDs.

Stereoscopic Display Mode

In another embodiment, a display capable of operating in stereoscopic display mode includes a backlight or frontlight wherein at least one lightguide or light extracting region is disposed within or on top of a film-based lightguide wherein at least two sets of light emitting regions can be separately controlled to produce at least two sets of images in conjunction with a stereoscopic display. The 3D display may further include light redirecting elements, parallax barriers, lenticular elements, or other optical components to effectively convert the spatially separated light regions into angularly separated light regions either before or after spatially modulating the light.

In a further embodiment, a light emitting device includes at least one first lightguide emitting light in a first angular range and at least one second lightguide emitting light in a second angular range. By employing lightguides emitting lightguides emitting light into two different angular ranges, viewing angle dependent properties such as dual view display or stereoscopic display or backlight can be created. In one embodiment, the first lightguide emits light with an optical axis substantially near +45 degrees from the normal to the light output surface and the second lightguide emits light with an optical axis substantially near −45 degrees from the normal to the light output surface. For example, a display used in an automobile display dash between the driver and passenger may display different information to each person, or the display may more efficiently direct light toward the two viewers and not waste light by directing it out normal to the surface. In a further embodiment, the first lightguide emits light corresponding to light illuminating first regions of a display (or a first time period of the display) corresponding to a left image and the second lightguide emits light corresponding to light illuminating second regions of a display (or a second time period of the display) corresponding to a right image such that the display is a stereoscopic 3D display.

In one embodiment, the first lightguide emits substantially white light in a first angular direction from a first set of light extraction features and a second light guide beneath the first lightguide emits substantially white light in a second angular direction from a second set of light extraction features. In another embodiment, the first set of light extraction features are disposed beneath a first set of pixels corresponding to a left display image and the second set of light extraction features are substantially spatially separated from the first and disposed beneath a second set of pixels corresponding to a right display image and the display is autostereoscopic. In a further embodiment, the aforementioned autostereoscopic display further includes a third lightguide emitting light toward the first and second sets of pixels and is illuminated in a 2D display mode display full resolution.

In one embodiment, a light emitting display includes a film-based lightguide and a reflective spatial light modulator wherein the light reflected by the reflective spatial light modulator from light incident from a lightguide due to light extracted from the lightguide propagating in a first direction does not substantially overlap the light reflected by the reflective spatial light modulator from light incident from the lightguide extracted from light propagating in a second direction different from the first direction. In one embodiment, a light emitting display includes a reflective spatial light modulator with a diffusely reflecting properties wherein the angular full-width at half maximum intensity of the diffusely reflected light is less than one selected from the group: 50 degrees, 40 degrees, 30 degrees, 20 degrees, and 10 degrees when measured with laser light with a divergence less than 3 milliradians at an incidence angle of 35 degrees. In one embodiment, the diffusely reflecting spatial light modulator receives light from two peak directions from light exiting a film-based lightguide propagating within the lightguide with optical axes substantially oriented in opposite directions. For example, in this embodiment, light propagating in a first direction within a lightguide can be extracted from the lightguide such that it is incident on the reflective spatial light modulator at an angle of peak luminous intensity of +20 degrees from the normal to the reflective spatial light modulator with an angular full-width at half maximum intensity of 10 degrees in a first output plane and light propagating in a second direction opposite the first direction within a lightguide can be extracted from the lightguide such that it is incident on the reflective spatial light modulator at an angle of peak luminous intensity of −20 degrees from the normal to the reflective spatial light modulator with an angular full-width at half maximum intensity of 10 degrees in the first output plane. In this embodiment, the light originally propagating in the lightguide in the first direction is output at an angle of peak luminous intensity of about −20 degrees from the display normal and light originally propagating in the lightguide in the second direction is output from the display at an angle of about +20 degrees from the display normal in the first output plane. By modulating the light output (such as alternating light from two white LEDs coupled into two input coupling lightguides on opposite sides of a light emitting region), and synchronizing this with the reflective spatial light modulator, alternating images from the display can be directed into the +20 and −20 degree directions such that the viewer sees a stereoscopic 3D image, indicia, graphics, or video. In another embodiment, the angle of peak intensity of the light from the first and second directions varies across the frontlight such that the light is focused toward two "eye boxes" corresponding to a range of viewing positions for an average viewer's eyes at a particular viewing distance. In one embodiment, the angle of peak luminous intensity at the center of the display from the light originally propagating with its optical axis in a first direction within a film-based lightguide is within a range selected from the group: −40 degrees to −30 degrees, −30 degrees to −20 degrees, −20 degrees to −10 degrees, and −10 degrees to −5 degrees from the normal to the display surface in a first output plane and the angle of peak luminous intensity at the center of the display from the light originally propagating with its optical axis in the film-based lightguide in a second direction is within a range selected from the group: +40 degrees to +30 degrees, +30 degrees to +20 degrees, +20 degrees to +10 degrees, and +10 degrees to +5 degrees from the normal to the display surface in the first output plane. In another embodiment, the first output plane is substantially parallel to the first and second directions.

In one embodiment, a light emitting display includes a lenticular lens disposed to direct light into two or more viewing zones for stereoscopic display of images, video, information, or indicia and the lenticular lens is a film-based lightguide or includes a film-based lightguide substrate. In this embodiment, the thickness of the stereoscopic display can be reduced by incorporating the film-based lightguide into the lenticular lens film. In a further embodiment, stray light reflections from frontlight at the air-lenticule surfaces are reduced by directing light from the lenticular lens toward the reflective display without passing through the lenticule-air surface until after reflection from the reflective spatial light modulator.

Aligned Extraction Features

In one embodiment, the arrangement of light extraction features is aligned with one or more color filters, such as the color filters in an array of color filters. In one embodiment, the arrangement of light extraction features are aligned and positioned within an illumination volume defined by the lateral edges of the color filters in an array of color filters or spatial light modulating pixels and the thickness of the light emitting device in a direction normal to the light emitting area surface. In another embodiment, the arrangement of light extraction features are aligned and positioned within an illumination volume defined by the lateral edges of the color filters in the array of color filters or the spatial light modulating pixels and a direction parallel to the angle of peak intensity of light exiting the lightguide from the light extraction features. For example, in one embodiment, a light emitting display includes a film-based frontlight emitting light into a cladding or air region from light extraction features with an angle of peak intensity of 60 degrees from the normal to the light emitting area surface in air or the cladding and the arrangement of light extraction features are within the illumination volume defined by the lateral edges (parallel to the surface of the film) of the color filters in the array of color filters and extending at an angle (above or below the lightguide) of 60 degrees from the light exiting the lightguide where the angle is measured within the cladding (or air if air is the cladding) or within a component or substrate of a component adjacent the core region. In one embodiment, more than one percentage selected from the group: 50%, 60%, 70%, 80%, 90%, and 95% of the light extraction features are aligned and positioned within the illumination volume defined by the lateral edges of the color filters in the array of color filters or spatial light modulating pixels, and a direction normal to the light emitting area surface or a direction parallel to the angle of peak intensity of the light exiting the lightguide region due to the light extraction features. In another embodiment, less than one selected from the group of 50%, 40%, 30%, 20%, 10% and 5% of the light extraction features are positioned within the volume defined outside of the lateral edges of the color filters in an array of color filters or spatial light modulating pixels, and the direction normal to the light emitting area surface or the direction parallel to the angle of peak intensity of the light exiting the lightguide region. In one embodiment, the light extraction features are positioned such that the percentage of light exiting the lightguide in the light emitting area corresponding to the active area of the display that reaches the light transmitting color filters in the array of color filters or the light modulating regions of the display pixels is greater than the fill factor percentage of the array of color filters or the array of spatial light modulating pixels, respectively. In a further embodiment, the light extraction features are positioned such that a visible Moiré pattern is not introduced into the system due to the arrangement of light extraction features, color filters and/or pixels. Moiré patterns and methods for avoiding or reducing their visibility are known in the display industry and are detailed, for example in U.S. Pat. Nos. 6,333,817 and 5,684,550, the contents of which are incorporated by reference herein. In another embodiment, the illumination volume includes an average of one light extraction feature per color filter or pixel. In another embodiment, the illumination volume includes at least an average of one selected from the group: 2, 3, 4, 5, 6, 7, 8, 9, 10, 15, 20, and 30 light extraction features per color filter in an array of color filters or spatial light modulating pixel in a spatial array of light modulating pixels.

Other Devices

In one embodiment, the film-based lightguide illuminates a display, phase modulating device, component of an optical communication device, component of a medical device, or component of an analytical device. In another embodiment, a device comprises the film-based lightguide and the one or more light sources emit light with a constant phase wavefront, uniform phase wavefront, predetermined phase wavefront, compensated phase wavefront, or adjustable phase wavefront across the area or at one or more sub-regions of the light input surface area of the light input coupler for the film-based lightguide. In one or more embodiments, the light exiting the light emitting area of the light emitting device reflects from a spatial modulation device (phase and/or amplitude) or transmits through a spatial modulation device (phase and/or amplitude) and may or may not pass back through one or more regions of the lightguide (such as the light emitting area). If the light from the modulating device passes back through the lightguide, the modulating element may pre-compensate for the phase or amplitude change due to passing through the lightguide to result in a predetermined phase or amplitude output (such as a uniform constant phase wavefront, for example).

Optical Tweezers

In one embodiment, a device that provides an attractive or repulsive force on one or more microscopic (or smaller scale) dielectric objects for trapping or manipulation, such as optical tweezers, comprises the film-based lightguide, wherein the light output from the light emitting area provides illumination to a phase modulating element (or amplitude modulating element). In this embodiment, the light output from the light emitting area of the lightguide can have one or more selected from the group: constant phase wavefront, uniform phase wavefront, predetermined phase wavefront, compensated phase wavefront, or adjustable phase wavefront across the area or spatially varying across the light emitting area. For example, in one embodiment, the light from the light emitting area of the film-based lightguide is incident on a Liquid Crystal On Silicon (LCOS) phase modulation device that compensates for the phase variation to produce a predetermined phase across the cross-sectional area of the reflected light from the LCOS device that is directed toward a material comprising at least one dielectric object. In this example, the spatially modulating the phase of the LCOS device can compensate for the phase variation received from the output from the light emitting area of the lightguide and further modulate the phase to produce a spatially varying phase wavefront that can be used to apply an attractive force, repulsive force or to trap one or more dielectric objects. In another embodiment, the spatial light modulator adjusts the light input into the input surface of the light input coupler such that the light output from the light emitting area of the film-based lightguide has a uniform, predetermined, constant, varying, or otherwise controlled phase and/or light output. In this embodiment, for example, a reflective LCOS spatial light modulator can receive light and alter the phase of the light reflecting from the reflective LCOS such that the light having passed through the film-based lightguide can have a predetermined phase and/or amplitude at the output from the light emitting area. In this example, the reflective LCOS could be used to effectively pre-compensate for any phase or amplitude variation of the light traveling through the film-based lightguide (and optionally compensate for variation due to the light output from the light emitting area reflecting off of a surface or sample and passing back through the film-based lightguide). In one embodiment, an imager is used to view reflected light received or transmitted from the light emitting area to adjust the spatial phase and/or amplitude of the light from the light emitting area of the lightguide to provide a calibration (such as by generating a uniform set of interference fringes, a constant intensity, a constant phase, or a uniform interference pattern, for example).

Spatially Varying Display

In one embodiment, a display device comprises the film-based lightguide, wherein the light output from the light emitting area provides illumination to an amplitude or phase spatial light modulator. In this embodiment, the light output from the light emitting area of the lightguide can have one or more selected from the group: constant phase wavefront, uniform phase wavefront, predetermined phase wavefront, random phase wavefront, compensated phase wavefront, or adjustable phase wavefront across the area or spatially varying across the light emitting area. For example, in one embodiment, the light emitting area emits light that is directed onto a Liquid Crystal On Silicon (LCOS) phase modulation device. The LCOS device may spatially modulate the phase of the light reflecting from the modulating device to create diffraction patterns that form a near-field or far-field spatial image, phase wavefront, or amplitude wavefront. By illuminating the spatial light modulator (phase or amplitude modulator) with light from light sources with different peak luminous intensity wavelengths (such as red, green, and blue LEDs, or red, green, and blue lasers), the light transmitted through or reflected from the spatial light modulator can form a far-field image, video, or phase wavefront. In this embodiment, the light from the light sources with different peak intensities may be directed through the same input coupler, different input couplers on the same film, or on input couplers on multiple film-based lightguides. Light sources emitting light with wavelengths outside of the visible spectrum, such as infra-red or ultraviolet wavelengths, may be used to provide a display for a particular application such as a night-vision compatible display or a wavelength conversion display comprising one or more fluorophores, phosphors, quantum dots, up-converting materials, or other materials that convert light with a first spectral range of wavelengths to a second spectral range of wavelengths different than the first spectral range of wavelengths.

By spatially modulating the phase of the light from the LCOS device, one can compensate for the phase (or amplitude) variation received from the output from the light emitting area of the lightguide and further modulate the phase (or amplitude) to produce a spatially varying phase (or amplitude) wavefront. In one embodiment, the display is a head-mounted display, head-up display (such as used in a vehicle or aircraft), projection display, pico projector, near-eye display, wedge projection display, digital holography display, direct view display, virtual display, microlens array based integral display, or lightfield display. In one embodiment, a spatial light modulator is positioned to spatially modulate (amplitude or phase) the light before entering into the light input surface of the light input coupler of the light emitting device, wherein the modulated light propagates through the light mixing region to the light emitting region and is emitted from the light emitting area in the form of a two-dimensional array of light emitting locations. In this embodiment, the light from the light emitting area may form a direct view display, a virtual display, or a lightfield display. The light may be directed from the light emitting area of the lightguide using one or more selected from the group: light extraction features, light redirecting features, low angle directing features, light turning features, high refractive index regions or layers, low refractive index regions or layers, and light redirecting optical elements.

In another embodiment, a spatial light modulator is positioned to spatially modulate (amplitude or phase) the light received from the light emitting area of the film-based lightguide, wherein the modulated light may pass through the spatial light modulator (transmissive spatial light modulator) or reflect from the spatial light modulator (reflective spatial light modulator). For reflective spatial light modulators, the film-based lightguide may be positioned such that light spatially modulated and reflected from the spatial light modulator passes back through the film-based lightguide (such as passing back through the light emitting region of the film-based lightguide).

Head-Mounted Display (HMD)

In one embodiment, a head-mounted display (HMD) comprises the film-based lightguide, wherein the light output from the light emitting area provides illumination to an amplitude or phase spatial light modulator. In one embodiment, the light from the light emitting region provides illumination to the amplitude or phase spatial light modulator as a frontlight or a backlight. In another embodiment, the spatially modulated light from the amplitude or phase spatial light modulator is directed onto the input surface of a light input coupler, propagates through the lightguide film, and is emitted from the lightguide and directed to one or more eyes of the viewer wearing the head-mounted display. In one embodiment, an eyewear frame or one or more arms of a frame comprises one or more selected from the group: the light mixing region of the lightguide, an inactive region of the lightguide, the spatial light modulator, the light source, and the electronics. In one embodiment, the light emitting area of the film-based lightguide is positioned on a surface or within a lens of eyewear. In another embodiment, the head-mounted display is an attachment that can be permanently or removably attached to eyewear such as sunglasses or prescription eyewear. In this embodiment, the light emitting area may be a film that can be pressed, laminated, glued, placed adjacent, physically coupled, or optically coupled to or adjacent a lens or frame of eyewear. In one embodiment, the array of coupling lightguides extend over one selected from the group: 5, 10, 15, 20, 30, 40, 50, 60, and 70 percent of the length of the frame along one side of the eyewear. In another embodiment, the light mixing region of the lightguide extends over one selected from the group: 5, 10, 15, 20, 30, 40, 50, 60, and 70 percent of the length of the frame along one side of the eyewear.

Head-Up Display (HUD),

In one embodiment, a Head-Up Display (HUD) system comprises the film-based lightguide, wherein the light output from the light emitting area provides illumination to an amplitude or phase spatial light modulator. In one embodiment, the light emitting area of the film-based lightguide is positioned on a surface or within a window or light transmitting substrate. A Head-Up Display comprising a film-based lightguide can be configured to be substantially transparent when not displaying information or images and/or substantially transparent in portions of the light emitting region that are not emitting light based on the image being display. In another embodiment, the HUD is an attachment that can be permanently or removably attached to a window or mirror of an automobile, vehicle, or aircraft. In this embodiment, the light emitting area may be a film that can be pressed, laminated, glued, placed adjacent, physically coupled, or optically coupled to or adjacent a window, substrate, lens or light transmitting material.

Wedge Projection Display

In one embodiment, a wedge projection display system comprises the film-based lightguide, wherein the light output from the light emitting area provides illumination to an amplitude or phase spatial light modulator. In another embodiment, a wedge projection display comprises a film-based lightguide wherein the light input surface of the light input coupler receives light from a spatial light modulator (amplitude and/or phase modulated light) and the light received by the light input surface propagates through a light mixing region of the lightguide and into a light emitting region of the lightguide. In one embodiment, the wedge projection display comprises a film-based lightguide wherein the thickness of film (or lightguide region of a film) decreases within the light emitting region in the average direction of propagation of the light within the lightguide region of the film, in a direction away from the side where light enters the light emitting region to the opposite side of the light emitting region, or along the direction of propagation of the light traveling within the light emitting region. In this embodiment, the wedge shape of the lightguide extracts light (such as light collimated to an angular FWHM of less than 5 degrees, for example) propagating within the lightguide region of the film by gradually decreasing the angle of propagation (relative to the surface normal) such that it escapes the lightguide in a particular area of the light emitting region. In one embodiment, a wedge, prism, or angularly directing optical element is positioned between the spatial light modulator and the light input surface of the light input coupler to direct collimated light to an angle less than 90 degrees from the stacked surfaces of the coupling lightguides stacked to form the light input surface. In another embodiment, the light input surface has an average angle greater than 0 degrees from the thickness direction of the stacked coupling lightguides. In one embodiment, the light input to or from the spatial light modulator is collimated to an angular FWHM less than one selected from the group of 20, 10, 5, 4, 3, 2, 1, and 0.5 degrees in one or more planes such as two orthogonal planes of incidence or the plane comprising the thickness direction of the film. In another embodiment, a first film-based lightguide provides collimated light to the spatial light modulator and a second film-based lightguide receives the spatially modulated light from the spatial light modulator through a second light input surface of a second light input coupler, the light propagating through a second array of coupling lightguides and into a tapered light emitting region of the lightguide. In another embodiment, the light emitting region comprises a plurality of low angle redirection features (such as surface modification or optically coupling a film with surface relief features) that decrease the angle of propagation (relative to the thickness direction) of the light in the light emitting region of the lightguide. In this embodiment, a single wedge or tapered lightguide may be replaced by a plurality (such as an array or arrangement) of low angle redirecting features that decrease the angle of propagation (relative to the surface normal) of the light propagating in the light emitting region to extract light from the core or lightguide region of the lightguide in the light emitting region. In this embodiment, for example, low angle redirection features may spatially direct light to light extraction features or light turning features.

In another embodiment, an array of passive or active light redirecting elements (such as an array prismatic features arranged in columns with each column comprising a different features with different prism angles from adjacent columns) is positioned between the spatial light modulator and the light input surface of the light input coupler of the film-based lightguide and spatially changes the angle of the light in different spatial areas reaching the light input surface. For example, the angle of the light from each column of pixels (or groups of columns of pixels) of the spatial light modulator (or the angle of light reaching each of the column of pixels) may be changed spatially when the columns of pixels are oriented in a direction parallel to the stack direction of the stacked coupling lightguides, and one or more rows of the spatial light modulator are positioned such that light from the one or more rows of pixels enters a single coupling lightguide of the array of coupling lightguides. In this embodiment, the light from the one or more rows of pixels correspond to a single coupling lightguide and within the coupling lightguide, different columns of pixels are directed into different angles of propagation within the lightguide in a plane comprising the thickness direction of the film. In this embodiment, the low angle light direction features (or a wedge or tapered lightguide in the light emitting region) may progressively couple light out of the core region of the lightguide from different columns as the light from each coupling lightguide travels within a region corresponding to a row of display pixels parallel to the direction of taper or low angle light redirection in the light emitting area. The array of light redirecting elements may be an array of prisms wherein the angle of each column of prism features in the array of prisms varies slightly (increasing) along the columns. Thus refracting the light from the columns into slightly different angles.

In this embodiment, the collimated light incident on the spatial light modulator propagates to the light emitting region of the lightguide with the light beam redirected from each prism remaining collimated, wherein the strips correspond to one or more rows of the spatial display of the light emitting region and different angles of light within each strip in a plane comprising the thickness direction correspond to the different columns of light output of the spatial display of the light emitting region.

In another embodiment, the array of light redirecting elements is an active optical element such as liquid crystal modulator, an array of microfluidic optical elements, MEMS array, or other active optical element that can change the angle of incident light to a chosen second angle of light different from the first angle such that the final angle of light within the light emitting region of the lightguide can be controlled to achieve light redirection at the desired lateral location corresponding to a column in a display. In this embodiment, the angle of the light entering into the light input coupler for each pixel may be pre-adjusted such that the light is extracted in the light emitting region at the appropriate column and/or row to form the spatial array of light emitting pixels.

In another embodiment, a spatial light modulator that spatially redirects the angle of light into different directions may be used to provide the light redirection for output coupling and to modulate the light. For example, a digital micro-mirror device, such as a Texas Instruments Digital Micromirror Device (DMD) may be used to provide angular variation for one or more rows, columns, or pixels such that the output location of the light from the film-based lightguide may be controlled along the length of the coupling lightguide or film-based lightguide. In this embodiment, the coupling lightguides may extend into and may define all or a portion of the light emitting area and the film-based lightguide may not need a body region or full body region for emitting light and/or mixing light from the coupling lightguides. Other angular modulation devices may be used to modulate and control the angle of light corresponding to rows, columns, or pixels such as uniaxial or biaxial scanners (including galvanometric or Microelectromechanical system (MEMS) scanners or spatial light modulators). In another embodiment, the function of varying light redirection for each column (or row) may be incorporated into the spatial light modulator, such as for example by altering the reflecting surface angle in a reflective spatial light modulator or providing a transmissive light redirecting element on the surface of a transmissive spatial light modulator. In another embodiment, the spatial light modulator modulates the angle of the light in a spatial array using amplitude and/or phase diffraction to generated angular deviation of light in each columns or row. In this embodiment, the spatial light modulator may be in the form of a digital diffractive optical element.

Optical Storage

In one embodiment, an optical storage device comprises the film-based lightguide, wherein the light output from the light emitting area provides illumination to an amplitude or phase spatial light modulator. In this embodiment, the light output from the light emitting area of the lightguide can have one or more selected from the group: constant phase wavefront, uniform phase wavefront, predetermined phase wavefront, random phase wavefront, compensated phase wavefront, or adjustable phase wavefront across the area or spatially varying across the light emitting area. In one embodiment, the light from the light emitting area illuminates a spatial light modulator (phase or amplitude) and the modulated light profile is imaged or recorded onto an optical storage material. For example, in one embodiment, the light from the light emitting area of the film-based lightguide illuminates a spatial phase modulating device (such as a reflective LCOS device) and the light reflecting or transmitting from the spatial phase modulating device is directed onto a recording medium along with reference light to record an interference pattern representing the holographic recording of the phase modulated light profile from the spatial phase modulating device. In one embodiment, the optical storage device is a holographic data storage device.

Optical Metrology Device

In one embodiment, an optical metrology device comprises the film-based lightguide, wherein the light output from the light emitting area provides illumination to an amplitude or phase spatial light modulator. In this embodiment, the light output from the light emitting area of the lightguide can have one or more selected from the group: constant phase wavefront, uniform phase wavefront, predetermined phase wavefront, random phase wavefront, compensated phase wavefront, or adjustable phase wavefront across the area or spatially varying across the light emitting area. In one embodiment, the light from the light emitting area illuminates a spatial light modulator (phase or amplitude) and the modulated light is directed (imaged, projected, or allowed to converge or diverge) toward an object and illuminates the object with an amplitude and/or phase pattern or profile of light. In one embodiment, the optical metrology device comprises an imager that receives the light reflected from the object (or transmitted through the object) illuminated by the pattern of light from the spatial light modulator and the pattern of light is subsequently changed. By analyzing the change in the images of the light reflected from the object and captured by the imager, a three-dimensional depth or surface profile can be generated for the illuminated area of the object.

Reconfigurable Optical Add-Drop Multiplexer

In one embodiment, an optical add-drop multiplexer or a component thereof comprises a film-based lightguide and an amplitude or phase spatial light modulator. In one embodiment, the optical add-drop multiplexer is a wavelength-division multiplexing system for multiplexing and routing different channels of light into or out of a fiber such as a single mode optical fiber. In one embodiment, the array of coupling lightguide receives light comprising multiple signals and directs the light through the film to the spatial light modulator and the spatial light modulator modulates the light to add or remove one or more signals. In one embodiment, a surface of the film-based lightguide receives light modulated in phase and/or amplitude and directs the light to the coupling lightguides that coupling light out through the stacked array of coupling lightguides at the light output surface formed from the ends of the coupling lightguides (analogous to the light input surface of the light input coupler where the optical path is in reverse in this embodiment).

Multiple Light Emitting Areas or Displays

In one embodiment, the light emitting device includes two or more light emitting areas or displays defined by regions with one or more properties selected from the group: emit different color gamuts; emit light within different functional areas of the display; emit light with different angular properties; emit light to illuminate a button, key, keyboard area, or other user interface region; have different sizes or shapes; and are positioned on different sides or surfaces of the device. In one embodiment, the light emitting device includes two or more light emitting regions with different use modes or different illumination modes. A different illumination mode can include one or more different light output properties selected from the group: different times in the "on" state or "off" state of illumination; different frequencies of illumination; different durations of illumination; different colors of illumination; different color gamuts; different angular light output profiles; different spatial light output profiles; different spatial luminance uniformity; and different color, luminances or luminous intensity at a specific angle. For example, in one embodiment, the light emitting device illuminates a main display and a sub-display. The main display and sub-display could be two light emitting areas defined by the same spatial light modulator or two light emitting areas defined by two separate spatial light modulators. In one embodiment, each light emitting area or display may be illuminated by the same or different lightguides and/or light sources. For example, in one embodiment, the light emitting device has a high color gamut lightguide positioned to illuminate the main display of a device with a main display and sub-display from the front in a first mode using light from monochrome red, green, and blue LEDs. In this embodiment, the sub-display can be illuminated by a second lightguide that emits only white light to reduce the power required for illuminating the sub-display (which could include icons or keys, for example) to the same luminance. In another embodiment, a first display region includes an array of color filters and a second display region does not include an array of color filters. For example, in one embodiment, the sub-display may be designed without a color filter array such that the monochrome sub-display illuminated by a white (or monochrome) light source can operate at a significantly lower power for the same luminance as the main display with color filters since light is not absorbed by a color filter array.

In one embodiment, the device includes two or more lightguides spatially separated in the plane of the active area of the light emitting device such that they can be illuminated independently. In this embodiment, for example, the edges of one or more lightguides opposite the side of the lightguide with the light input coupler may include a light reflective or absorptive coating to prevent light from exiting one lightguide and entering into an adjacent lightguide. In one embodiment, the spatially separated lightguides permit the light emitting display device to have a substantially uniform thickness.

Light Emitting Device Assembly

In one embodiment, the film-based lightguide is adhered to a display, component of a display, or other component of a light emitting device using lamination and/or one or more of the following: addition of pressure, addition of heat, laminating a coated layer or region, laminating to a relative position maintaining element, and coating an adhesive onto a substrate or component and joining one component to another.

In one embodiment, the adhesive functions as a cladding between the core region of the lightguide and another component, and reduces the flux of light absorbed by the RPME due to the lightguide contacting the RPME. In another embodiment, the pressure sensitive adhesive increases the yield strength or impact strength (Izod or Charpy impact strength, for example) of the film-based lightguide, light emitting device, and/or display. In one embodiment, an adhesive is positioned between the lightguide and a reflective film, surface of the relative position maintaining element, or optical component disposed to receive light from the light source and direct it into the input surface of the stack of coupling lightguides.

Luminance Uniformity of the Backlight, Frontlight, or Light Emitting Device

In another embodiment, the light source emitting light into an array of coupling lightguides includes light sources of two or more different colors (such as a red, green, and blue LED) and the spatial color non-uniformity, $\Delta u'v'$, along a line parallel to the array of coupling lightguides or perpendicular to the optical axis of the light travelling within the coupling lightguides at the side of the taper closer to the light source along the length of the coupling lightguides) measured on the 1976 u', v' Uniform Chromaticity Scale as described in VESA Flat Panel Display Measurements Standard version 2.0, Jun. 1, 2001 (Appendix 201, page 249) is less than one selected from the group: 0.2, 0.1, 0.05, 0.01, and 0.004. In one embodiment, the color difference, $\Delta u'v'$, of two light sources disposed to emit light into the light input surface is greater than 0.1 and the spatial color non-uniformity, $\Delta u'v'$, of the light from the two light sources in the coupling lightguide before entering the taper region is less than 0.1.

The spatial color non-uniformity of the light across a coupling lightguide at a specific location along a coupling lightguide may be measured by cutting the coupling lightguide orthogonal to the optical axis of the light traveling within the coupling lightguide and positioning a spectrometer (or input to a spectrometer such as a fiber optic collector) along the cut edge in a direction oriented along the optical axis of the light exiting the coupling lightguide.

In one embodiment, a light emitting device includes a light source, a light input coupler, and a film-based lightguide wherein the 9-spot spatial luminance uniformity of the light emitting surface of the light emitting device measured according to VESA Flat Panel Display Measurements Standard version 2.0, Jun. 1, 2001 is greater than one selected from the group: 60%, 70%, 80%, 90%, and 95%. In another embodiment, a display includes a spatial light modulator and a light emitting device including a light source, a light input coupler, and a film-based lightguide wherein the 9-spot spatial luminance uniformity of the light reaching the spatial light modulator (measured by disposing a white reflectance standard surface such as Spectralon by Labsphere Inc. in the location where the spatial light modulator would be located to receive light from the lightguide and measuring the light reflecting from the standard surface in 9-spots according to VESA Flat Panel Display Measurements Standard version 2.0, Jun. 1, 2001) is greater than one selected from the group: 60%, 70%, 80%, 90%, and 95%. In another embodiment, a display includes a spatial light modulator and a light emitting device including a light source, a light input coupler, and a film-based lightguide wherein the 9-spot spatial luminance uniformity of the display measured according to VESA Flat Panel Display Measurements Standard version 2.0, Jun. 1, 2001) is greater than one selected from the group: 60%, 70%, 80%, 90%, and 95%.

Color Uniformity of the of the Backlight, Frontlight, or Light Emitting Device

In one embodiment, a light emitting device includes a light source, a light input coupler, and a film-based lightguide wherein the 9-spot sampled spatial color non-uniformity, $\Delta u'v'$, of the light emitting surface of the light emitting device measured on the 1976 u', v' Uniform Chromaticity Scale as described in VESA Flat Panel Display Measurements Standard version 2.0, Jun. 1, 2001 (Appendix 201, page 249) is less than one selected from the group: 0.2, 0.1, 0.05, 0.01, and 0.004 when measured using a spectrometer based spot color meter. In another embodiment, a display includes a spatial light modulator and a light emitting device including a light source, a light input coupler, and a film-based lightguide wherein the 9-spot sampled spatial color non-uniformity, $\Delta u'v'$, of the of the light reaching the spatial light modulator (measured by disposing a white reflectance standard surface such as Spectralon in the location where the spatial light modulator would be located to receive light from the lightguide and measuring the color of the standard surface on the 1976 u', v' Uniform Chromaticity Scale as described in VESA Flat Panel Display Measurements Standard version 2.0, Jun. 1, 2001 (Appendix 201, page 249) is less than one selected from the group: 0.2, 0.1, 0.05, 0.01, and 0.004 when measured using a spectrometer based spot color meter. In another embodiment, a display includes a spatial light modulator and a light emitting device including a light source, a light input coupler, and a film-based lightguide wherein the 9-spot sampled spatial color non-uniformity, $\Delta u'v'$, of the display measured on the 1976 u', v'

Uniform Chromaticity Scale as described in VESA Flat Panel Display Measurements Standard version 2.0, Jun. 1, 2001 (Appendix 201, page 249) is less than one selected from the group: 0.2, 0.1, 0.05, 0.01, and 0.004 when measured using a spectrometer based spot color meter.

Angular Profile of Light Emitting from the Light Emitting Device

In one embodiment, the light emitting from at least one surface of the light emitting device has an angular full-width at half-maximum intensity (FWHM) less than one selected from the group: 120 degrees, 100 degrees, 80 degrees, 60 degrees, 40 degrees, 20 degrees and 10 degrees. In another embodiment, the light emitting from at least one surface of the light emitting device has at least one angular peak of intensity within at least one angular range selected from the group: 0-10 degrees, 20-30 degrees, 30-40 degrees, 40-50 degrees, 60-70 degrees, 70-80 degrees, 80-90 degrees, 40-60 degrees, 30-60 degrees, and 0-80 degrees from the normal to the light emitting surface. In another embodiment, the light emitting from at least one surface of the light emitting device has two peaks within one or more of the aforementioned angular ranges and the light output resembles a "bat-wing" type profile known in the lighting industry to provide uniform illuminance over a predetermined angular range. In another embodiment, the light emitting device emits light from two opposing surfaces within one or more of the aforementioned angular ranges and the light emitting device is one selected from the group: a backlight illuminating two displays on either side of the backlight, a light fixture providing up-lighting and down-lighting, a frontlight illuminating a display and having light output on the viewing side of the frontlight that has not reflected from the modulating components of the reflective spatial light modulator with a peak angle of luminance greater than 40 degrees, 50 degrees, or 60 degrees. In another embodiment, the optical axis of the light emitting device is within an angular range selected from the group: 0-20, 20-40, 40-60, 60-80, 80-100, 100-120, 120-140, 140-160, 160-180, 35-145, 45-135, 55-125, 65-115, 75-105, and 85-95 degrees from the normal to a light emitting surface. In a further embodiment, the shape of the lightguide is substantially tubular and the light substantially propagates through the tube in a direction parallel to the longer (length) dimension of the tube and the light exits the tube wherein at least 70% of the light output flux is contained within an angular range of 35 degrees to 145 degrees from the light emitting surface. In a further embodiment, the light emitting device emits light from a first surface and a second surface opposite the first surface wherein the light flux exiting the first and second surfaces, respectively, is chosen from the group: 5-15% and 85-95%, 15-25% and 75-85%, 25-35% and 65-75%, 35-45% and 65-75%, 45-55% and 45-55%. In another embodiment, the first light emitting surface emits light in a substantially downward direction and the second light emitting surface emits light substantially in an upward direction. In another embodiment, the first light emitting surface emits light in a substantially upward direction and the second light emitting surface emits light substantially in a downward direction.

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In one embodiment, the coupling lightguides, or core regions thereof, are continuous with the lightguide region of the film as formed during the film formation process. For example, coupling lightguides formed by slicing regions of a film at spaced intervals can form coupling lightguides that are continuous with the lightguide region of the film. In another embodiment, a film-based lightguide with coupling lightguides continuous with the lightguide region can be formed by injection molding or casting a material in a mold including a lightguide region with coupling lightguide regions with separations between the coupling lightguides. In one embodiment, the region between the coupling lightguides and lightguide region is homogeneous and without interfacial transitions such as without limitation, air gaps, minor variations in refractive index, discontinuities in shapes or input-output areas, and minor variations in the molecular weight or material compositions.

In another embodiment, at least one selected from the group: lightguide layer, light transmitting film, cladding region, adhesive region, adhesion promotion region, or scratch resistant layer is coated onto one or more surfaces of the film or lightguide. In another embodiment, the lightguide or cladding region is coated onto, extruded onto or otherwise disposed onto a carrier film. In one embodiment, the carrier film permits at least one selected from the group: easy handling, fewer static problems, the ability to use traditional paper or packaging folding equipment, surface protection (scratches, dust, creases, etc.), assisting in obtaining flat edges of the lightguide during the cutting operation, UV absorption, transportation protection, and the use of winding and film equipment with a wider range of tension and flatness or alignment adjustments. In one embodiment, the carrier film is removed before coating the film, before bending the coupling lightguide, after folding the coupling lightguides, before adding light extraction features, after adding light extraction features, before printing, after printing, before or after converting processes (further lamination, bonding, die cutting, hole punching, packaging, etc.), just before installation, after installation (when the carrier film is the outer surface), and during the removal process of the lightguide from installation. In one embodiment, one or more additional layers are laminated in segments or regions to the core region (or layers coupled to the core region) such that there are regions of the film without the one or more additional layers. For example, in one embodiment, an optical adhesive functioning as a cladding layer is optically coupled to a touchscreen substrate; and an optical adhesive is used to optically couple the touchscreen substrate to the light emitting region of film-based lightguide, thus leaving the coupling lightguides without a cladding layer for increased input coupling efficiency.

In another embodiment, the carrier film is slit or removed across a region of the coupling lightguides. In this embodiment, the coupling lightguides can be bent or folded to a smaller radius of curvature after the carrier film is removed from the linear fold region.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. The relative position maintaining element may be adhered, clamped, disposed in contact, disposed against a linear fold region or disposed between a linear fold region and a lightguide region. The relative position maintaining element may be a polymer or metal component that is adhered or held against the surface of the coupling lightguides, light mixing region, lightguide region or film at least during one of the translational steps. In one embodiment, the relative position maintaining element is a polymeric strip with planar or saw-tooth-like teeth adhered to either side of the film near the first linear fold region, second linear fold region, or both first and second linear fold regions of the coupling lightguides. By using saw-tooth-like teeth, the teeth can promote or facilitate the bends by providing angled guides. In another embodiment, the relative position maintaining element is a mechanical device with a first clamp and a second clamp that holds the coupling lightguides in relative position in a direction parallel to the clamps parallel to the first linear fold region and translates the position of the clamps relative to each other such that the first linear fold region and the second linear fold region are translated with respect to each other to create overlapping coupling lightguides and bends in the coupling lightguides. In another embodiment, the relative position maintaining element maintains the relative position of the coupling lightguides in the first linear fold region, second linear fold region, or both the first and second linear fold regions and provides a mechanism to exert force upon the end of the coupling lightguides to translate them in at least one direction.

In another embodiment, the relative position maintaining element includes angular teeth or regions that redistribute the force at the time of bending at least one coupling lightguide or maintains an even redistribution of force after at least one coupling lightguide is bent or folded. In another embodiment, the relative position maintaining element redistributes the force from bending and pulling one or more coupling lightguides from a corner point to substantially the length of an angled guide. In another embodiment, the edge of the angled guide is rounded.

In another embodiment, the relative position maintaining element redistributes the force from bending during the bending operation and provides the resistance to maintain the force required to maintain a low profile (short dimension in the thickness direction) of the coupling lightguides. In one embodiment, the relative position maintaining element includes a low contact area region, material, or surface relief regions operating as a low contact area cover, or region wherein one or more surface relief features are in physical contact with the region of the lightguide during the folding operation and/or in use of the light emitting device. In one embodiment, the low contact area surface relief features on the relative position maintaining element reduce decoupling of light from the coupling lightguides, lightguide, light mixing region, lightguide region, or light emitting region.

In a further embodiment, the relative position maintaining element is also a thermal transfer element. In one embodiment, the relative position maintaining element is an aluminum component with angled guides or teeth that is thermally coupled to an LED light source.

In another embodiment, a method of manufacturing a lightguide and light input coupler including a light transmitting film with a lightguide region continuously coupled to each coupling lightguide in an array of coupling lightguides where the array of coupling lightguides include a first linear fold region and a second linear fold region substantially parallel to the first fold region, includes the steps: (a) forming an array of coupling lightguides physically coupled to a lightguide region in a light transmitting film by physically separating at least two regions of a light transmitting film in a first direction; (b) increasing the distance between the first linear fold region and the second linear fold region of the array of coupling lightguides in a direction perpendicular to the light transmitting film surface at the first linear fold region; (c) decreasing the distance between the first linear fold region and the second linear fold region of the array of coupling lightguides in a direction substantially perpendicular to the first linear fold region and parallel to the light transmitting film surface at the first linear fold region; (d) increasing the distance between the first linear fold region and the second linear fold region of the array of coupling lightguides in a direction substantially parallel to the first linear fold region and parallel to the light transmitting film surface at the first linear fold region; and (e) decreasing the distance between the first linear fold region and the second linear fold region of the array of coupling lightguides in a direction perpendicular to the light transmitting film surface at the first linear fold region; such that the coupling lightguides are bent, disposed substantially one above another, and aligned substantially parallel to each other.

In another embodiment, the aforementioned method further includes the step of cutting through the overlapping coupling lightguides to provide an array of input edges of the coupling lightguides that end in substantially one plane orthogonal to the light transmitting film surface. The coupling lightguides may be formed by cutting the film in lines to form slits in the film. In another embodiment, the aforementioned method of manufacture further includes forming an array of coupling lightguides in a light transmitting film by cutting substantially parallel lines within a light transmitting film. In one embodiment, the slits are substantially parallel and equally spaced apart. In another embodiment, the slits are not substantially parallel or have non-constant separations.

In another embodiment, the aforementioned method further includes the step of holding the overlapping array of coupling lightguides in a fixed relative position by at least one selected from the group: clamping them together, restricting movement by disposing walls or a housing around one or more surfaces of the overlapping array of coupling lightguides, and adhering them together or to one or more surfaces.

In a further embodiment, the input ends and output ends of the array of coupling lightguides are each disposed in physical contact with relative position maintaining elements during the aforementioned steps (a), (b), (c) and (d).

In one embodiment, a relative position maintaining element disposed proximal to the first linear fold region of the array of coupling lightguides has an input cross-sectional edge in a plane parallel to the light transmitting film that is substantially linear and parallel to the first linear fold region, and a relative position maintaining element disposed proximal to the second linear fold region of the array of coupling lightguides at the second linear fold region of the array of coupling lightguides has a cross-sectional edge in a plane parallel to the light transmitting film at the second linear fold region substantially linear and parallel to the linear fold region.

In another embodiment, the cross-sectional edge of the relative position maintaining element disposed proximal to the first linear fold region of the array of coupling lightguides remains substantially parallel to the cross-sectional edge of the relative position maintaining element disposed proximal to the second linear fold region of the array of coupling lightguides during steps (a), (b), (c), and (d).

In another embodiment, a method of manufacturing a lightguide and light input coupler including a light transmitting film with a lightguide region optically and physically coupled to each coupling lightguide in an array of coupling lightguides, where a first fold region and a second fold region are defined in the array of coupling lightguides, includes the steps: (a) translating the first fold region and the second fold region away from each other in a direction substantially perpendicular to the film surface at the first fold region such that they move toward each other in a plane parallel to the film surface at the first fold region and (b) translating the first fold region and the second fold region away from each other in a direction parallel to the first fold region such that the first fold region and second fold region move toward each other in a direction substantially perpendicular to the film surface at the first fold region such that the coupling lightguides are bent and disposed substantially one above another.

Angled Teeth

In a further embodiment, the relative position maintaining element disposed proximal to the first linear fold region has a cross-sectional edge in a plane parallel to the light transmitting film surface disposed proximal to the first linear fold region that includes a substantially linear section oriented at an angle greater than 10 degrees to the first linear fold region for at least one coupling lightguide. In a further embodiment, the relative position maintaining element has sawtooth-like teeth oriented substantially at 45 degrees to a linear fold region of the coupling lightguides. In one embodiment, the cross-sectional edge of the relative position maintaining element forms a guiding edge to guide the bend of at least one coupling lightguide. In another embodiment, the relative position maintaining element is thicker than the coupling lightguide that is folded around or near the relative position maintaining element such that the relative position maintaining element (or a region such as a tooth or angular extended region) does not cut or provide a narrow region for localized stress that could cut, crack, or induce stress on the coupling lightguide. In another embodiment, the ratio of the relative position maintaining element or the component (such as an angled tooth) thickness to the average thickness of the coupling lightguide(s) in contact during or after the folding is greater than one selected from the group of 1, 1.5, 2, 3, 4, 5, 10, 15, 20, and 25. In one embodiment the relative position maintaining element (or component thereof) that is in contact with the coupling lightguide(s) during or after the folding is greater than one selected from the group: 0.05, 0.1, 0.2, 0.3, 0.5, 0.6, 0.7, 0.8, 0.9, and 1 millimeter.

In one embodiment, the array of angled teeth in an RPME include first edges oriented at a first tooth edge angle to the extended direction of the teeth (the direction the teeth extend from the spine, perpendicular to the array direction of the array of teeth) and second tooth edges oriented at a second tooth edge angle to the extended direction of the teeth wherein the first tooth edge angle and second tooth edge angle are greater than 0 degrees. In one embodiment, a light input coupler includes an RPME wherein the extended direction of the teeth is parallel to the extended direction of the array of coupling lightguides and the array direction of the teeth is parallel to the array direction of the array of coupling lightguides. In one embodiment, the first edge tooth angle is between one selected from the group: 40 degrees and 50 degrees; 35 degrees and 55 degrees; 30 degrees and 60 degrees; 25 degrees and 65 degrees; 20 degrees and 65 degrees; and 15 degrees and 70 degrees. In another embodiment, the second edge tooth angle is one selected from the group: 0 degrees, greater than 0 degrees, greater than 5 degrees, greater than 10 degrees, greater than 20 degrees, greater than 25 degrees, greater than 0 degrees and less than or equal to 5 degrees, greater than 0 degrees and less than or equal to 10 degrees, greater than 0 degrees and less than or equal to 15 degrees; greater than 0 degrees and less than or equal to 20 degrees, and between 1 and 20 degrees.

In one embodiment, a light input coupler includes a folded and stacked array of a first coupling lightguide and second coupling lightguide extended from a film body, and the first coupling lightguide has a smaller radius of curvature at the first fold than the second coupling lightguide at the second fold. In this embodiment, an RPME includes a first tooth and second tooth positioned within the fold of the first coupling lightguide and second coupling lightguide, respectively, and the average thickness of the first tooth at the first fold is less than the average thickness of the second tooth at the second fold. The tooth thickness direction is the direction perpendicular to the plane including the direction the teeth extend from the spine and the array direction of the array of teeth. In this embodiment, the larger radius of curvature of the second coupling lightguide permits a thicker second tooth and a larger contact area for the second coupling lightguide at the first edge of the second tooth. The larger contact area can distribute the force from tension during or after the folding operation onto a larger area and reduce the likelihood of the coupling lightguides tearing or creasing. In another embodiment, an RPME includes a first tooth and a second tooth, and the first edge of the first tooth has a first average thickness less than the average thickness of the first edge of the second tooth. In this embodiment, the angled edge can be thicker than other regions of the tooth to reduce the weight and/or volume the RPME.

In one embodiment, the angled teeth of the RPME include two linear edges with a curved region with a first radius of curvature between the two linear edges. In one embodiment, the first radius of curvature is greater than one selected from the group: 0.1, 0.5, 1, 2, 4, 8, 10, 20, 30, 40, 50, 100, 200, and 500 millimeters. In this embodiment, the curved region is less likely to cut or tear a coupling lightguide during folding, application onto the lightguide, or an alignment operation than a sharp intersection of the edges.

In one embodiment, the angled teeth of the RPME are truncated at the base (the region where the teeth connect to the spine of the RPME). For example, in one embodiment, the angled teeth include two linear edges that intersect (or include a curved region between them with a radius of curvature) and include truncated linear regions on the opposite ends of the edges that may be substantially parallel to the extended direction of the array of coupling lightguides.

In one embodiment, one or more of the angled teeth in a RPME are truncated where the angled teeth join with the spine or between the first edge and second edge. In on embodiment, the length of the first edges of the angled teeth are less than the width of corresponding coupling lightguides folded around the teeth and the angled teeth are truncated such that the coupling lightguide has the flexibility to self-align along the first edge in the folding and/or stacking step. In another embodiment, the angled teeth are truncated and the ratio of the length of the first edge to the width of the coupling lightguide folded around the edge for one or more teeth and coupling lightguides is one selected from the group: less than 1, less than 0.9, less than 0.8, less than 0.7, less than 0.6, less than 0.5, greater than 1, greater than 1.1, greater than 1.2, greater than 1.3, greater than 1.4, greater than 1.5, between 0.1 and 2, and greater than 2. In this embodiment, the reduced first edge lengths and/or truncated teeth reduces the likelihood of non-uniform stress or tension on the coupling lightguides, reduces the likelihood of creasing or tearing the coupling lightguides, increases the positional tolerance of the coupling lightguide before the fold or after the fold, or increases the folding or rotational tolerance of the coupling lightguides. In another embodiment, the spine of the RPME includes one or more protrusions, guides, or standoffs positioned to contact the lateral edges of a plurality of folded and stacked coupling lightguides to limit their position in the first extended direction. In one embodiment, the protrusions, guides, or standoffs on the RPME align the lightguides in the extended direction while reducing the length (and area) of the lateral edges of the coupling lightguide in contact with the spine of the RPME. In one embodiment, the spine includes one or more protrusions, guides, or standoffs that contact one or more lateral edges of the stacked array of coupling lightguides in a first contact percentage of the total area of the lateral edges of the one or more lateral edges of the stacked array of coupling lightguides in the region from the end of the fold to the light input surface. In one embodiment, the first contact percentage is selected from the group: less than 100, less than 90, less than 80, less than 70, less than 60, less than 50, less than 40, less than 30, less than 20, less than 10, less than 5, less than 2, and less than 1 percent. In one embodiment, the reduced contact area reduces the light extraction and/or light absorption of light reaching the lateral edges from within the coupling lightguides.

Spine of the RPME

In one embodiment, the RPME includes a spine configured to support an array of alignment guides or angled teeth. In another embodiment, the spine of an RPME connects an array of angled teeth wherein the spine does not extend past the angled teeth portion of the RPME. In this embodiment, when an array of coupling lightguides are folded 90 degrees and stacked, the lateral edges of the stacked coupling lightguides can be translated from the fold point in a plane parallel to the light emitting film by a first fold distance such that array of angled teeth are coupled together in the upper regions of the spine (the regions on the fold side of the RPME) without extending past the angled teeth of the RPME. In this embodiment, the total volume of the RPME, and thus the input coupler can be reduced. In one embodiment, the first fold distance is the translation distance $D_n$. In one embodiment, the width of the spine region is less than or equal to the translation distance $D_n$. In another embodiment, the angled teeth or guides of the RPME are physically coupled within the volume of the fold region of the array of coupling lightguide defined between the overlapping sections of the array of coupling lightguides. In a further embodiment, the angled teeth or guides of the RPME are physically coupled by a spine that does not extend outside the volume defined between the overlapping sections of the array of coupling lightguides in the regions of the fold. In another embodiment, the angled teeth or guides of the RPME are physically coupled by a spine that does not extend past the lateral edges of the folded and stacked array of coupling lightguides. In a further embodiment, the spine extends along one side (such as the fold side in the direction of the fold from the lightguide region of the film-based lightguide) such that the angled teeth or guides intersect the spine on that side. In a further embodiment, the spine does not extend past the angled teeth of the RPME.

Cut-to-Length Relative Position Maintaining Element

In one embodiment, a relative position maintaining element (RPME) is configured to be cut-to-size or separated into two or more parts to be used with different configurations of lightguides, coupling lightguides, or light emitting devices. In one embodiment, the relative position maintaining element includes one or more selected from the group: a reflective surface; alignment guides for an optical element, light source, or element housing a light source; guides for stacking the coupling lightguides; apertures, grooves, or perforations for cutting the stacked array of coupling lightguides; and alignment holes disposed proximate a first end of an elongated relative position maintaining element. In another embodiment the relative position maintaining element may be cut-to-size or separated into two or more parts such that the opposite end is not used. In another embodiment, the RPME includes a plurality of angled teeth and alignment ridges, guides, or holes within or adjacent each angled tooth. In this embodiment, the last tooth (opposite the light input side) may be aligned with a region, such as the light mixing region near a lateral edge on the opposite side of the film-based lightguide. In one embodiment, the RPME includes an array of alignment guides (such as angled teeth) and one or more registration pins or guides. In another embodiment, the RPME includes one or more separation mechanisms selected from the group: separation guides, separation grooves, separation perforations, separation voids, cutting guides, and separation edges such that the RPME may be separated (by cutting or breaking, for example) to reduce the length of an RPME. For example, in one embodiment the RPME includes one or more arrays of perforations in the spine region between the angled teeth such that the RPME can be snapped and broken apart along one of the arrays of perforations. Similarly, in another example, the RPME includes a groove recessed into the RPME and parallel to the extended direction of the angled teeth in the spine region between the angled teeth such that the RPME can be snapped and broken apart along the groove. In one embodiment, the RPME is separated into two smaller RPME's that maintain the relative position of coupling lightguides in two separate light input couplers. In one embodiment, the RPME is separated into three or more sections that may be used in three or more light input couplers. In one embodiment, the array of coupling lightguides are folded and stacked before cutting the RPME. In another embodiment, the array of coupling lightguides are folded and stacked after cutting the RPME. In another embodiment, the RPME is cut or separated after the film-based lightguide is laminated to the display. In a further embodiment, the RPME is cut or separated before the film-based lightguide is laminated to the display.

In one embodiment, the RPME includes alignment guides such as holes, ridges, openings, teeth, protrusions, or connectors, on one, two, three, or four sides of the RPME. For example, in one embodiment, the RPME is longer in a first direction than a second orthogonal direction and includes one or more alignment holes near the two ends in the longer direction. In one embodiment, one or more alignment guides is positioned on the side of the RPME opposite the teeth in the second orthogonal direction.

Perforated Areas

In one embodiment, the light emitting device includes one or more functional layers selected from the group: the film-based lightguide; cladding layer of the film based lightguide; touchscreen layer or substrate; hardcoating layer or substrate; anti-glare layer or substrate; color filter layer or substrate; electro-optic layer or substrate; reflective material, film, layer, or substrate; polarizer layer or substrate; light redirecting layer or substrate; light extraction feature film, layer or substrate; impact protection layer or substrate; internal coating or layer; conformal coating or layer; circuit board or layer; thermally conducting film, layer or substrate; sealant layer or substrate; spacer layer or substrate; electrically conducting layer (transparent or opaque) or substrate; anode layer or substrate; cathode layer or substrate; active matrix layer or substrate; and passive matrix layer or substrate. In one embodiment, at least one functional layer is perforated to allow for tearing of the functional layer or substrate before, during, or after assembly, forming the coupling lightguides, folding the coupling lightguides, stacking the ends of the coupling lightguides, or adhering the lightguide to a display. In one embodiment, the substrate or functional layer is perforated in order to maintain tension or to enable holding of a functional layer for alignment or positioning during an assembly process and removal of the section on one side of the perforation after the process. For example, in one embodiment, the film-based lightguide includes perforated regions that enable the film to be held under tension, or increased tension from one or more sides during assembly and the film can be torn in the perforated areas after assembly or an assembly step to reduce the final dimensions of the lightguide. In one embodiment, the perforations are created by stamping, laser cutting, blade cutting, or embossing. In one embodiment, a wrap includes one or more guide regions with one or more alignment guide holes, and perforations positioned between the one or more alignment guide holes and the region of the wrap physically coupled to a light input coupler or component thereof. In this embodiment, the alignment guide region can be removed by tearing along the perforation after adhering the wrap to the lightguide, for example. In another embodiment, a lightguide includes one or more guide regions with one or more alignment guide holes, and perforations positioned between the one or more alignment guide holes and the light emitting region. In this embodiment, the alignment guide region can be removed by tearing along the perforation after lamination of the lightguide to another film or folding and stacking the coupling lightguides, for example.

Folding and Assembly

In one embodiment, the coupling lightguides are heated to soften the lightguides during the folding or bending step. In another embodiment, the coupling lightguides are folded while they are at a temperature above one selected from the group: 50 degrees Celsius, 70 degrees Celsius, 100 degrees Celsius, 150 degrees Celsius, 200 degrees Celsius, and 250 degrees Celsius.

Folder

In one embodiment, the coupling lightguides are folded or bent using opposing folding mechanisms. In another embodiment, grooves, guides, pins, or other counterparts facilitate the bringing together opposing folding mechanisms such that the folds or bends in the coupling lightguides are correctly folded. In another embodiment, registration guides, grooves, pins or other counterparts are disposed on the folder to hold in place or guide one or more coupling lightguides or the lightguide during the folding step.

Assembly Order

In one embodiment, the film-based lightguide includes an array of coupling lightguides and the array of coupling lightguides are folded prior to physically or optically coupling the film-based lightguide to the light emitting device, display or a component thereof. In another embodiment, the array of coupling lightguides are folded after physically or optically coupling the film-based lightguide to the light emitting device, display or a component thereof. In another embodiment, the light emitting device or display includes a light input coupler including a folded, stacked array of coupling lightguides and the light input coupler is assembled before or after the film-based lightguide is laminated to the display. In one embodiment, the display functions as a relative position maintaining element and adhering the film-based lightguide to the display maintains the relative position of the coupling lightguides during the subsequent folding operation.

The following are more detailed descriptions of various embodiments illustrated in the Figures.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown).

Figure 2:
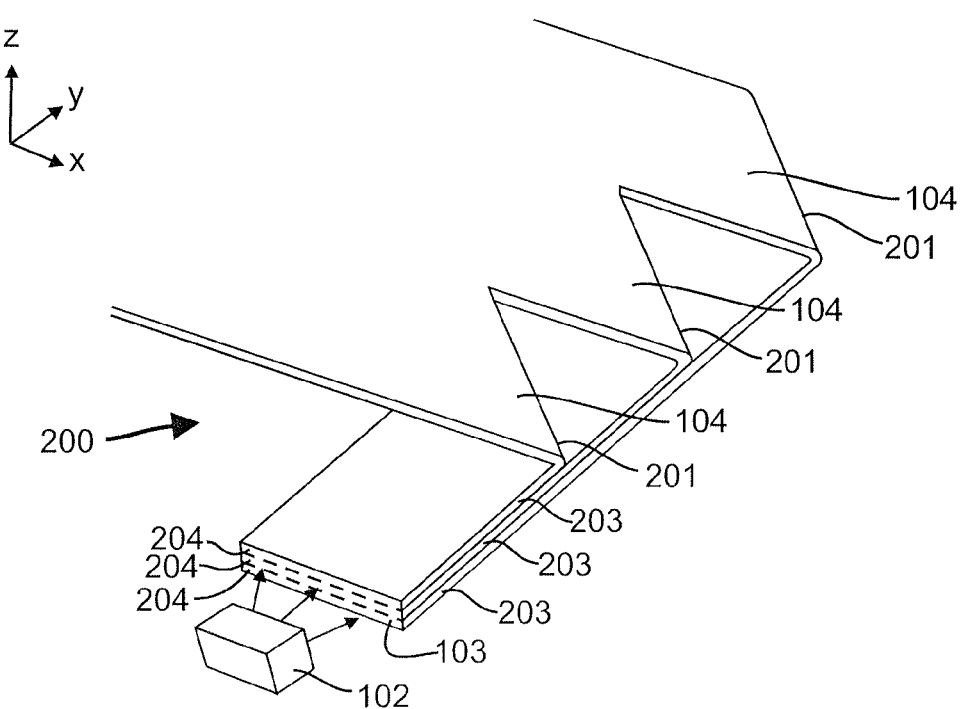
FIG. 2 is a perspective view of one embodiment of a light input coupler with coupling lightguides folded in the −y direction.

FIG. 2 is a perspective view of one embodiment of a light input coupler 200 with coupling lightguides 104 folded in the −y direction. Light from the light source 102 is directed into the light input surface 103 through or along input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction.

Figure 3:
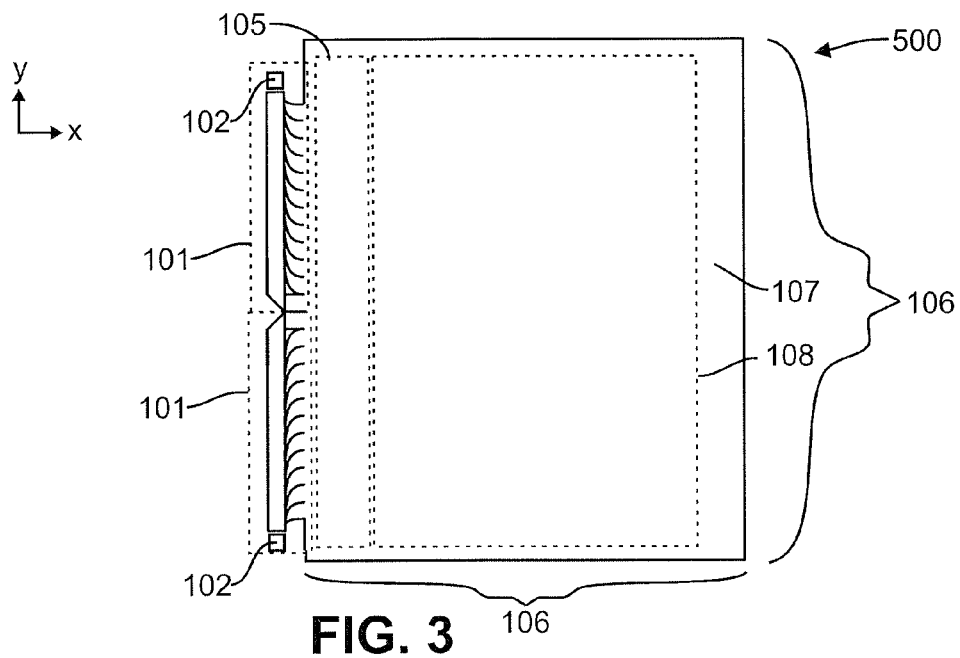
FIG. 3 is a top view of one embodiment of a light emitting device with two light input couplers disposed on the same side of a lightguide wherein the optical axes of the light sources are oriented substantially toward each other.

FIG. 3 is a top view of one embodiment of a light emitting device 500 with two light input couplers 101 disposed on the same side of the lightguide region 106. In this embodiment, the light sources 102 are oriented substantially with the light directed toward each other in the +y and −y directions.

Figure 4:
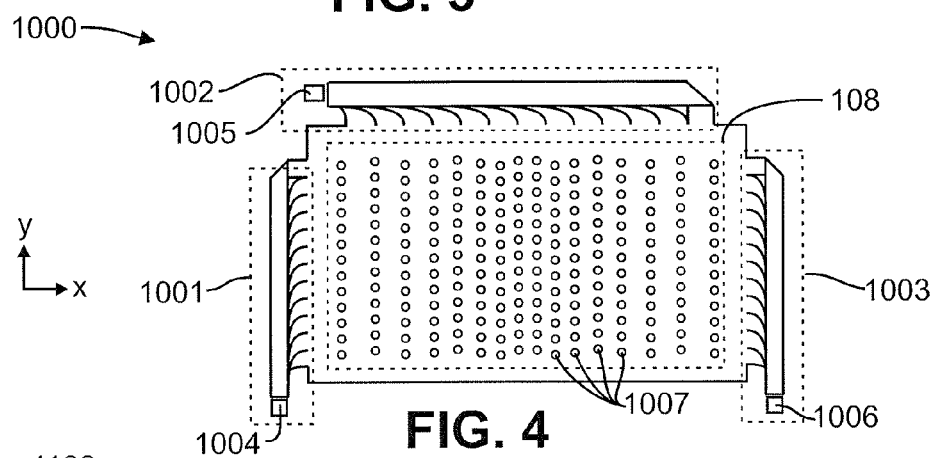
FIG. 4 is a top view of one embodiment of a light emitting device including three light input couplers.

FIG. 4 is a top view of one embodiment of a light emitting backlight 1000 configured to emit red, green, and blue light. The light emitting backlight 1000 includes a red light input coupler 1001, a green light input coupler 1002, and a blue light input coupler 1003 disposed to receive light from a red light source 1004, a green light source 1005, and a blue light source 1006, respectively. Light from each of the light input couplers 1001, 1002, and 1003 is emitted from the light emitting region 108 due to the light extraction features 1007 which redirect a portion of the light to angles closer to the surface normal within the lightguide region 106 such that the light does not remain within the lightguide 107 and exits the light emitting device 1000 in a light emitting region 108. The pattern of the light extraction features 1007 may vary in one or more of a size, a space, spacing, a pitch, a shape, and a location within the x-y plane or throughout the thickness of the lightguide in the z direction.

Figure 5:
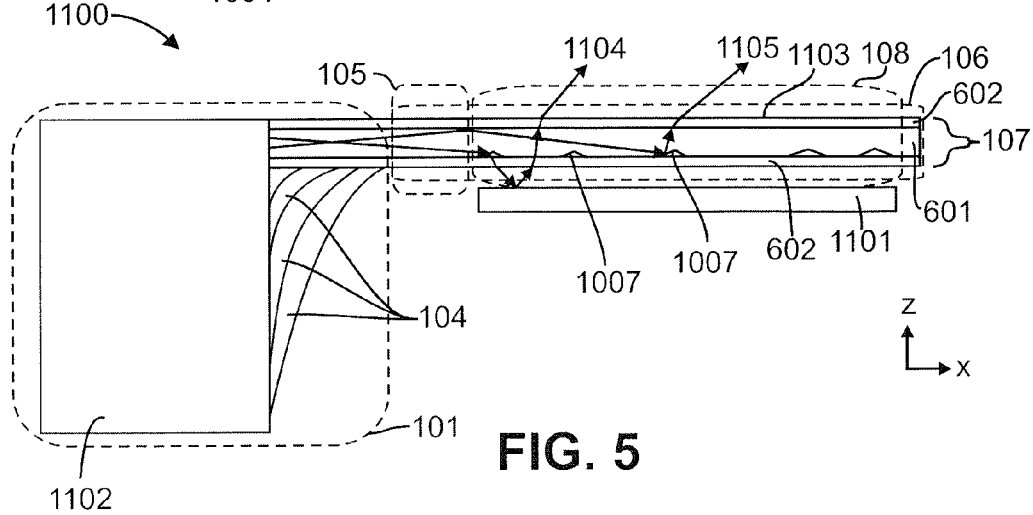
FIG. 5 is a cross-sectional side view of one embodiment of a light emitting device including a light input coupler and lightguide with a reflective optical element disposed adjacent a surface.

FIG. 5 is a cross-sectional side view of one embodiment of a light emitting device 1100 including the light input coupler 101 and the lightguide 107 with a reflective optical element 1101 disposed adjacent the cladding region 602 and a light source 1102 with an optical axis in the +y direction disposed to direct light into the coupling lightguides 104. Light from the light source 1102 propagates through the coupling lightguides 104 within the light input coupler 101, through the light mixing region 105, and through the core layer 601 of the lightguide 107 within light emitting region 108 of the lightguide region 106. Referring to FIG. 5, a first portion of light 1104 reaching the light extraction features 1007 is redirected toward the reflecting optical element 1101 at an angle less than the critical angle such that the light can escape the lightguide 107, reflect from the reflective optical element 1101, pass back through the lightguide 107, and exit the lightguide 107 through the light emitting surface 1103 of the light emitting region 108. A second portion of light 1105 reaching the light extraction features 1007 is redirected toward the light emitting surface 1103 at an angle less than the critical angle, escapes the lightguide 107, and exits the lightguide 107 through the light emitting surface 1103 of the light emitting region 108.

Figure 6:
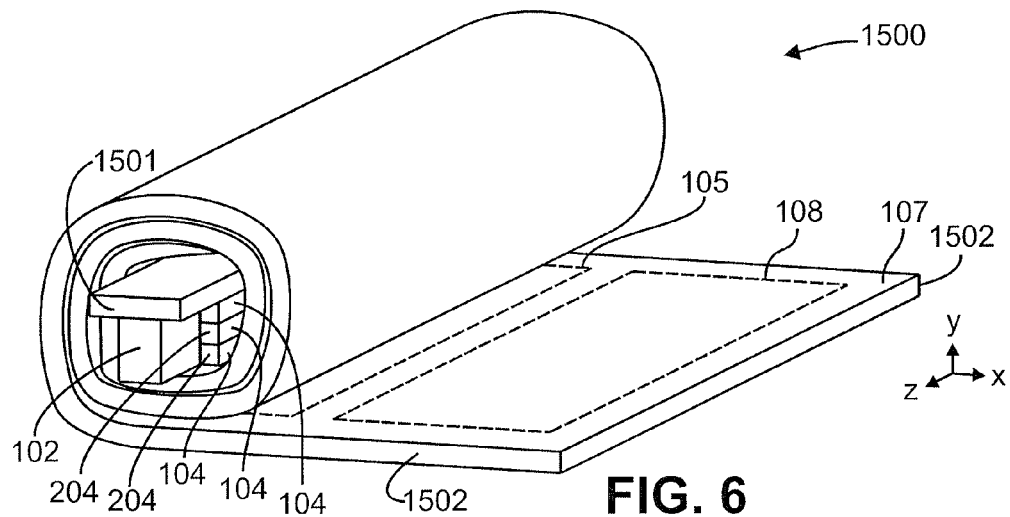
FIG. 6 is a perspective view of one embodiment of a light emitting device with a light mixing region wrapped around a relative position maintaining element and a stack of coupling lightguides.

FIG. 6 is a perspective view of one embodiment of a light emitting device 1500 wherein the light mixing region 105 of the lightguide 107 wraps around a relative position maintaining element 1501 and a stack of coupling lightguides 104 that extend from the lightguide 107 and are stacked in the y direction. The relative position maintaining element 1501 substantially maintains the relative position of the coupling lightguides 104 during and/or after folding. The light source 102 is operatively coupled to the relative position maintaining element 1501 and directs light into the light input surfaces 204 of the coupling lightguides 104 such that the light propagates through the coupling lightguides 104, through the light mixing region 105 that is wrapped around the coupling lightguides 104, and exits the lightguide 107 in the light emitting region 108. The light source 102 may, for example, be operatively coupled to the relative position maintaining element 1501 by adhesion, clamping, physical constraint, or another suitable physical coupling device or method. Similarly, one or more coupling lightguides 104, the lightguide 107, or a region of the lightguide 107 such as the light mixing region 105 may be adhered or otherwise operatively coupled to the relative position maintaining element 1501. Operatively coupling one or more elements of the light emitting device 1500 can reduce total device volume, decrease the likelihood of contaminants entering into regions between components, and prevent one or more elements from unwrapping or unfolding. In one embodiment, the lightguide 107 is adhered to itself in the region of the wrap using an adhesive such as a suitable pressure sensitive adhesive that may be a cladding layer. In another embodiment, the light emitting device includes one or more tapered, angled, or non-folding coupling lightguides 104 and the light source 102 is positioned between the planes defined by the lateral edges 1502 of the lightguide 107 (parallel to the x-y planes in FIG. 6) to reduce the dimension of the device in the z direction.

Figure 7:
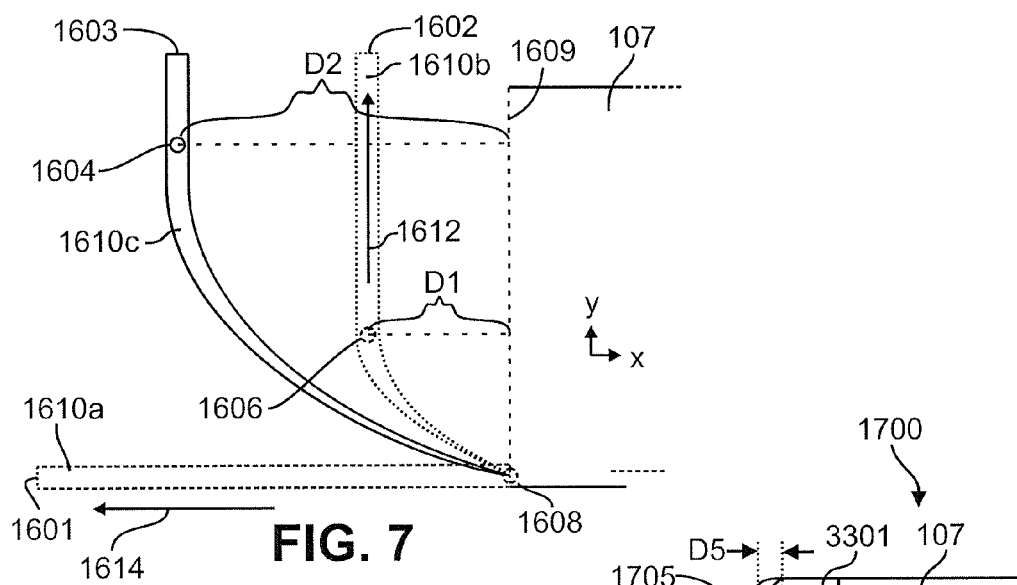
FIG. 7 is a top view of one embodiment of a coupling lightguide in three different positions.

FIG. 7 is a top view of one embodiment of a coupling lightguide 1610a, 1610b, and 1610c in three different positions 1601, 1602, and 1603, respectively. FIG. 7 illustrates the translated distance of the folded coupling lightguide 1610b, 1610c from the fold line 1609 in the extended direction 1614 when folded beginning at a fold point 1608 at 90 degrees for two different radii. In this embodiment, the fold line 1609 is the line including the fold points 1608 at which the coupling lightguides (such as 1610b, 1610c) begin to fold and, in this embodiment, is perpendicular to the extended direction 1614 of the coupling lightguides 1610b, 1610c for a 90 degree fold. In this embodiment, the width of the coupling lightguide 1610a, 1610b, 1610c is shown reduced for illustrative purposes and clarity. The coupling lightguide 1610a extends from the lightguide 107 in the extended direction 1614 (parallel to the −x direction) in an unfolded position 1601 (shown in dotted lines). The coupling lightguide 1610b in the second position 1602 is folded to a first radius of curvature in the +z direction and +y direction to result in a 90 degree fold (the coupling lightguide axis 1612 is 90 degrees from the extended direction 1614). In the second position 1602 (shown in dotted lines), the coupling lightguide 1610b has a first radius of curvature, R1. In the third location 1603, the coupling lightguide 1610c has a second radius of curvature, R2 larger than first radius of curvature R1. The first translated distance, D1, in the extended direction (in the x-y plane) of the midpoint 1606 of the coupling lightguide 1610b for the second position 1602 is: $D_1 = \sqrt{2}/2 \times \pi \times R_1$. The second translated distance, D2, in the extended direction (in the x-y plane) of the midpoint 1604 of the coupling lightguide 1610c for the third position 1603 is: $D_2 = \sqrt{2}/2 \times \pi \times R_2$. With a larger radius of curvature, R2, the coupling lightguide 1610c at the third location 1603 is translated a larger distance (D2>D1) from the fold line 1609. An array of coupling lightguides extending in the extended direction 1614 and positioned along the fold line 1609 in the +y direction from the first fold point 1608 is staggered laterally (x direction) due to variations in radii of curvature.

Figure 8:
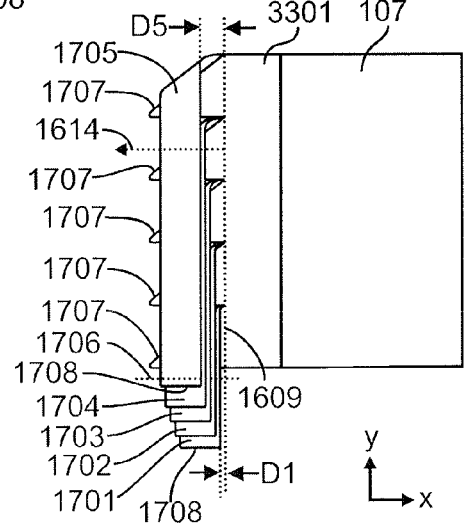
FIG. 8 is a top view of one embodiment of a light input coupler including a film-based lightguide with staggered coupling lightguides.

FIG. 8 is a top view of one embodiment of a light input coupler 1700 including a film-based lightguide 107 with staggered coupling lightguides 1701, 1702, 1703, 1704, and 1705. In this embodiment, the coupling lightguides 1701, 1702, 1703, 1704, and 1705 extend from the lightguide 107 in an extended direction 1614 (parallel to the −x direction) and are folded in the +z and −y directions around the 45 degree angled teeth 1707 of a relative positioning maintaining element 3301. The coupling lightguides 1701, 1702, 1703, 1704, and 1705 are folded along the fold line 1609 and for clarity shown extending past a cut line 1706 where the coupling lightguides would normally be cut (or would be cut initially during fabrication from the film-based lightguide 107). In this embodiment, the coupling lightguides 1701, 1702, 1703, 1704, and 1705 have staggered light input surfaces 1708 translated in the extended direction 1614 perpendicular to the fold line 1609. The first coupling lightguide 1701 is translated from the fold line 1609 by a first translated distance D1. The fifth coupling lightguide 1705 is translated from the fold line 1609 by a fifth translated distance D5. Because the radius of curvature of the fifth coupling lightguide 1705 is larger than the radius of curvature of the first coupling lightguide 1701, the fifth translated distance D5 is larger than the first translated distance D1.

FIG. 9 is a top view of one embodiment of a light emitting device 2300 including a plurality of coupling lightguides 104 with a plurality of first reflective surface edges 3908 and a plurality of second reflective surface edges 3907 within each coupling lightguide 104. In the embodiment shown in FIG. 9, three light sources 102 are disposed to couple light into respective light input edges 204 at least partially defined by respective first reflective surface edges 3908 and second reflective surface edges 3907.

FIG. 10 is an enlarged perspective view of the coupling lightguides 104 of FIG. 9 with the light input edges 204 disposed between the first reflective surface edges 3908 and the second reflective surface edges 3907. The light sources 102 are omitted in FIG. 10 for clarity.

FIG. 11 is a top view of one embodiment of a film-based lightguide 4900 including an array of tapered coupling lightguides 4902 formed by cutting regions in a lightguide 107. The array of tapered coupling lightguides 4902 are formed in a first direction (y direction as shown) with an array dimension length, d1, which is less than a parallel dimension length, d2, of the light emitting region 108 of the lightguide 107. A compensation region 4901 is defined within the film-based lightguide 4900 and does not include tapered coupling lightguides 4902 extending therefrom. In this embodiment, the compensation region 4901 provides a volume having sufficient length in the y direction to place a light source (not shown) such that the light source does not extend past the lower edge 4903 of the lightguide 107. The compensation region 4901 of the light emitting region 108 may have a higher density of light extraction features (not shown) to compensate for the lower input flux directly received from the tapered coupling lightguides 4902 into the light emitting region 108. In one embodiment, a substantially uniform luminance or light flux output per area in the light emitting region 108 is achieved despite the lower level of light flux received by the light extraction features within the compensation region 4901 of the light emitting region 108 by, for example, increasing the light extraction efficiency or area ratio of the light extraction features to the area without light extraction features within one or more regions of the compensation region 4901, increasing the width of the light mixing region 105 between the coupling lightguides 4902 and the light emitting region 108, decreasing the light extraction efficiency or the average area ratio of the light extraction features to the areas without light extraction features in one or more regions of the light emitting region 108 outside the compensation region 4901, or any suitable combination thereof.

Figure 12:
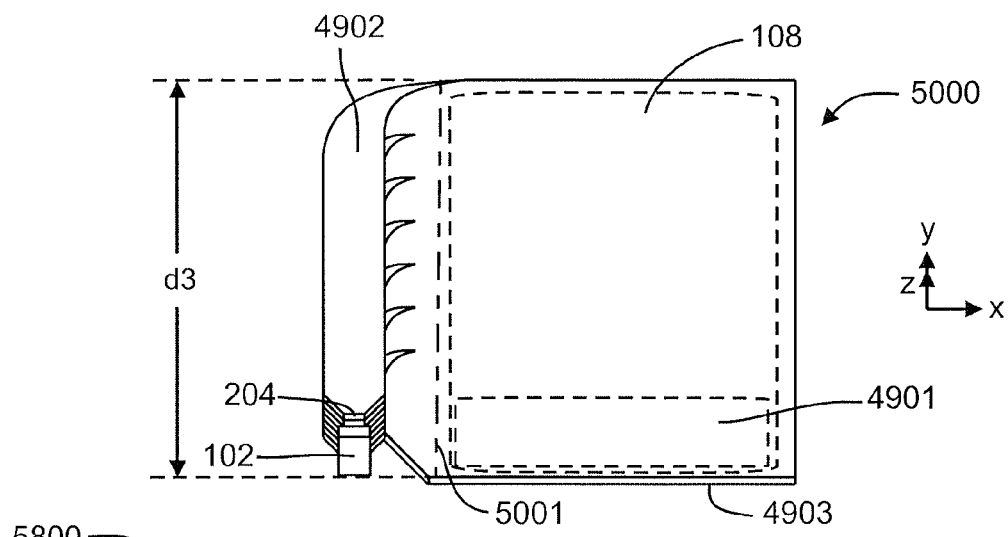
FIG. 12 is a perspective top view of a light emitting device of one embodiment including the film-based lightguide of FIG. 11 and a light source.

FIG. 12 is a perspective top view of one embodiment of a light emitting device 5000 including the film-based lightguide 4900 shown in FIG. 11 and a light source 102. In this embodiment, the tapered coupling lightguides 4902 are folded in the −y direction toward the light source 102 such that the light input edges 204 of the coupling lightguides 4902 are disposed to receive light from the light source 102. Light from the light source 102 propagating through the tapered coupling lightguides 4902 exits the tapered coupling lightguides 4902 and enters into the light emitting region 108 generally propagating in the +x direction while expanding in the +y and −y directions. In this embodiment, the light source 102 is disposed within the region that did not include a tapered coupling lightguide 4902 and the light source 102 does not extend in the y direction past a lower edge 4903 of the light emitting device 5000. By not extending past the lower edge 4903, the light emitting device 5000 has a shorter overall width in the y direction. Furthermore, the light emitting device 5000 can maintain the shorter dimension, d3, in the y direction (shown in FIG. 12) when the tapered coupling lightguides 4902 and the light source 102 are folded under (−z direction and then +x direction) the light emitting region 108 along the fold (or bend) line 5001.

Figure 13:
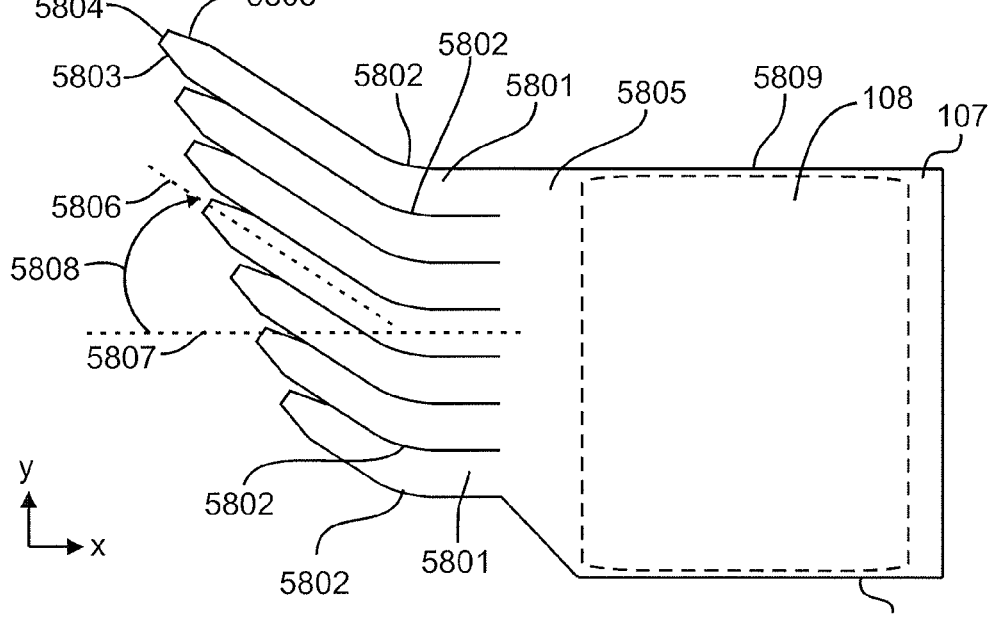
FIG. 13 is top view of one embodiment of a film-based lightguide including an array of oriented coupling lightguides with tapered light collimating lateral edges adjacent the input surface and light turning edges between the light input surface and the light mixing region of the film-based lightguide.

FIG. 13 is top view of one embodiment of a film-based lightguide 5800 including an array of oriented coupling lightguides 5801 oriented parallel to a first direction 5806 at a coupling lightguide orientation angle 5808 from the second direction 5807 perpendicular to the direction (y-direction) of the array of coupling lightguides 5801 at the light mixing region 5805. The array of oriented coupling lightguides 5801 includes tapered light collimating lateral edges 5803 adjacent the input surface 5804 and light turning lateral edges 5802 between the light input surface 5804 and the light mixing region 5805 of the film-based lightguide 107. In this embodiment, light from a light source (not shown) disposed to emit light into the light input surface 5804 when the array of oriented coupling lightguides 5801 are folded propagates with its optical axis parallel to the first direction 5806 of the array of oriented coupling lightguides 5801 and the optical axis is turned by the light turning lateral edges 5802 such that the optical axis is substantially parallel to the second direction 5807 perpendicular to the direction (y-direction) of the array of oriented coupling lightguides 5801 at the light mixing region 5805. In this embodiment, when the oriented coupling lightguides 5801 are folded, the light source can be positioned between the planes (parallel to the z direction) including the lateral edges (5809, 5810) of the lightguide 107 such that a device or display including the light emitting device with the film-based lightguide 5800 does not require a large frame or a border region extending significantly past the lateral edges (5809, 5810) of the film-based lightguide in the y direction (as folded once or when the array of oriented coupling lightguides 5801 are folded and the light source, the array of oriented coupling lightguides 5801, and the light mixing region 5805 are folded behind the light emitting region 108 of the film based lightguide 107). The array of oriented coupling lightguides 5801 permit the light source to be positioned between the planes including the lateral edges (5809, 5810) of the film-based lightguide and the light turning lateral edges 5802 redirect the optical axis of the light toward the direction 5807 perpendicular to the direction (y-direction) of the array of oriented coupling lightguides 5801 at the light mixing region 5805 such that the optical axis of the light is oriented substantially parallel to the second direction 5807 when the light is extracted by light extraction features (not shown) with light redirecting surface oriented substantially parallel to the array direction (y direction) of the array of oriented coupling lightguides 5801.

Figure 14:
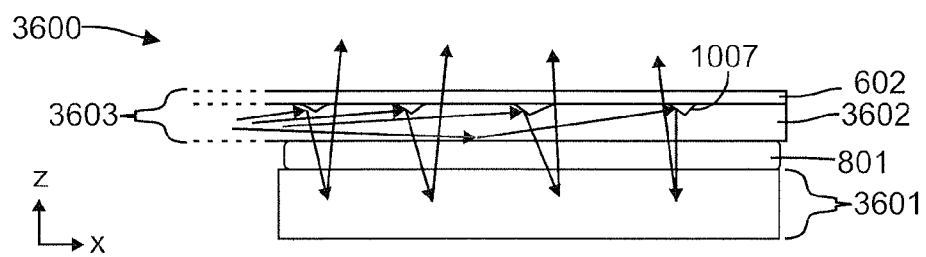
FIG. 14 is a cross-sectional side view of one embodiment of a spatial display including a frontlight.

FIG. 14 is a cross-sectional side view of one embodiment of a spatial display 3600 including a frontlight 3603 optically coupled to a reflective spatial light modulator 3601. The frontlight 3603 includes a film-based lightguide 3602 with the light extracting features 1007 that direct light to the reflective spatial light modulator 3601 at angles near the surface normal of the reflective spatial light modulator 3601. In one embodiment, the reflective spatial light modulator 3601 is an electrophoretic display, a microelectromechanical system (MEMS)-based display, or a reflective liquid crystal display. In one embodiment, the light extraction features 1007 direct one of 50%, 60%, 70%, 80%, and 90% of the light exiting the frontlight 3603 toward the reflective spatial light modulator 3601 within an angular range of 60 degrees to 120 degrees from the light emitting surface of the frontlight 3603.

Figure 15:
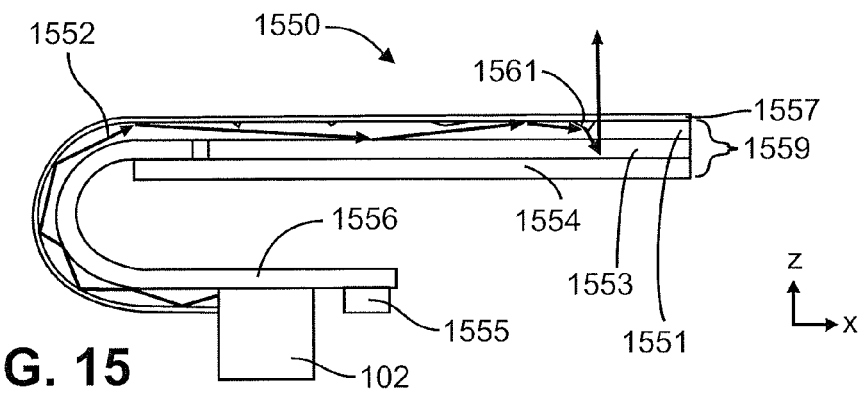
FIG. 15 is a cross-sectional side view of one embodiment of a light emitting display including a lightguide that further functions as a top substrate for a reflective spatial light modulator.

FIG. 15 is a cross-sectional side view of one embodiment a light emitting display 1550 with a film-based lightguide 1551 physically coupled to a flexible display connector 1556. In this embodiment, the reflective spatial light modulator 1559 includes a bottom substrate 1554 and the film-based lightguide 1551 is a top substrate. Light 1552 from the light source 102 physically coupled to the flexible display connector 1556 is directed into the film-based lightguide 1551 and is redirected by light extraction features 1561 to the active layer 1553 where the light 1552 reflects and passes back through the film-based lightguide 1551, and the upper cladding layer 1557, and exits the light emitting display 1550.

Figure 16:
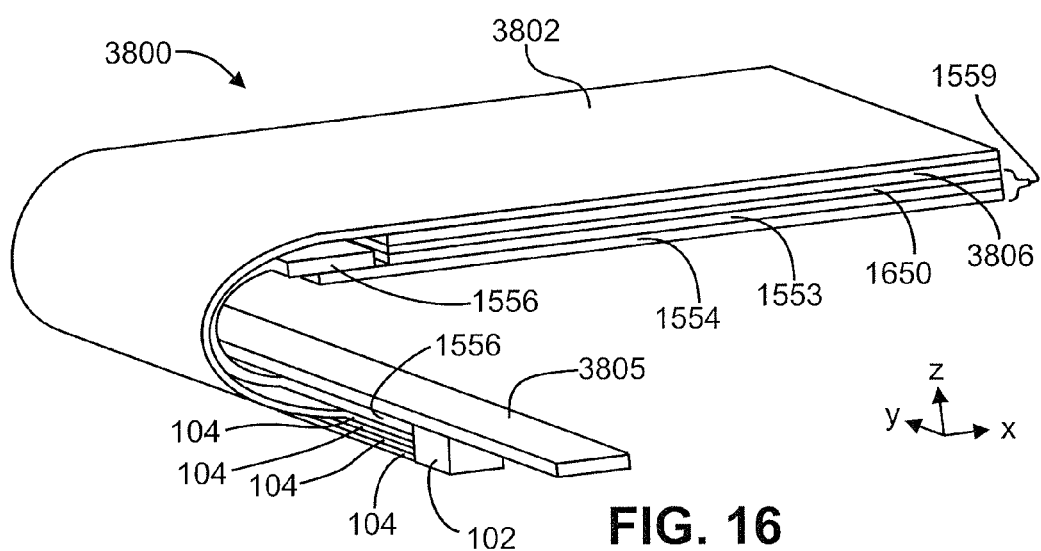
FIG. 16 is a perspective view of one embodiment of a light emitting device including a film-based lightguide that further functions as a top substrate for the reflective spatial light modulator with the light source disposed on a circuit board physically coupled to the flexible connector.

FIG. 16 is a perspective view of one embodiment of a light emitting device 3800 including a film-based lightguide 3802 physically coupled to a flexible connector 1556 for the reflective spatial light modulator 1559 with a light source 102 disposed on a circuit board 3805 physically coupled to the flexible connector 1556. In this embodiment, the reflective spatial light modulator 1559 includes an active layer 1553 positioned between a bottom substrate 1554 and a top substrate 1650. The top substrate 1650 of the reflective spatial light modulator 1559 is optically coupled to the film-based lightguide 3802 using an adhesive cladding layer 3806.

Figure 17:
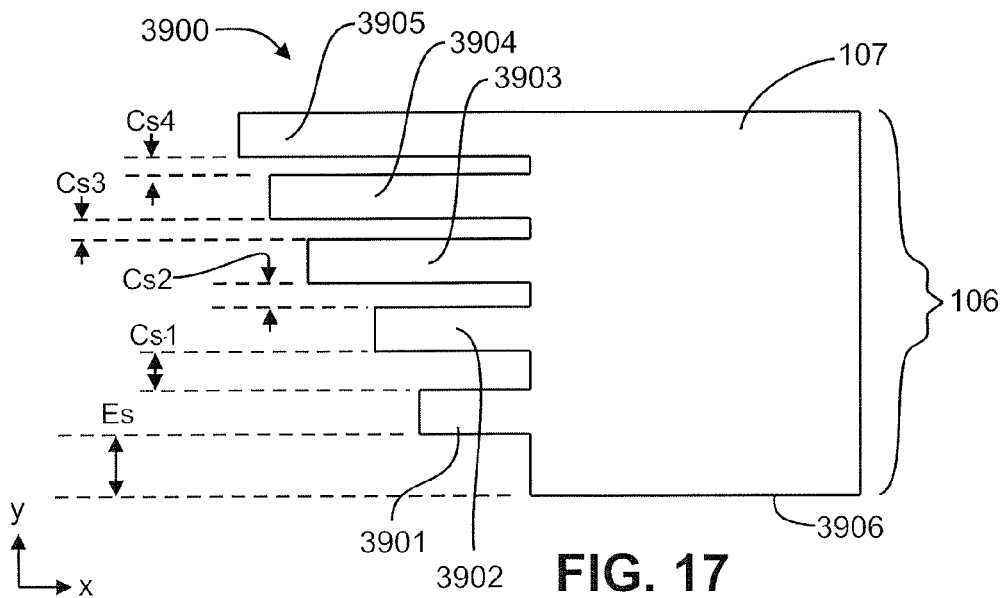
FIG. 17 is a top view of one embodiment of a film-based lightguide including an array of coupling lightguides with varying separation distances between adjacent coupling lightguides.

FIG. 17 is a top view of one embodiment of a film-based lightguide 3900 including an array of coupling lightguides 3901, 3902, 3903, 3904, 3905 extended from a lightguide region 106 of a lightguide 107. The first coupling lightguide 3901 has an edge separation distance (Es) from the lateral edge 3906 of the adjacent side of the film-based lightguide 3900. In this embodiment, the separation distance of the coupling lightguides (Cs1, Cs2, Cs3, Cs4) along the side of the film-based lightguide varies. The first coupling lightguide separation distance (Cs1) between the first coupling lightguide 3901 and the second coupling lightguide 3902 is larger than the second separation distance (Cs2) between the second coupling lightguide 3902 and the third coupling lightguide 3903. The third coupling lightguide separation distance (Cs3) between the third coupling lightguide 3903 and the fourth coupling lightguide 3904 is larger than the fourth separation distance (Cs4) between the fourth coupling lightguide 3904 and the fifth coupling lightguide 3905. As shown in FIG. 39, Cs1>Cs2>Cs3>Cs4, however, the varying spacing does not need to be continuously decreasing along a side of a film based lightguide 107 and other increasing, decreasing or variations of separation distances may be used in other embodiments.

Figure 18:
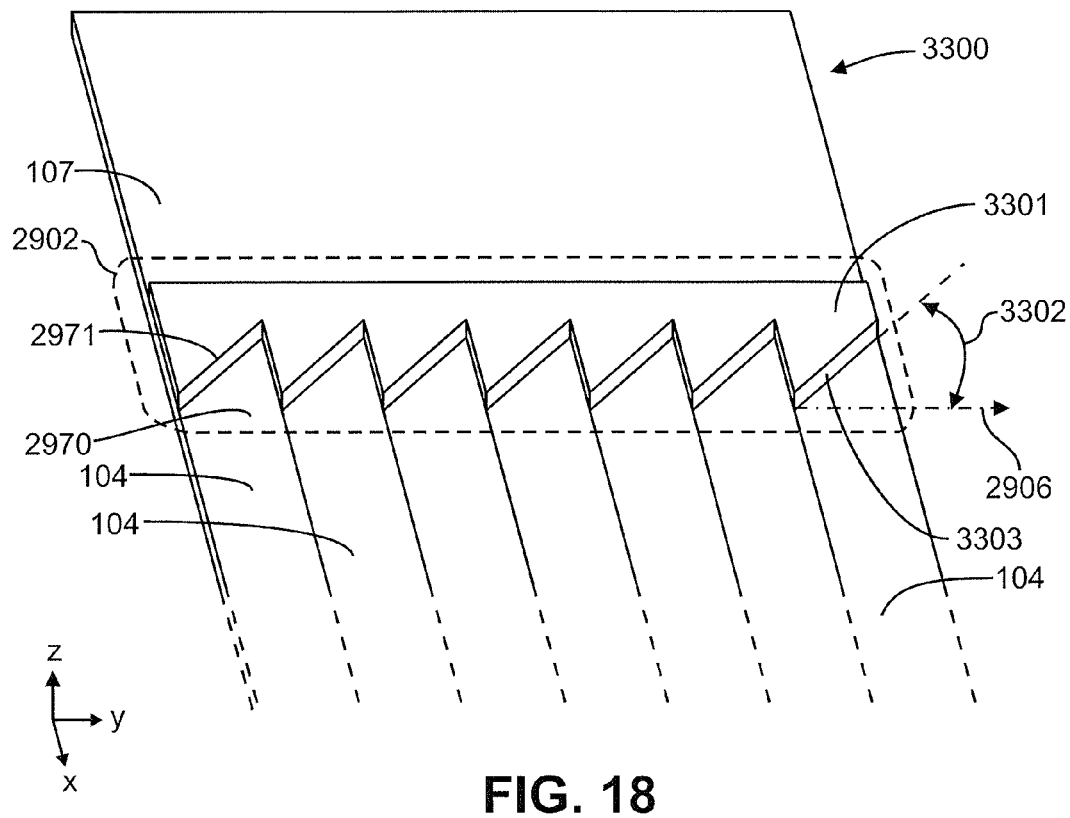
FIG. 18 is a perspective view of one embodiment of a light input coupler and lightguide including a relative position maintaining element disposed proximate a linear fold region.

FIG. 18 is a perspective view of one embodiment of a light input coupler and lightguide 3300 including a relative position maintaining element 3301 disposed proximal to a linear fold region 2902. In this embodiment, the relative position maintaining element 3301 has a cross-sectional edge 2971 in a plane (x-y plane as shown) parallel to the light transmitting film surface 2970 disposed proximal to the linear fold region 2902 that includes a substantially linear section 3303 oriented at an angle 3302 greater than 10 degrees to the direction 2906 parallel to the linear fold region 2902 for at least one coupling lightguide 104. In one embodiment, a substantially linear section 3303 is disposed at an angle of about 45 degrees to a direction parallel to the linear fold region 2902.

Figure 19:
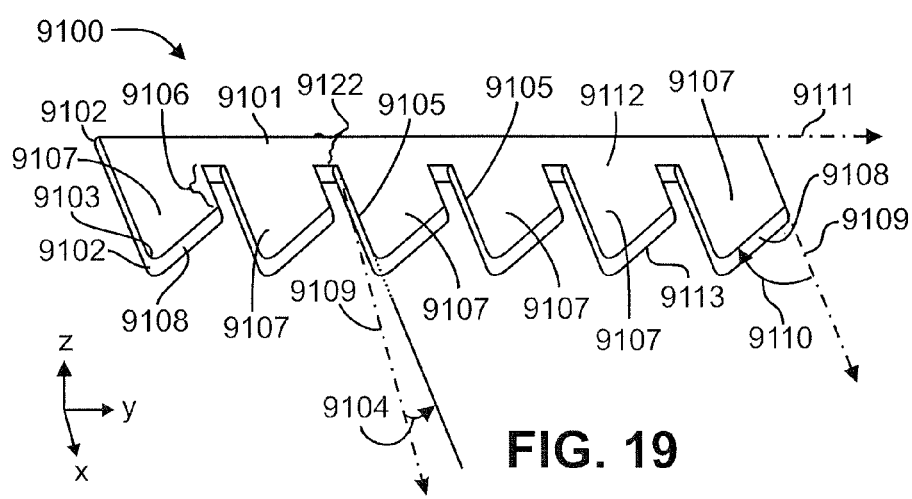
FIG. 19 is a perspective view of one embodiment of a relative position maintaining element (RPME) including a spine and truncated angled teeth.

FIG. 19 is a perspective view of one embodiment of a relative position maintaining element (RPME) 9100 including a spine 9101 defined within a spine region 9122 and angled teeth 9107 extending from the spine 9101 in the teeth extended direction 9109 (parallel to the +x direction) orthogonal to the array direction 9111 (parallel to the y direction) of the angled teeth 9107. In this embodiment, the angled teeth 9107 include first edges 9108 oriented at a first tooth edge angle 9110 from the teeth extended direction 9109 and second edges 9105 oriented at a second tooth edge angle 9104 from the teeth extended direction 9109 in the x-y plane. The first edges 9108 and the second edges 9105 have curved edge profiles 9102 in the z direction. The curved edge profile 9012 can, for example, reduce the likelihood of tearing a coupling lightguide (not shown) by eliminating a sharp angle between the edges 9108, 9105 and the top surfaces 9112 and bottom surfaces 9113 of the RPME 9100. The curved edge profile 9012 permits a greater contact surface area (the curved edge profile 9102) for a coupling lightguide (not shown) folded around the edges such that the force due to tension is spread over a larger area than a 90 degree flat edges (where the force is typically concentrated along the linear edge interface between the surfaces) and therefore the coupling lightguide is less likely to tear. The intersection between the first edges 9108 and the second edges 9105 is a curved intersection 9103 in a cross-sectional plane parallel to the x-y plane. The curved intersection 9103 prevents a sharp intersection between the first edges 9108 and the second edges 9105 that could cause a tear in a coupling lightguide during assembly, folding, or stacking. In the embodiment shown in FIG. 19, the angled teeth 9107 have a truncated section 9106 between the spine 9122 and the first edges 9108. The truncated section 9106 of the angled teeth 9107 allows for a higher angular and/or positional tolerance for coupling lightguides (not shown) to position themselves against the first edges 9108 when they are folded around the angled teeth 9107. In this embodiment, for example, there is no corner formed from an intersection between the first edges 9108 and the second edges 9105 and the coupling lightguides could slide along the first edge 9108 and past the first edge 9108 (toward the spine 9101) without being stopped by a corner at an intersection between the first edges 9108 and the second edges 9105 at the spine 9101.

Figure 20:
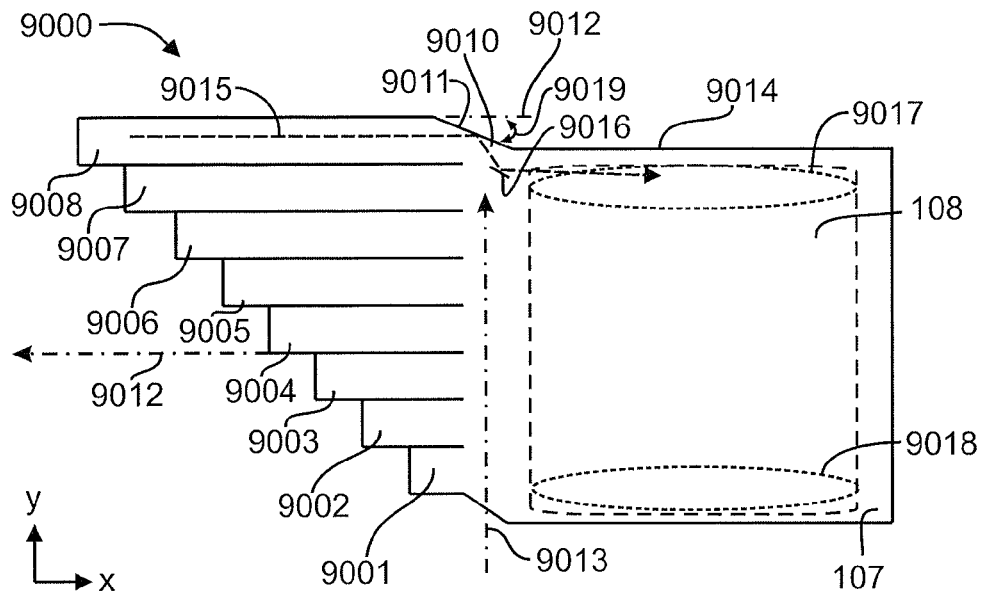
FIG. 20 is a top view of one embodiment of a film-based lightguide including a light mixing region extending past the light emitting region.

FIG. 20 is a top view of one embodiment of a film-based lightguide 9000 including coupling lightguides 9001, 9002, 9003, 9004, 9005, 9006, 9007, and 9008 cut from a lightguide 107 and separated from the light emitting region 108 by a light mixing region 9010. The light mixing region 9010 extends past the light emitting region 108 far lateral edge 9014 in a first direction 9013 orthogonal to the extended direction 9012 of the coupling lightguides 9001, 9002, 9003, 9004, 9005, 9006, 9007, and 9008. Light 9015 propagating through the eighth coupling lightguide 9008 (shown as light 9015 propagating before the coupling lightguides 9001, 9002, 9003, 9004, 9005, 9006, 9007, and 9008 folded in the +z and −y direction for clarity) reflects from an angled light mixing region lateral edge 9011 toward the light emitting region 108. The angled light mixing region lateral edge 9011 is oriented at a first extended orientation angle 9019 to the extended direction 9012 to direct light 9015 from the light mixing region 9010 toward the light emitting region 108 of the lightguide 107. In this embodiment, light 9015 totally internally reflects from an internal light directing edge 9016 formed by a cut in the lightguide 107, to direct it closer to the far area 9017 (the area of the light emitting region 108 further from the light input surface (not shown) of the folded and stacked coupling lightguides 9001, 9002, 9003, 9004, 9005, 9006, 9007, and 9008 when they are folded in the +z and −y direction) of the light emitting region 108 closer to the light emitting region far lateral edge 9014. In this embodiment, the eighth coupling lightguide 9008 can direct more light to the far area 9017 of the light emitting region 108 to increase the light flux arriving to the far area to compensate for the reduced light flux relative to the near area 9018 of the light emitting region 108 due to more flux being absorbed in the longer coupling lightguides (the eighth coupling lightguide 9008 and the seventh coupling lightguide 9007, for example) than the shorter coupling lightguides (the first coupling lightguide 9001 and the second coupling lightguide 9002, for example).

Figure 21:
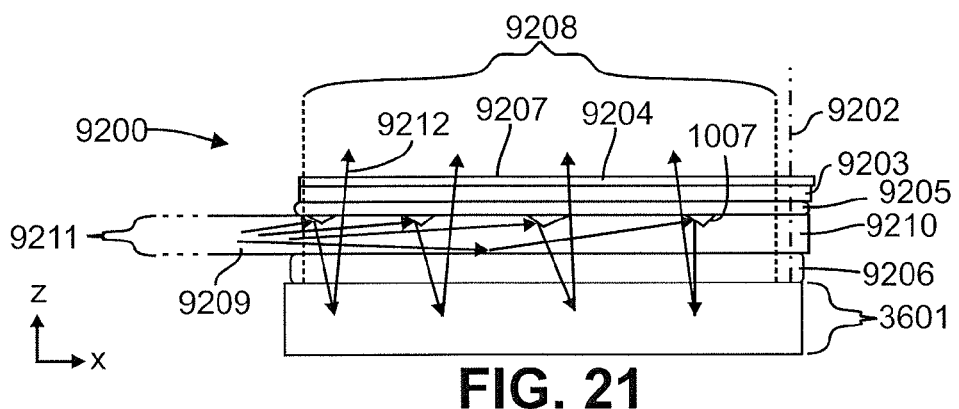
FIG. 21 is a cross-sectional side view of a portion of one embodiment of a spatial display illuminated by a frontlight including a film-based lightguide optically coupled to a reflective spatial light modulator and a scratch resistant hardcoating on a hardcoating substrate optically coupled to the film-based lightguide.

FIG. 21 is a cross-sectional side view of a portion of one embodiment of a spatial display 9200 illuminated by a frontlight 9211 including a film-based lightguide 9210 optically coupled to a reflective spatial light modulator 3601 using an adhesive 9206 (such as an acrylate-based pressure sensitive adhesive) in the active area 9208 of the reflective spatial light modulator 3601. After exiting the light source (not shown) and the folded, stacked coupling lightguides (not shown) light 9212 exits the light mixing region 9209 of the film-based lightguide 9210 and reflects from the light extracting features 1007 on the surface of the film-based lightguide 9210 toward the reflective spatial light modulator 3601 at angles near the surface normal 9202 of the reflective spatial light modulator 3601. The light 9212 reflects from the reflective spatial light modulator 3601 and passes back through the film-based lightguide 9210 and out of the spatial display 9200. A scratch resistant hardcoating 9204 on a hardcoating substrate 9203 protects the outer top surface 9207 of the spatial display 9200 and is optically coupled to the film-based lightguide 9210 using an adhesive 9205 (such as a silicone based pressure sensitive adhesive). In this embodiment, the adhesive between the hardcoating substrate 9205 and the film-based lightguide 9210, and the adhesive between the film-based lightguide 9210 and the reflective spatial light modulator 3601 also function as cladding layers for the film-based lightguide 9210 and are shown partially coated in a region extended in the active area of the display but not coated completely across the light mixing region 9209 of the film-based lightguide 9206.

Figure 22:
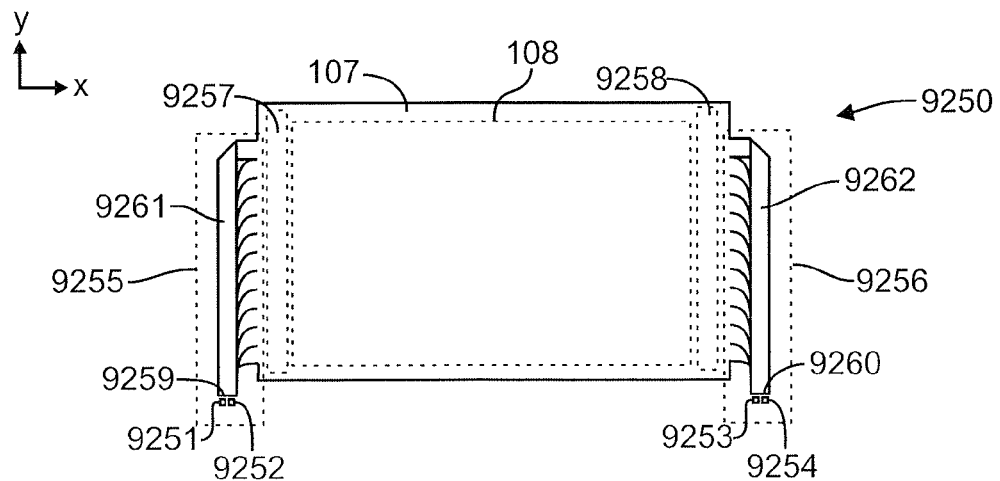
FIG. 22 is a top view of one embodiment of a light emitting device including light sources and photodetectors in two light input couplers.

FIG. 22 is a top view of one embodiment of a light emitting device 9250 with a first light input coupler 9255 and second light input coupler 9256 positioned on opposite sides of the lightguide 107. The first light input coupler 9255 includes a first stacked array of coupling lightguides 9261. The first light input coupler 9255 also includes a first light source 9251 positioned to emit light into a first light input surface 9259 of the first stacked array of coupling lightguides 9261 and a first photodetector 9252 positioned receive light from the first light input surface 9259. The second light input coupler 9256 includes a second stacked array of coupling lightguides 9262. The second light input coupler 9256 also includes a second light source 9253 positioned to emit light into a second light input surface 9260 of the second stacked array of coupling lightguides 9262 and a second photodetector 9254 positioned receive light from the second light input surface 9260. In this embodiment, the second photodetector 9254 can detect light from the first light source 9251 that propagates through the first stacked array of coupling lightguides 9261, a first light mixing region 9257, the light emitting region 108, a second light mixing region 9258, and the second stacked array of coupling lightguides 9262. Similarly, the first photodetector 9252 can detect light from the second light source 9253 that propagates through the second stacked array of coupling lightguides 9262, the second light mixing region 9258, the light emitting region 108, the first light mixing region 9257, and the first stacked array of coupling lightguides 9261. For example, in one embodiment, the first light source 9251 is briefly turned on while the second light source 9253 is turned off and the second photodetector 9254 measures the intensity of light received after passing through the regions of the lightguide 107. By comparing the relative intensity of light over time, the electrical power provided to the first light source 9251 can be increased to account for light output degradation of the first light source 9251 and/or increased light absorption through the film-based lightguide 107 (such as from the film yellowing over time) to substantially maintain a constant light output from the light emitting area 108 of the light emitting device 9250 (such as, for example, a constant luminance of the light emitting region 108 or a constant luminous intensity from the light emitting region 108 at zero degrees from the surface normal to the light emitting region 108). Similarly, the relative intensity of the light reaching the first photodetector 9252 from the second light source 9253 can be evaluated and the electrical power provided to the second light source 9253 may be adjusted accordingly to maintain a substantially constant light output from the light emitting area 108 of the light emitting device 9250. In one embodiment, the first light source 9251 includes a light emitting diode emitting light in a first wavelength bandwidth; and the second light source 9253 includes a light emitting diode emitting light in a second wavelength bandwidth. In another embodiment, the first photodetector 9252 includes a light emitting diode driven in reverse mode to detect light intensity within the second wavelength bandwidth; and/or the second photodetector 9254 includes a light emitting diode driven in reverse mode to detect light intensity within the first wavelength bandwidth.

Figure 23:
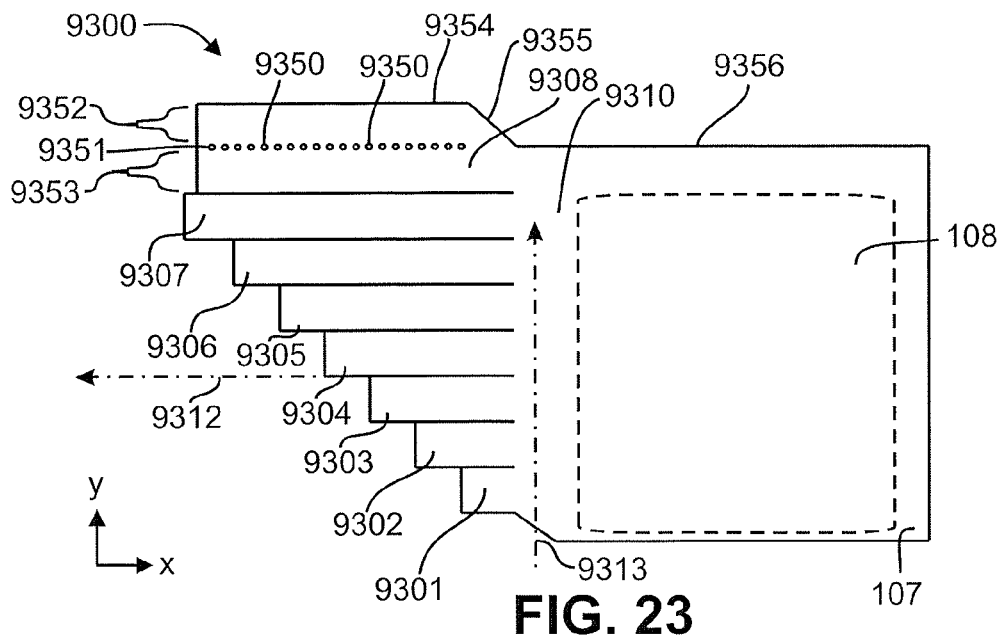
FIG. 23 is a top view of one embodiment of a film-based lightguide including an array of coupling lightguides and a sacrificial coupling lightguide including a perforation line.

FIG. 23 is a top view of one embodiment of a film-based lightguide 9300 including an array of coupling lightguides 9301, 9302, 9303, 9304, 9305, 9306, and 9307 in an array direction 9313 extended from the lightguide 107 in an extended direction 9312 and separated from the light emitting region 108 by a light mixing region 9310. The film-based lightguide 9300 further includes a sacrificial coupling lightguide 9308 including a perforation line 9351 defined by a linear array of perforations 9350 cut from the lightguide 107. The perforation line 9351 separates the top cover region 9353 from the side cover region 9352. In this embodiment, the far lateral edge 9354 of the sacrificial coupling lightguide 9308 extends past the lateral edge 9356 of the light emitting region 108 and includes an angled edge 9355. Also, the sacrificial coupling lightguide 9308 does not extend past the seventh coupling lightguide 9307 in the extended direction 9312.

Figure 24:
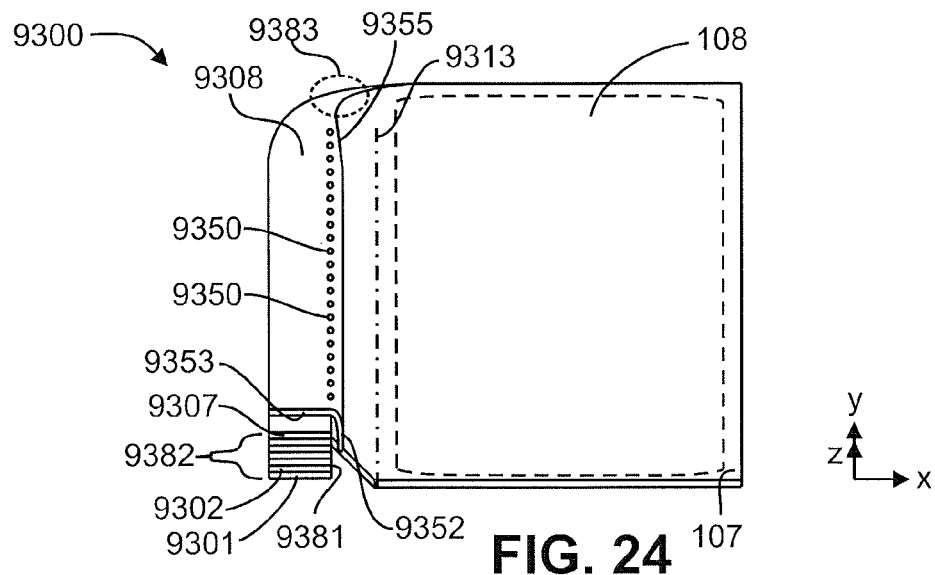
FIG. 24 is a perspective view of the film-based lightguide of FIG. 23 wherein the array of coupling lightguides and the sacrificial coupling lightguide are folded and stacked.

FIG. 24 is a perspective view of the film-based lightguide 9300 of FIG. 23 wherein the array of coupling lightguides 9301, 9302, 9303, 9304, 9305, 9306, and 9307 are folded and stacked in the −y direction and the +z direction to form a light input surface 9382 to receive light from a light source (not shown). The sacrificial coupling lightguide 9308 is also folded in the −y and +z direction such that the top cover region 9353 is positioned above the stack of coupling lightguides 9301, 9302, 9303, 9304, 9305, 9306, and 9307. The side cover region 9352 is bent along the perforation line 9351 in the −z direction such that the side cover region 9352 is positioned adjacent the lateral edges 9381 of the coupling lightguides 9301, 9302, 9303, 9304, 9305, 9306, and 9307. Since the sacrificial coupling lightguide 9308 does not extend past the seventh coupling lightguide 9307 in the extended direction 9312 before folding (as shown in FIG. 23), the sacrificial coupling lightguide 9308 does not extend to the light input surface 9382 after folding and does not receive a substantial amount of light from the light source (not shown) positioned adjacent the light input surface 9382. Light that is intentionally or unintentionally coupled into the sacrificial coupling lightguide 9308 can be directed into the light emitting region 108 by total internal reflection from the angled edge 9355. The angled edge 9355 of the sacrificial coupling lightguide 9308 permits the side cover region 9352 to be folded down (−z direction) without interfering with the fold region 9383 of the sacrificial coupling lightguide 9308. In this embodiment, the sacrificial coupling lightguide 9308 can protect the top, seventh coupling lightguide 9307 and the lateral edges 9381 of the coupling lightguides 9301, 9302, 9303, 9304, 9305, 9306, and 9307. In another embodiment, a wrap (not shown) extends around the top cover region 9353 and side cover region 9352 of the sacrificial coupling lightguide 9308 such that the wrap does not coupled light out of the top, seventh coupling lightguide 9307 or the lateral edges 9381 of the coupling lightguides 9301, 9302, 9303, 9304, 9305, 9306, and 9307.

Figure 25:
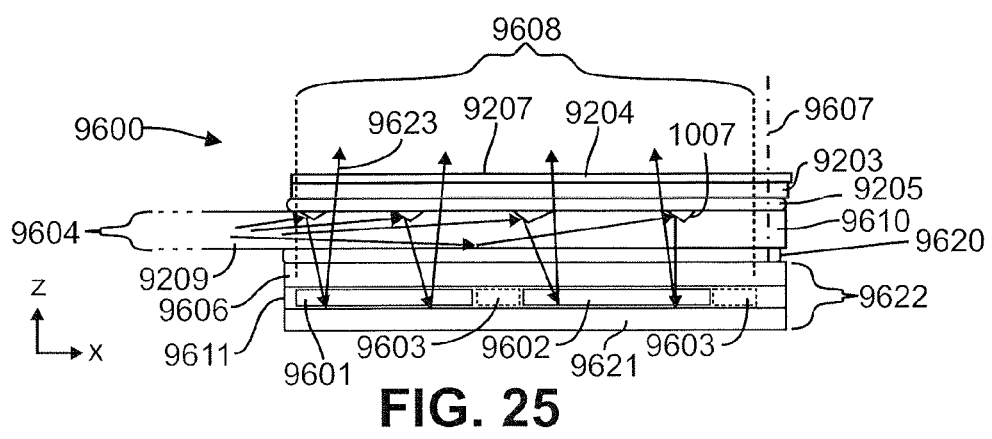
FIG. 25 is a cross-sectional side view of a portion of one embodiment of a spatial display illuminated by a frontlight including a film-based lightguide adhered and optically coupled to a color reflective display such that the light from the frontlight is directed toward the color filters of the color reflective display.

FIG. 25 is a cross-sectional side view of a portion of one embodiment of a spatial display 9600 illuminated by a frontlight 9604 including a film-based lightguide 9610. The film-based lightguide 9610 is optically coupled to a color reflective display 9622 including a color filter substrate 9606, a color filter layer 9611, and a reflective spatial light modulator 9621. In this embodiment, the film-based lightguide 9610 is adhered and optically coupled to the color reflective display 9622 using a light transmitting adhesive 9620 (such as an optically clear pressure sensitive adhesive) to adhere the film-based lightguide 9610 to the color filter substrate 9606 in the active area 9608 of the color reflective display 9622. The color filter layer 9611 includes an array of first color filters 9601 and second color filters 9602 separated by non-active areas 9603 (areas without color filters 9601) of the color filter layer 9611. Light 9623, after exiting the light source (not shown) and the folded, stack coupling lightguides (not shown), propagating through the frontlight 9604 exits the lightguide 9610 by reflecting from the light extracting features 1007 on the surface of the film-based lightguide 9610 toward the color reflective display 9622 at angles near the surface normal 9607 of the color reflective display 9622. The light 9623 is directed toward the first color filters 9601 and second color filters 9602 due to the physical and optical properties (such as position and facet angle) of the light extraction features 1007. In one embodiment, the light 9623 does not pass through the non-active areas 9603 of the color filter layer 9601. In another embodiment, by aligning the light extraction features 1007 with the first color filters 9601 and the second color filters 9602 and directing the light 9623 through the first color filters 9601 and second color filters 9602 at an angle near the surface normal 9607 of the color reflective display 9622, light 9623 is not directed to the inactive areas 9603 of the color filter layer 9611 where it could be absorbed. In the embodiment illustrated in FIG. 25, a scratch resistant hardcoating 9204 on a hardcoating substrate 9203 protects the outer top surface 9207 of the spatial display 9600 and is optically coupled to the film-based lightguide 9610 using an adhesive 9205 (such as a silicone based pressure sensitive adhesive). In one embodiment, the adhesive 9205 between the hardcoating substrate 9205 and the film-based lightguide 9610, and the adhesive 9620 between the film-based lightguide 9610 and the color filter substrate 9606 also function as cladding layers for the film-based lightguide 9610 in the active area 9608 of the color reflective display 9622.

Figure 26:
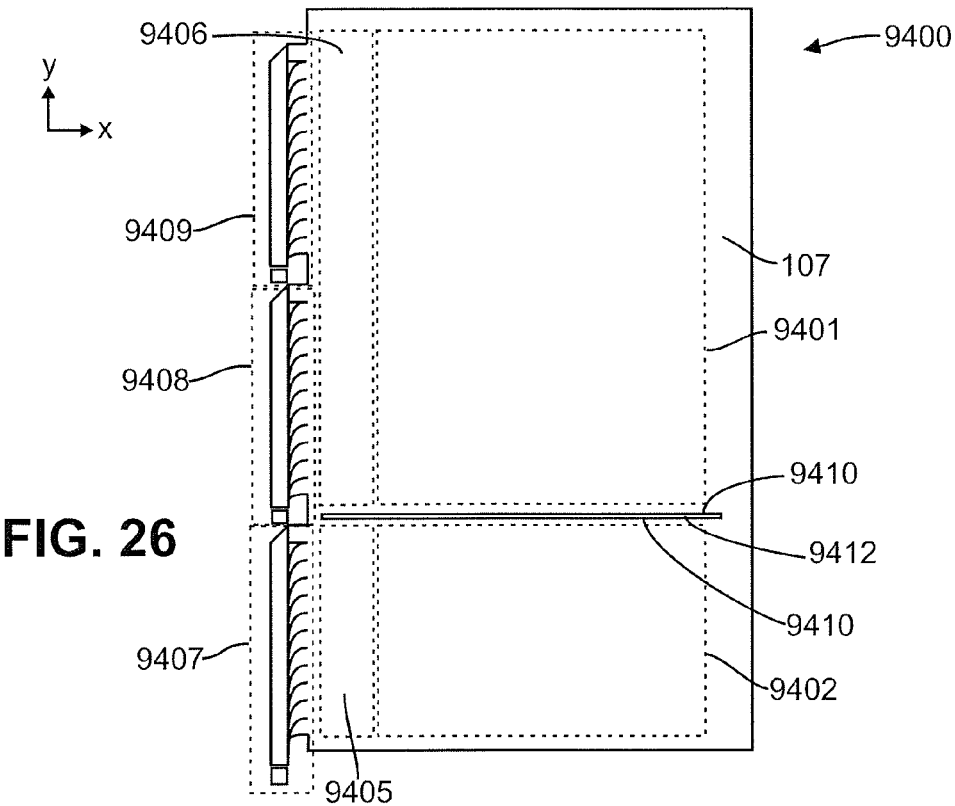
FIG. 26 is a top view of one embodiment of a light emitting device including a first light input coupler coupling light into a sub-display light emitting region of the film-based lightguide and a second light input coupler and third light input coupler coupling light into a main display light emitting region of the film-based lightguide.

FIG. 26 is a top view of one embodiment of a light emitting device 9400 including a first light input coupler 9407 coupling light into a sub-display light emitting region 9402 of the film-based lightguide 107. The light emitting device 9400 further includes a second light input coupler 9408 and third light input coupler 9409 coupling light into a main display light emitting region 9401 of the film-based lightguide 107. Internal light directing edges 9410 defined by a cut 9412 in the lightguide 107 are positioned between the sub-display light emitting region 9402 and the main display light emitting region 9401 to reflect a portion of the light that would otherwise propagate from the sub-display light emitting region 9402 to the main display light emitting region 9401, or from the main display light emitting region 9401 to the sub-display light emitting region 9402. In another embodiment, a light absorbing material is optically coupled to the film-based lightguide 107 in the region between the sub-display light emitting region 9402 and the main display light emitting region 9401 to absorb light that would couple between the regions. For example, in one embodiment, a black plastic strip or reflective aluminum strip is positioned within the cut 9412.

Figure 27:
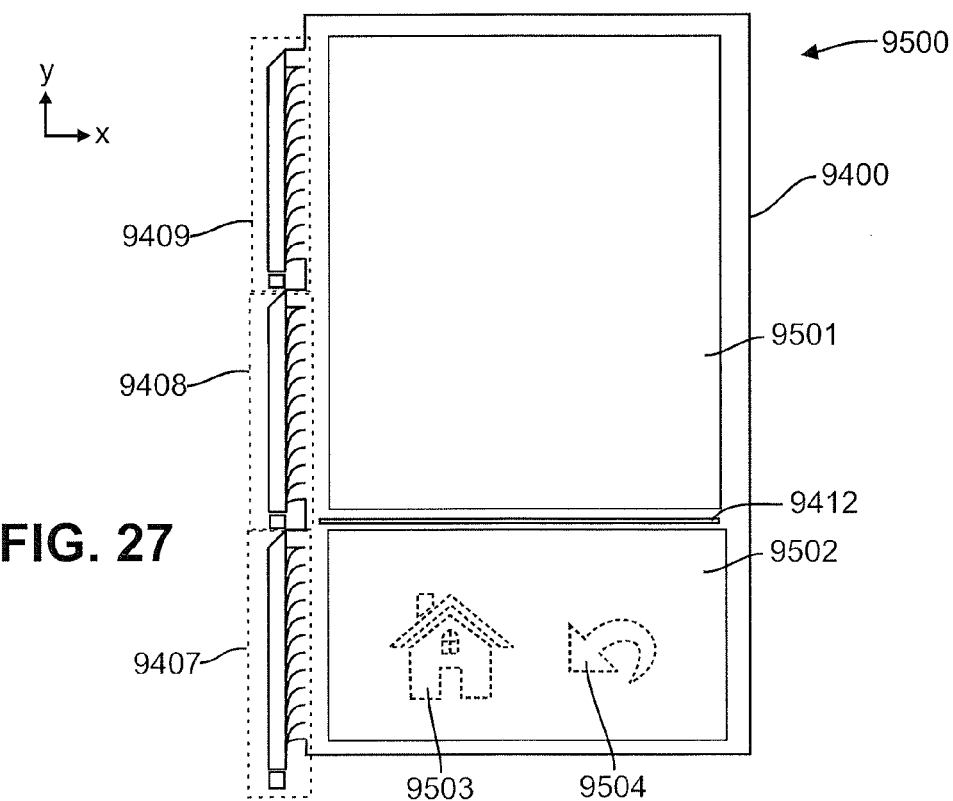
FIG. 27 is a top view of one embodiment of a light emitting device including a main display and a sub-display illuminated by the light emitting device of FIG. 26.

FIG. 27 is a top view of one embodiment of a light emitting device 9500 including a main display 9501 and a sub-display 9502 illuminated by the light emitting device 9400 of FIG. 26. In this embodiment, the sub-display 9502 can provide information with a different use-mode or illumination mode. For example, in one embodiment, the sub-display 9502 provides icons 9503 and 9504 that may be illuminated for shorter time periods than the main display 9501 or can be illuminated by a single white light emitting diode in the first light input coupler 9407 which is different, for example, from red, green, and blue light emitting diodes providing illumination with a larger color gamut in the second light input coupler 9408 and third light input coupler 9409. In another embodiment, a first film-based lightguide and second film based lightguide (separated in at least their light emitting regions) are used to illuminate a main display and sub-display, respectively.

Figure 28:
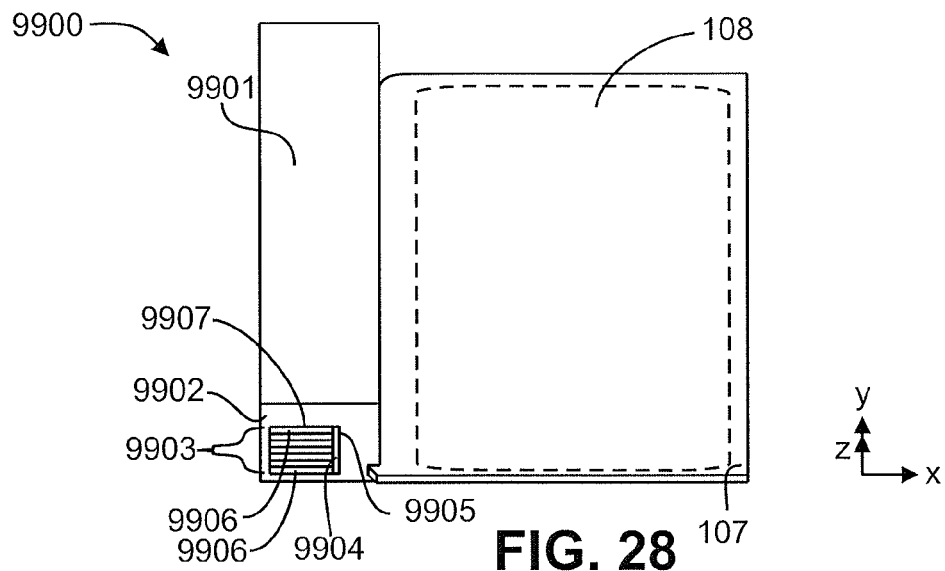
FIG. 28 is a perspective view of one embodiment of a wrapped lightguide including a film based lightguide, an array of coupling lightguides positioned within a cavity of a light input coupler housing, and a conformal wrap material inserted into the cavity.

FIG. 28 is a perspective view of one embodiment of a wrapped lightguide 9900 including a film based lightguide 107 and a light input coupler 9901. The light input coupler 9901 includes an array of coupling lightguides 9906 extending from the lightguide 107 that are folded and stacked to define a light input surface 9903. The coupling lightguides 9906 are positioned within a cavity 9905 of a light input coupler housing 9902. A conformal wrap material 9904 is inserted into the cavity 9905 that hardens or sets to maintain their relative positions, protect, and provide a low refractive index cladding for the coupling lightguides 9906. In on embodiment, the conformal wrap material 9904 is injected into the cavity 9905 of the light input coupler housing 9902 after the light input coupler housing 9902 is positioned around the coupling lightguides 9906. Also, in this embodiment, the light input surface 9903 of the coupling lightguides 9906 extends through an opening 9907 in the light input coupler housing 9902 such that the light input surface 9903 can receive light input.

Figure 29:
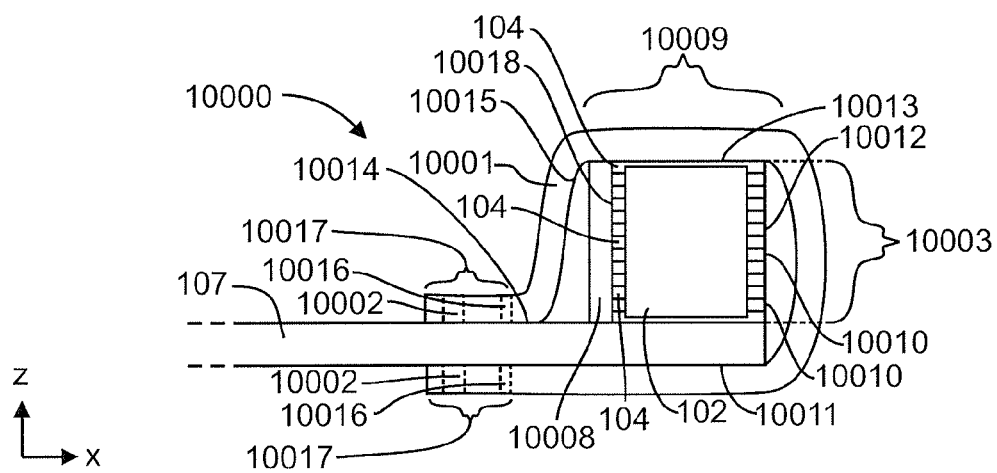
FIG. 29 is a cross-sectional side view of a portion of one embodiment of a light emitting device including the light source, the lightguide, a light input coupler, and a flexible wrap positioned around the folded, stacked array of coupling lightguides; and the wrap includes alignment guide holes in alignment guide regions and perforations that can be used to remove the alignment guide regions of the wrap.

FIG. 29 is a cross-sectional side view of a portion of one embodiment of a light emitting device 10000 including the light source 102, the lightguide 107, and a light input coupler 10009. The light input coupler 10009 includes the array of coupling lightguides 104 extended from the lightguide 107, folded around a RPME 10008, and stacked with the coupling lightguide 104 ends defining a light input surface 10003 positioned to receive light from the light source 102. The coupling lightguides 104 are aligned laterally (x direction) against a spine edge 10018 of the RPME 10008. The light emitting device 10000 further includes a flexible wrap 10001 positioned around the folded, stacked array of coupling lightguides 104. In one embodiment, the flexible wrap 10001 can physically protect the coupling lightguides 104 from scratches or contamination, maintain the relative position of the coupling lightguides 104 (such as to hold them in a compressed stack to occupy a small volume), intentionally couple out of the lightguide 107 light propagating within the cladding of the lightguide 107, or block stray light from exiting the light input coupler 10009. The wrap 10001 includes alignment guide holes 10002 in alignment guide regions 10017 that can be used to position the wrap 10001 in a folding device (not shown) such that it can be aligned to the lightguide 107, light input coupler 10009, or a component of the light input coupler 10009 during assembly. The wrap 10001 also includes perforations 10016 that can be used to remove the alignment guide regions 10017 of the wrap 10001 including the alignment guide holes 10002. For example, in one embodiment the alignment guide regions 10017 of the wrap 10001 are removed after adhering the wrap 10001 to the lightguide 107. The light emitting device 10000 further includes: a first surface 10011 of the lightguide 107 on the opposite side of the lightguide 107 than the stack of coupling lightguides 104; a surface 10012 including the lateral edges 10010 of the coupling lightguides 104; a third surface 10013 including the outer surface of the coupling lightguide 104 in the stack of coupling lightguides 104 furthest from the lightguide 107; and a fourth surface 10014 of the lightguide 107 on the same side of the lightguide 107 as the stack of coupling lightguides 104. In one embodiment, the flexible wrap 10001 includes a tape with an adhesive on the inner surface 10015 that adheres to one or more surfaces selected from the group: the first surface 10011, the second surface 10012, the third surface 10013, and the fourth surface 10014. In one embodiment, the wrap 10001 adheres to the first surface 10011 and the fourth surface 10014 and holds the coupling lightguides 104 together and toward the lightguide 107 in the z direction. In one embodiment, the wrap 10001 does not contact the second surface 10012 and there is an air gap between the lateral edges 10010 of the coupling lightguides 104 such that the wrap 10001 does not couple light out of the lateral edges 10010 of the coupling lightguides 104.

Figure 30:
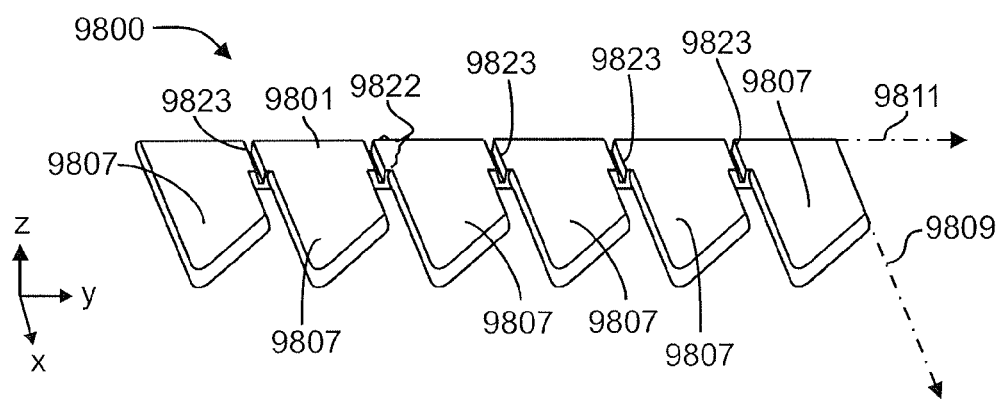
FIG. 30 is a perspective view of one embodiment of a relative position maintaining element (RPME) including a spine, angled teeth, and grooves in the spine region between the angled teeth such that the RPME can be bent and/or snapped and broken apart along the grooves.

FIG. 30 is a perspective view of one embodiment of a relative position maintaining element (RPME) 9800 including a spine 9801 defined within a spine region 9822 and angled teeth 9807 extending from the spine 9801 in the teeth extended direction 9809 (parallel to the +x direction) orthogonal to the array direction 9811 (parallel to the y direction) of the angled teeth 9807. The RPME 9800 includes grooves 9823 parallel to the teeth extended direction 9809 in the spine region 9822 between the angled teeth 9807 such that the RPME 9800 can be snapped and broken apart along the grooves 9823. In another embodiment, the RPME 9800 includes one or more separation mechanisms defined by perforations (not shown) in the spine region 9822 of the RPME 9800 such that the RPME 9800 can be snapped and broken apart along the one or more perforations.

Figure 31:
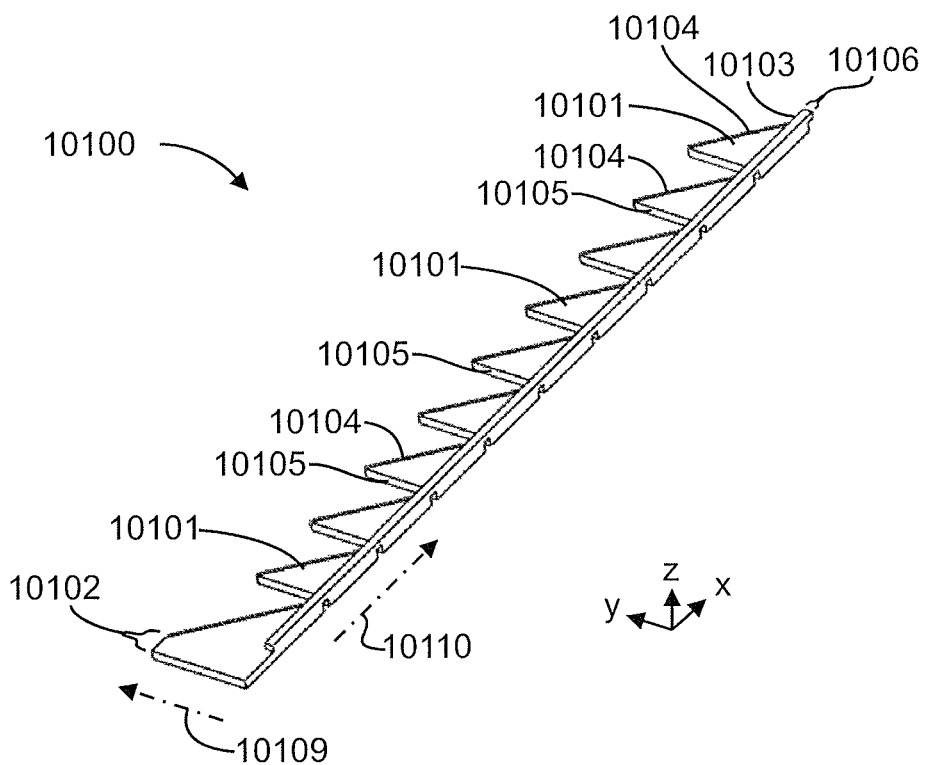
FIGS. 31, 32, and 33 are different perspective views of one embodiment of a relative position maintaining element including a spine and angled teeth that extend from beneath the spine.
Figure 32:
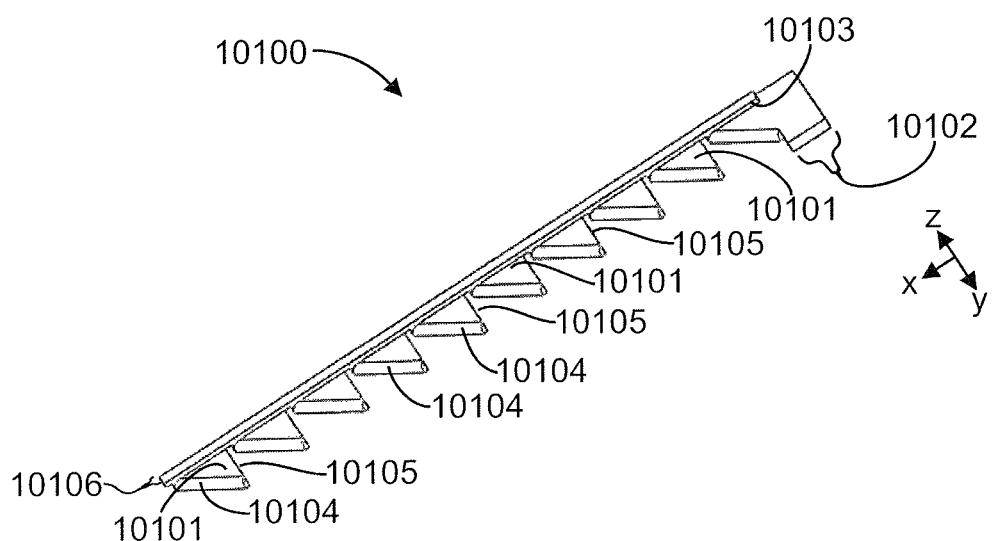
Figure 33:
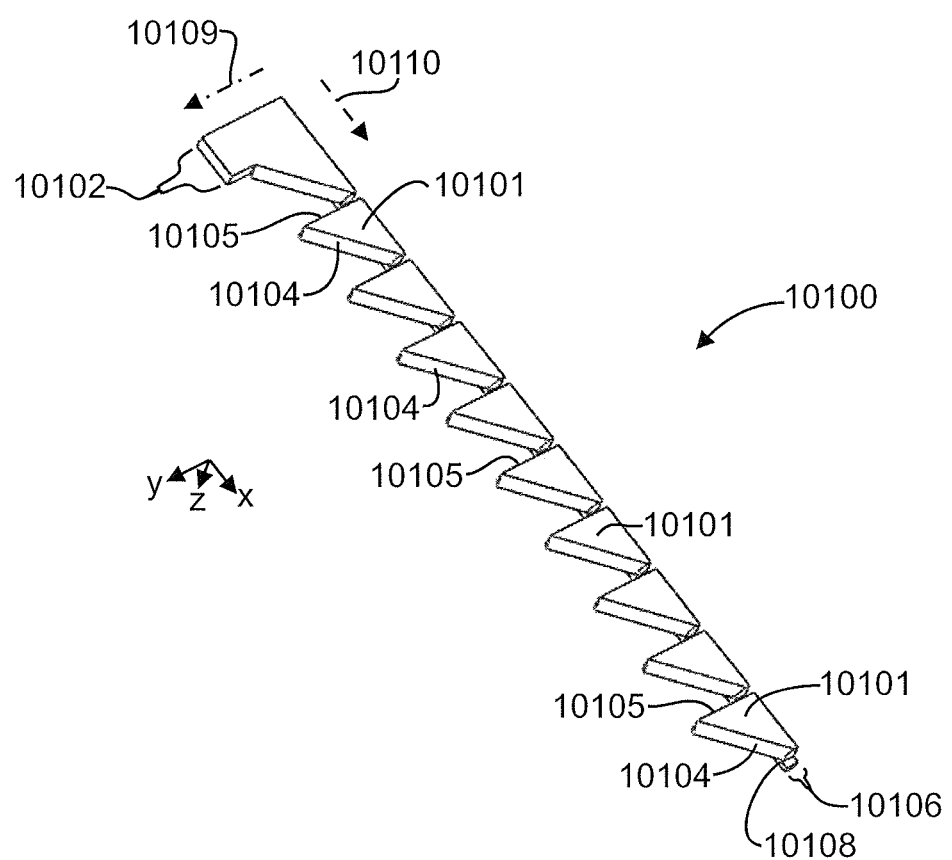

FIGS. 31, 32, and 33 are perspective views of one embodiment of a relative position maintaining element (RPME) 10100 including a spine 10106 and angled teeth 10101 extending in the teeth extended direction 10109 (parallel to the +y direction) orthogonal to the array direction 10110 (parallel to the x direction) of the angled teeth 10101. The angled teeth 10101 include first edges 10104 and second edges 10105. The first edges 10104 have curved edge profiles in the z direction. In this embodiment, the angled teeth 10101 extend from the spine 10106 that connects them together and are positioned beneath the spine 10106 (shown most clearly in FIG. 33 where one can see the angled teeth 10101 extending past the spine in the x-y plane). By starting the angled teeth 10101 from beneath the spine 10106, the volume of the RPME 10100 is reduced because the length of the RPME 10100 in the y direction is reduced relative to extending the angled teeth 10101 from the lateral edge 10108 of the spine 10106. In a this embodiment, the angled teeth 10101 of the RPME 10100 are physically coupled by a spine 10106 that does not extend past the angled teeth 10101 in the x-y plane. The RPME 10100 further includes a platform region 10102 whereupon one or more elements of a light emitting device (such as for example, coupling lightguides, light sources, collimating optics, and reflective films) could be adhered to the RPME 10100.

Figure 34:
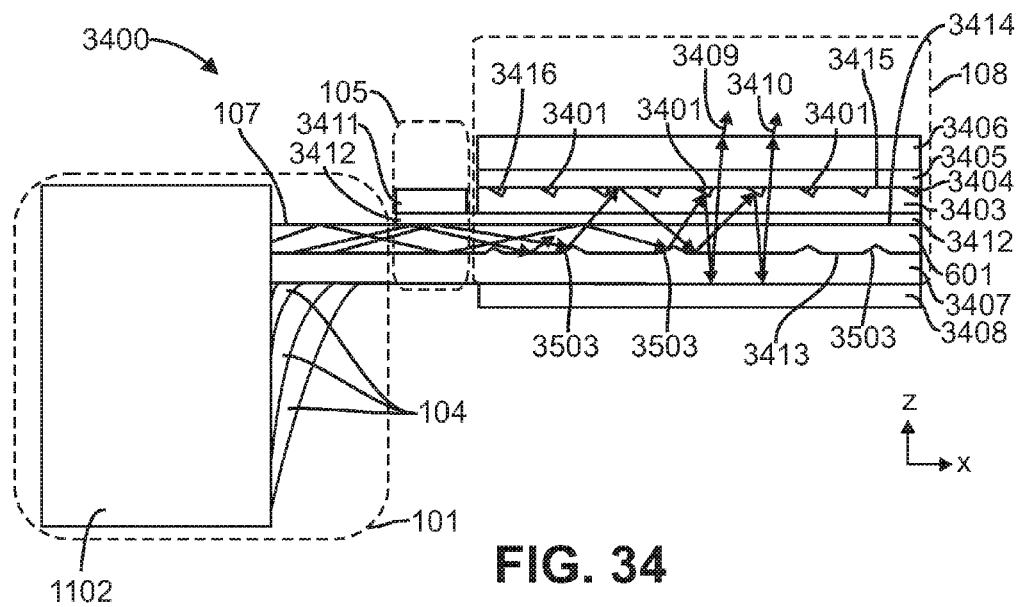
FIG. 34 is a cross-sectional side view of one embodiment of a light emitting device comprising low angle light directing features.

FIG. 34 is a cross-sectional side view of one embodiment of a light emitting device 3400 comprising the light input coupler 101, a film-based lightguide 107 comprising a core layer 601 of a core material with a core refractive index nm optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index nm. The light turning film 3403 comprises a plurality of reflective light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the reflective light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108.

After being redirected by the low angle light directing feature 3503, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 35:
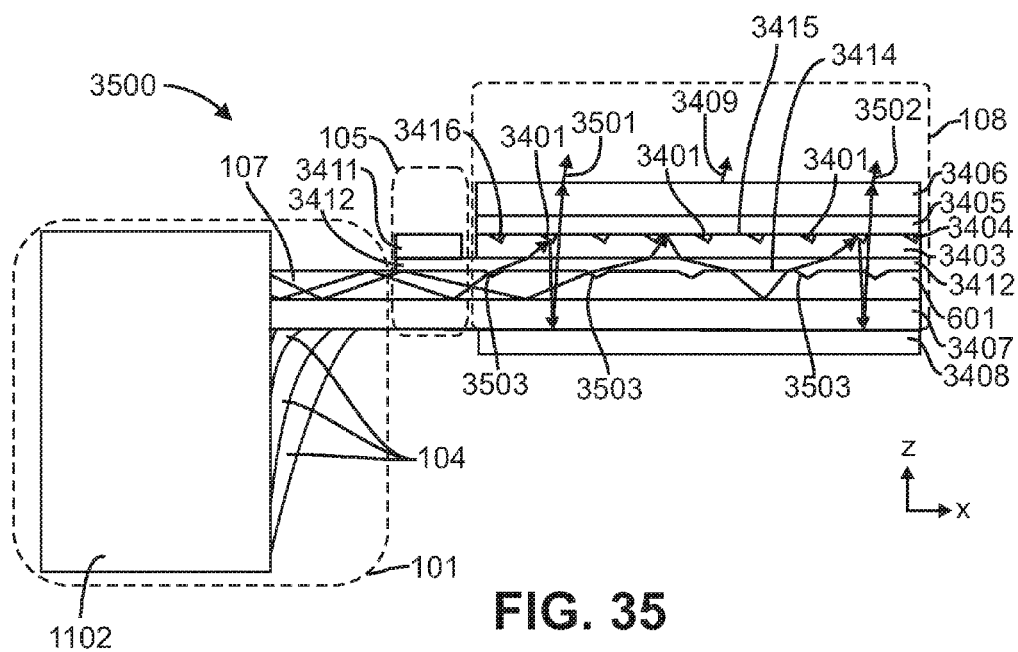
FIG. 35 is a cross-sectional side view of one embodiment of a light emitting device comprising light turning features.

FIG. 35 is a cross-sectional side view of one embodiment of a light emitting device 3500 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of refractive low angle directing features 3503 on the upper surface 3414 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of reflective light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touch-screen film, for example) to the light turning film 3403 over a portion of the top surface 3415 such that air gaps 3416 are formed at the reflective light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3501 and second light 3502 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3501 refracts to a new angle smaller than the incident angle by an average total angle of deviation of less than 20 degrees at a refractive low angle directing feature 3503 such that it propagates out of the core layer 601 of the lightguide. In this embodiment, a portion of the light from within the core layer 601 that intersects a refractive low angle directing feature 3503 may transmit through the refractive low angle directing feature 3503 and a portion may reflect from the low angle directing feature 3503. In this embodiment, $n_{DL} > n_{D2} > n_{D1}$ such that a portion of the light that reflects from the low angle directing feature 3503 may reflect at a total angle of deviation of less than 20 degrees such that it reflects from the boundary between the core layer 601 and the first pressure sensitive adhesive layer 3407 and exits the core layer 601 at the upper surface 3414 of the core layer 601. After crossing the interface between the core layer 601 and the second pressure sensitive adhesive, the first light 3501 then propagates through the second pressure sensitive adhesive layer 3412 into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3501 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3500 in the light emitting region 108.

After being redirected by the low angle light directing feature 3503, the second light 3502 propagates through the second pressure sensitive adhesive layer 3412 and into the light turning film 3403. The second light 3502 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3502 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 36:
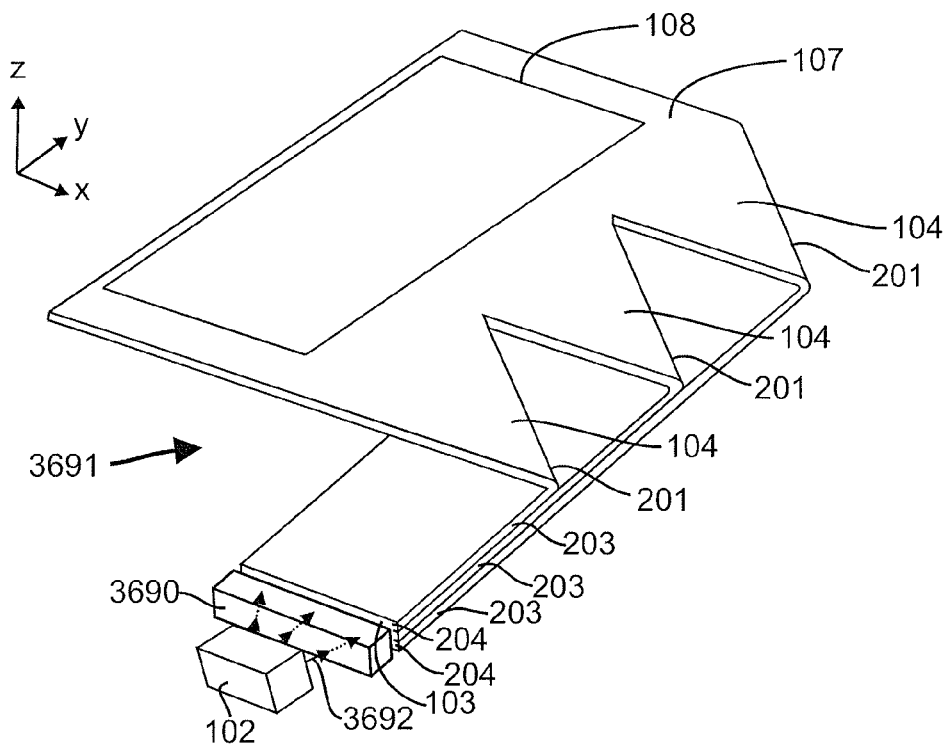
FIG. 36 is a perspective view of one embodiment of a light emitting device comprising a phase compensation element.

FIG. 36 is a perspective view of one embodiment of a light emitting device 3691 comprising a light input coupler 200 with coupling lightguides 104 folded in the −y direction. Light 3692 from the light source 102 is directed through a phase compensation optical element 3690 into the light input surface 103 through or along input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction and the light emitting region 108 of the lightguide 107. In this embodiment, the phase compensation element 3690 pre-compensates for the phase deviation of the light propagating through the coupling lightguides 104 and the lightguide 107 such that a uniform or pre-determined spatial phase output profile of light emitting from the light emitting region 108 of the light emitting device 3691 is achieved.

Figure 37:
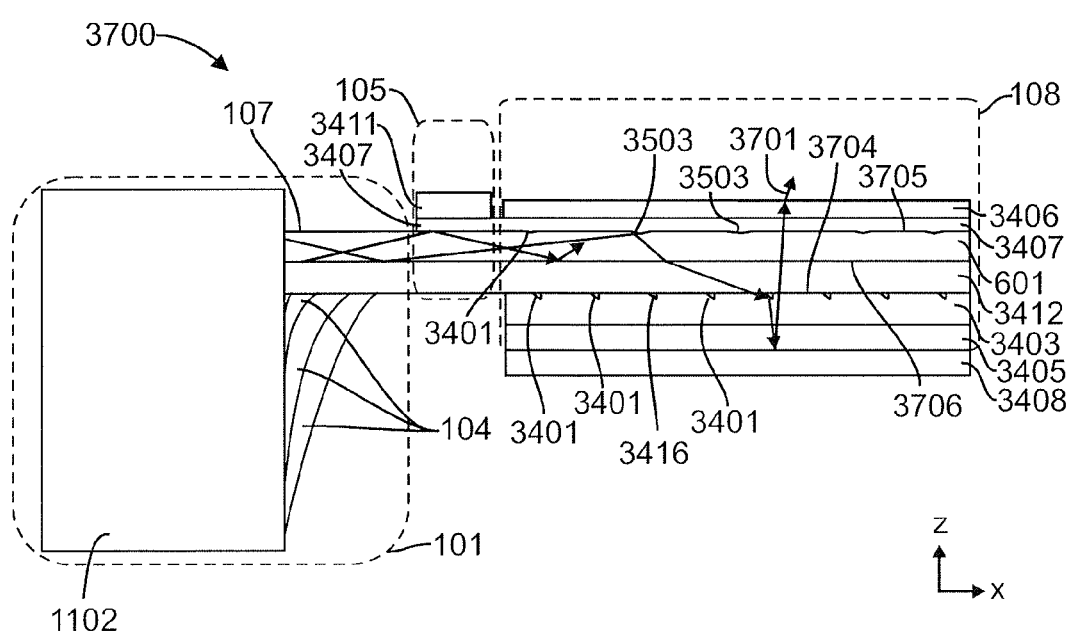
FIG. 37 is a cross-sectional side view of one embodiment of a light emitting device comprising light turning features and low angle directing features.

FIG. 37 is a cross-sectional side view of one embodiment of a light emitting device 3700 comprising the light input coupler 101, a film-based lightguide 107 comprising a core layer 601 of a core material with a core refractive index $n_{DL}$ optically coupled to a light turning film 3403 over a portion of the top surface 3704 of the light turning film 3403 (such that air gaps 3416 are formed at the reflective light turning features 3401) using a second pressure sensitive adhesive layer 3412 comprising a second material with a second refractive index $n_{D2}$. The reflective spatial light modulator 3408 is optically coupled to the light turning film 3403 using a third pressure sensitive adhesive layer 3405. The light turning film 3403 comprises a plurality of reflective light turning features 3401 on the top surface 3705 of the light turning film 3403 opposite the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 comprising a first material with a first refractive index $n_{D1}$.

A light mixing region 105 is positioned between the light input coupler 101 and the light emitting region 108 of the light emitting device 3700. An opaque layer 3411 is optically coupled to the film-based lightguide 107 in the light mixing region 105 using the first pressure sensitive adhesive layer 3407. In this embodiment, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In this embodiment, first light 3701 from the light source 1102 propagates through the coupling lightguides 104 within the light input coupler 101, totally internally reflect within the core layer 601 of the film-based lightguide 107 and propagates through the light mixing region 105 and into the light emitting region 108 of the film-based lightguide 107. First light 3701 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}>n_{D2}>n_{D1}$ such that the first light 3701 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting device 3400 in the light emitting region 108.

In one embodiment, a light emitting device (such as a frontlight for a reflective display, for example) comprises a film-based lightguide with the surfaces of the film defining a first lightguide, the first lightguide is optically coupled to a light redirecting optical element or other film and one or more surfaces of the light redirecting optical element or other film in combination with a surface of the first lightguide define a second lightguide, wherein the second lightguide may comprise the first lightguide. In one embodiment, a reflective display comprises a lightguide wherein an effective thickness of the lightguide bounded by total internal reflection interfaces is increased for totally internally reflected light within the core layer that is frustrated by the plurality of light extraction features such that it passes through the first cladding layer and totally internally reflects at one of the total internal reflection interfaces of a light redirecting optical element. In a further embodiment, a first lightguide and a second lightguide comprise the core layer, the second lightguide defined by a portion of the frustrated totally internally reflected light from the first lightguide propagating by total internal reflection between a surface of the first lightguide and an area of a surface of the light redirecting optical element, wherein the light redirecting features of a light redirecting optical element occupy less than 50% of the surface of the light redirecting optical element, the area of the surface of the light redirecting element is defined between the light redirecting features and reflects by total internal reflection a second portion of the frustrated totally internally reflected light from the light extraction features back through a first cladding layer and into a core layer of the first lightguide where it totally internally reflects from the surface of the first lightguide and is subsequently reflected by a light redirecting feature toward a reflective spatial light modulator.

In one embodiment, a light emitting device comprises: a film lightguide of a lightguide material with a refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first core layer comprising a first material with a first refractive index, $n_{D1}$, a second layer comprising a second material with a second refractive index $n_{D2}$ where $n_{DL}>n_{D2}>n_{D1}$; a plurality of low angle directing features optically coupled to the body of the lightguide; a plurality of light turning features optically coupled to the lightguide; wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In one aspect, a light emitting device including a film with coupling lightguides extending therefrom includes a coupling lightguide Relative Position Maintaining Element (RPME) including a spine region connecting an array of angled teeth or guides. In another aspect, the angled teeth or guides of the RPME are physically coupled by a spine that does not extend outside the volume defined between the overlapping sections of the array of coupling lightguides in the regions of the fold. In another aspect, the array of angled teeth in an RPME include first edges oriented at a first tooth edge angle to the extended direction of the teeth (the direction the teeth extend from the spine, perpendicular to the array direction of the array of teeth) and second edges oriented at a second tooth edge angle to the extended direction of the teeth wherein the first tooth edge angle and second tooth edge angle are greater than 0 degrees.

In another aspect, a lightguide, cladding, or adhesive optically coupled to the lightguide includes a pliable or impact absorbing material. In another aspect, the ASTM D2240 Shore A hardness of the light transmitting lightguide, adhesive, or component physically and/or optically coupled to the lightguide is greater than one selected from the group: 5, 10, 20, 30, 40, 50, 60, 70, and 80.

In one aspect, a light input coupler for a light emitting device includes a wrap around a stack of coupling lightguides wherein the wrap includes a film with a Young's modulus less than one selected from the group: 10, 8, 6, 4, 2, 1, 0.5, and 0.1 gigapascals. In another aspect, the wrap includes perforations or alignment holes. In another aspect, the wrap material is a conformal material coated or injected into a cavity or region including the coupling lightguides.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

While the disclosure includes various specific embodiments, those skilled in the art will recognize that the embodiments can be practiced with modification within the spirit and scope of the disclosure and the claims.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

EQUIVALENTS

Those skilled in the art will recognize, or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius. Unless otherwise stated, refractive indexes referenced herein are measured at the yellow doublet sodium D-line, with a wavelength of 589 nanometers. Elements in the figures are not drawn to scale.

What is claimed is:

1. A display comprising:
   a. a reflective spatial light modulator having a reflective surface;

b. a lightguide comprising:
  i). a core layer having opposing surfaces with a thickness not greater than 0.5 millimeters therebetween wherein light propagates by total internal reflection between the opposing surfaces;
  ii). a first cladding layer having a first side optically coupled to the core layer and an opposing second side;
  iii). a lightguide region;
  iv). an array of coupling lightguides continuous with the lightguide region, each coupling lightguide of the array of coupling lightguides terminating in a bounding edge, and each coupling lightguide folded in a fold region such that the bounding edges of the array of coupling lightguides are stacked; and
  v). a light emitting region comprising a plurality of light extraction features arranged in a pattern that varies spatially in the light emitting region, the plurality of light extraction features frustrating totally internally reflected light propagating within the core layer such that light exits the core layer in the light emitting region into the first cladding layer;
c. a light source positioned to emit light into the stacked bounding edges, the light propagating within the array of coupling lightguides to the lightguide region, with light from each coupling lightguide combining and totally internally reflecting within the lightguide region; and
d. a light redirecting optical element optically coupled to the second side of the first cladding layer, the light redirecting optical element comprising a plurality of light redirecting features directing frustrated totally internally reflected light from the plurality of light extraction features toward the reflective spatial light modulator, the plurality of light redirecting features occupying less than 50% of a surface of the light redirecting optical element in the light emitting region, wherein the core layer has an average thickness in the light emitting region, the light emitting region has a largest dimension in a plane of the light emitting region orthogonal to a thickness direction of the core layer, and the largest dimension of the light emitting region divided by the average thickness of the core layer in the light emitting region is greater than 100.

2. The display of claim 1 wherein the core layer of the lightguide further comprises a light mixing region positioned to receive light from each coupling lightguide prior to the light entering the light emitting region and a ratio of an average thickness of a region defined by a plurality of interfaces defining the total internal reflection of light propagating from a first end to an opposite second end of the light emitting region to an average thickness of the light mixing region is greater than 1.

3. The display of claim 1 wherein the lightguide further comprises a second cladding layer having a first surface optically coupled to the core layer on a side of the core layer opposite the first cladding layer and at least one of the first cladding and the second cladding comprises an adhesive.

4. The display of claim 1 wherein an effective thickness of the lightguide bounded by a plurality of total internal reflection interfaces is increased for totally internally reflected light within the core layer that is frustrated by the plurality of light extraction features such that the frustrated light passes through the first cladding layer and totally internally reflects at a first total internal reflection interface of the plurality of total internal reflection interfaces.

5. The display of claim 4 wherein the first total internal reflection interface includes the surface of the light redirecting optical element.

6. The display of claim 5 wherein the frustrated light totally internally reflected at the surface of the light redirecting optical element totally internally reflects at a second total internal reflection interface between the core layer and a second cladding layer of the lightguide.

7. The display of claim 6 wherein a portion of the frustrated light that reflects at the second total internal reflection interface between the core layer and the second cladding layer is subsequently redirected by a first light redirecting feature of the plurality of light redirecting features toward the reflective spatial light modulator.

8. The display of claim 6 wherein the first cladding layer has a first refractive index, the second cladding layer has a second refractive index less than the first refractive index, and the core layer has a core refractive index greater than the first refractive index and the second refractive index.

9. The display of claim 5 wherein an area of the surface of the light redirecting optical element between the plurality of light redirecting features is substantially planar.

10. The display of claim 9 wherein each of the plurality of light extraction features is a low angle directing feature that redirects light at a first angle of incidence to a second angle with an average total deviation less than 6 degrees.

11. The display of claim 9 wherein each of the plurality of light extraction features is a low angle directing feature that redirects light at a first angle of incidence to a second angle with an average total deviation less than 3 degrees.

12. The display of claim 9 wherein each of the plurality of light extraction features is a low angle directing feature that redirects light at a first angle of incidence to a second angle with an average total deviation less than an angular difference between a first critical angle and a second critical angle, the first critical angle defined by the first refractive index and the core refractive index and the second critical angle defined by the second refractive index and the core refractive index.

13. The display of claim 9 wherein each of the plurality of light extraction features is a low angle directing feature that redirects light at a first angle of incidence to a second angle with an average total deviation less than 110% of an angular difference between a first critical angle and a second critical angle, the first critical angle defined by the first refractive index and the core refractive index and the second critical angle defined by the second refractive index and the core refractive index.

14. A display comprising:
  a. a reflective spatial light modulator having a reflective surface;
  b. a first lightguide comprising a core layer having opposing surfaces with a thickness not greater than 0.5 millimeters therebetween, a lightguide region and a light emitting region, the first lightguide defined by the opposing surfaces guiding light by total internal reflection;
  c. an array of coupling lightguides continuous with the lightguide region, each coupling lightguide of the array of coupling lightguides terminating in a bounding edge, and each coupling lightguide folded in a fold region such that the bounding edges of the array of coupling lightguides are stacked;
  d. a light source emitting light into the stacked bounding edges, the light propagating within the array of coupling lightguides to the lightguide region, with light from each coupling lightguide combining and totally internally reflecting within the lightguide region;

e. a first cladding layer having a first side optically coupled to the core layer and an opposing second side;

f. a plurality of light extraction features arranged within the light emitting region in a pattern that varies spatially in the light emitting region, the plurality of light extraction features frustrating the totally internally reflected light from the array of coupling lightguides propagating in the first lightguide between the opposing surfaces of the core layer such that light exits the core layer in the light emitting region into the first cladding layer;

g. a light redirecting optical element optically coupled to the second side of the first cladding layer, the light redirecting optical element comprising a plurality of light redirecting features directing a first portion of the frustrated totally internally reflected light from the plurality of light extraction features back through the first cladding layer and the core layer to the reflective spatial light modulator; and h. a second lightguide comprising the core layer, the second lightguide defined by a surface of the first lightguide opposite the light redirecting optical element and an area of a surface of the light redirecting optical element, such that a second portion of the frustrated totally internally reflected light from the first lightguide propagates by total internal reflection within the second lightguide wherein the plurality of light redirecting features occupies less than 50% of the surface of the light redirecting optical element, the area of the surface of the light redirecting element is defined between the plurality of light redirecting features and reflects by total internal reflection a second portion of the frustrated totally internally reflected light from the plurality of light extraction features back through the first cladding layer and into the core layer where the second portion of the frustrated totally internally reflected light totally internally reflects from the surface of the first lightguide and is subsequently reflected by one or more light redirecting features of the plurality of light redirecting features toward the reflective spatial light modulator.

15. The display of claim 14 wherein the core layer has an average thickness in the light emitting region, the light emitting region has a largest dimension in a plane of the light emitting region, and the largest dimension of the light emitting region divided by the average thickness of the core layer in the light emitting region is greater than 100.

16. The display of claim 14 further comprising a second cladding layer positioned between the core layer and the reflective spatial light modulator, wherein the first cladding layer has a first refractive index, the second cladding layer has a second refractive index less than the first refractive index, and the core layer has a core refractive index greater than the first refractive index and the second refractive index.

17. The display of claim 14 wherein each of the plurality of light extraction features is a low angle directing feature that redirects light at a first angle of incidence to a second angle with an average total deviation less than 6 degrees.

18. A display comprising:

a. a reflective spatial light modulator having a reflective surface;

b. a first lightguide comprising a core layer having opposing surfaces with a thickness not greater than 0.5 millimeters therebetween, a lightguide region and a light emitting region, the first lightguide defined by the opposing surfaces guiding light by total internal reflection;

c. a first cladding layer having a first side optically coupled to the core layer and an opposing second side;

d. an array of coupling lightguides continuous with the lightguide region of the first lightguide, each coupling lightguide of the array of coupling lightguides terminating in a bounding edge, and each coupling lightguide folded in a fold region such that the bounding edges of the array of coupling lightguides are stacked;

e. a plurality of light extraction features arranged within the light emitting region in a pattern that varies spatially in the light emitting region, the plurality of light extraction features frustrating totally internally reflected light propagating between the opposing surfaces of the core layer such that light exits the core layer in the light emitting region into the first cladding layer;

f. a light source positioned to emit light into the stacked bounding edges, the light propagating within the array of coupling lightguides to the lightguide region, with light from each coupling lightguide combining and totally internally reflecting within the lightguide region;

g. a light redirecting optical element optically coupled to the second side of the first cladding layer, the light redirecting optical element comprising a plurality of light redirecting features directing a first portion of the frustrated totally internally reflected light from the plurality of light extraction features toward the reflective spatial light modulator; and h. a second lightguide comprising the core layer, the second lightguide defined by a surface of the first lightguide opposite the light redirecting optical element and an area of a surface of the light redirecting optical element between the plurality of light redirecting features, such that a second portion of the frustrated totally internally reflected light from the first lightguide propagates by total internal reflection within the second lightguide, wherein the plurality of light redirecting features occupies less than 50% of a surface of the light redirecting optical element.

19. The display of claim 18 wherein the plurality of light redirecting features occupies less than 30% of a surface of the light redirecting optical element.

20. The display of claim 18 wherein the core layer is positioned between the light redirecting optical element and the reflective spatial light modulator.

21. The display of claim 18 further comprising a second cladding layer positioned between the core layer and the reflective spatial light modulator, wherein the first cladding layer has a first refractive index, the second cladding layer has a second refractive index less than the first refractive index, and the core layer has a core refractive index greater than the first refractive index and the second refractive index.

22. The display of claim 18 wherein each of the plurality of light extraction features is a low angle directing feature that redirects light at a first angle of incidence to a second angle with an average total deviation less than 3 degrees.

23. The display of claim 18 wherein each of the plurality of light extraction features is a low angle directing feature that redirects light at a first angle of incidence to a second angle with an average total deviation less than an angular difference between a first critical angle and a second critical angle, the first critical angle defined by the first refractive index and the core refractive index and the second critical angle defined by the second refractive index and the core refractive index.

24. The display of claim 18 wherein each of the plurality of light extraction features is a low angle directing feature that redirects light at a first angle of incidence to a second angle with an average total deviation less than 110% of an angular difference between a first critical angle and a second critical angle, the first critical angle defined by the first refractive index and the core refractive index and the second critical angle defined by the second refractive index and the core refractive index.

25. The display of claim 18 wherein the core layer has an average thickness in the light emitting region, the light emitting region has a largest dimension in a plane of the light emitting region orthogonal to a thickness direction of the core layer, and the largest dimension of the light emitting region divided by the average thickness of the core layer in the light emitting region is greater than 100.

* * * * *